United States Patent
Wasson et al.

(10) Patent No.: US 7,294,948 B2
(45) Date of Patent: Nov. 13, 2007

(54) ROTOR-STATOR STRUCTURE FOR ELECTRODYNAMIC MACHINES

(75) Inventors: Ken George Wasson, Foster City, CA (US); John Patrick Petro, Los Altos, CA (US)

(73) Assignee: Novatorque, Inc., North Highlands, CA (US)

( * ) Notice: Subject to any disclaimer, the term of this patent is extended or adjusted under 35 U.S.C. 154(b) by 37 days.

(21) Appl. No.: 11/255,404

(22) Filed: Oct. 20, 2005

(65) Prior Publication Data

US 2006/0087186 A1   Apr. 27, 2006

Related U.S. Application Data

(60) Provisional application No. 60/622,258, filed on Oct. 25, 2004.

(51) Int. Cl.
*H02K 21/26* (2006.01)

(52) U.S. Cl. .................. 310/156.38; 310/254; 310/261

(58) Field of Classification Search ................................
310/156.07–156.15, 156.38–156.43, 156.62,
310/254, 261
See application file for complete search history.

(56) References Cited

U.S. PATENT DOCUMENTS

| | | | |
|---|---|---|---|
| 414,659 A | 11/1889 | Seafert |
| 422,862 A | 3/1890 | Washburn |
| 439,102 A | 10/1890 | Bradley |
| 754,066 A | 3/1904 | Hoffman |
| 829,975 A | 9/1906 | Lincoln |
| 846,079 A | 3/1907 | Yost |
| 1,039,197 A | 9/1912 | Roth |
| 1,557,213 A | 10/1925 | Lee |
| 1,640,742 A | 8/1927 | Wallace |
| 1,763,104 A | 6/1930 | Shurtleff |
| 1,771,281 A | 7/1930 | Wilsing |
| 1,874,094 A | 8/1932 | Ford |
| 1,962,832 A | 6/1934 | Neureuther |
| 2,025,560 A | 12/1935 | Warren |
| 2,081,993 A | 6/1937 | Gebhardt |
| 2,141,681 A | 12/1938 | Brueck |
| 2,378,668 A | 6/1945 | Vickers |
| 2,480,825 A | 9/1949 | Adolsh |
| 2,484,001 A | 10/1949 | Raymond |

(Continued)

FOREIGN PATENT DOCUMENTS

CH   400323   4/1966

(Continued)

*Primary Examiner*—Thanh Lam
(74) *Attorney, Agent, or Firm*—Cooley Godward Kronish LLP

(57) ABSTRACT

A rotor-stator structure for electrodynamic machinery is disclosed to, among other things, minimize magnetic flux path lengths and to eliminate back-iron for increasing torque and/or efficiency per unit size (or unit weight) and for reducing manufacturing costs. In one embodiment, an exemplary rotor-stator structure can comprise a shaft defining an axis of rotation, and a rotor on which at least two magnets are mounted on the shaft. The two magnets can be cylindrical or conical magnets having magnetic surfaces that confront air gaps. In some embodiments, substantially straight field pole members can be arranged coaxially and have flux interaction surfaces formed at both ends of those field poles. Those surfaces are located adjacent to the confronting magnetic surfaces to define functioning air gaps, which are generally curved in shape.

24 Claims, 44 Drawing Sheets

U.S. PATENT DOCUMENTS

| | | |
|---|---|---|
| 2,500,730 A | 3/1950 | Yonkers |
| 2,561,890 A | 7/1951 | Stoddard |
| 2,575,153 A | 11/1951 | Wightman |
| 2,669,687 A | 2/1954 | De Tastes |
| 2,677,256 A | 5/1954 | Donandt |
| 2,677,259 A | 5/1954 | Woodward |
| 2,694,781 A | 11/1954 | Hinz |
| 2,717,969 A | 9/1955 | Buchhold |
| 2,769,106 A | 10/1956 | Dembowski |
| 2,796,542 A | 6/1957 | Bekey |
| 2,802,959 A | 8/1957 | Powers |
| 2,824,272 A | 2/1958 | Delaporte |
| 3,001,093 A | 9/1961 | Wilcox |
| 3,025,445 A | 3/1962 | Welch |
| 3,153,157 A | 10/1964 | Rabe |
| 3,173,042 A | 3/1965 | Fodor |
| 3,175,111 A | 3/1965 | Orr |
| 3,205,384 A | 9/1965 | Sears |
| 3,223,866 A | 12/1965 | Tiltins |
| 3,241,111 A | 3/1966 | Sandstrom |
| 3,241,304 A | 3/1966 | Mattingly |
| 3,309,547 A | 3/1967 | Woodward |
| 3,319,100 A | 5/1967 | Erickson |
| 3,321,652 A | 5/1967 | Opel |
| 3,356,425 A | 12/1967 | Carrierre |
| 3,360,667 A | 12/1967 | Gordon |
| 3,374,376 A | 3/1968 | Kromrey |
| 3,396,291 A | 8/1968 | Somerville |
| 3,399,002 A | 8/1968 | Atkinson |
| 3,428,837 A | 2/1969 | Morreale |
| 3,471,729 A | 10/1969 | Latta |
| 3,490,816 A | 1/1970 | Lyman |
| 3,519,859 A | 7/1970 | Morreale |
| 3,565,495 A | 2/1971 | Lyman |
| 3,603,826 A | 9/1971 | Saretzky |
| 3,619,014 A | 11/1971 | Quick |
| 3,648,090 A | 3/1972 | Voin |
| 3,651,355 A | 3/1972 | Mason |
| 3,689,787 A | 9/1972 | Saretzky |
| 3,717,780 A | 2/1973 | Hohne |
| 3,723,796 A | 3/1973 | Mason |
| 3,787,100 A | 1/1974 | Habermann |
| 3,822,768 A | 7/1974 | Sebulke |
| 3,863,084 A | 1/1975 | Hasebe |
| 3,936,680 A | 2/1976 | Kuwako |
| 4,031,421 A | 6/1977 | Geiger |
| 4,043,614 A | 8/1977 | Lyman |
| 4,045,696 A | 8/1977 | Lutz |
| 4,047,807 A | 9/1977 | Okano |
| 4,066,922 A | 1/1978 | Hennemann |
| 4,117,359 A | 9/1978 | Wehde |
| 4,152,570 A | 5/1979 | Inoue |
| 4,156,817 A | 5/1979 | Preece |
| D256,351 S | 8/1980 | Schulze |
| 4,221,984 A | 9/1980 | Mason |
| 4,259,603 A | 3/1981 | Uchiyama |
| 4,310,768 A | 1/1982 | Colley |
| 4,328,411 A | 5/1982 | Haller |
| 4,358,693 A | 11/1982 | Palmer |
| 4,378,146 A | 3/1983 | Suzuki |
| 4,390,262 A | 6/1983 | Hirohata |
| 4,395,815 A | 8/1983 | Stanley |
| 4,460,253 A | 7/1984 | Kawai |
| 4,476,395 A | 10/1984 | Cronin |
| 4,480,208 A | 10/1984 | Logie |
| 4,483,570 A | 11/1984 | Inoue |
| 4,491,401 A | 1/1985 | Inaba |
| 4,503,349 A | 3/1985 | Miller |
| 4,543,506 A | 9/1985 | Kawada |
| 4,564,775 A | 1/1986 | Mazzorana |
| 4,577,129 A | 3/1986 | Bertram |
| 4,593,222 A | 6/1986 | Burkel |
| 4,594,539 A | 6/1986 | Michelson |
| 4,601,564 A | 7/1986 | Yamamoto |
| 4,628,220 A | 12/1986 | Flogvall |
| 4,658,228 A | 4/1987 | Leupold |
| 4,663,581 A | 5/1987 | Glennon |
| 4,674,178 A | 6/1987 | Patel |
| 4,713,569 A | 12/1987 | Schwartz |
| 4,731,626 A | 3/1988 | Kawamoto |
| 4,734,604 A | 3/1988 | Sontheimer |
| 4,748,359 A | 5/1988 | Yahara |
| 4,757,224 A | 7/1988 | McGee |
| 4,759,186 A | 7/1988 | Sugden |
| 4,760,314 A | 7/1988 | Mohri |
| 4,763,150 A | 8/1988 | Sumi |
| 4,777,397 A | 10/1988 | Parshall |
| 4,788,369 A | 11/1988 | Marsh |
| 4,788,465 A | 11/1988 | Hertrich |
| 4,802,347 A | 2/1989 | Nystuen |
| 4,879,484 A | 11/1989 | Huss |
| 4,883,996 A | 11/1989 | Aoki |
| 4,885,489 A | 12/1989 | Stuhr |
| 4,918,802 A | 4/1990 | Schaefer |
| 4,920,295 A | 4/1990 | Holden |
| 4,939,397 A | 7/1990 | Morrill |
| 4,962,583 A | 10/1990 | Yang |
| 4,984,972 A | 1/1991 | Clausen |
| 5,033,265 A | 7/1991 | Sugden |
| 5,036,235 A | 7/1991 | Kleckner |
| 5,045,741 A | 9/1991 | Dvorsky |
| 5,047,682 A | 9/1991 | Burgbacher |
| 5,049,771 A | 9/1991 | Challita et al. |
| 5,081,387 A | 1/1992 | Nystuen |
| 5,130,592 A | 7/1992 | Bitsch |
| 5,140,212 A | 8/1992 | Iwasaki |
| 5,212,418 A | 5/1993 | Mason |
| 5,216,308 A | 6/1993 | Meeks |
| 5,233,254 A | 8/1993 | Fisher |
| 5,258,677 A | 11/1993 | Mason |
| 5,283,492 A | 2/1994 | Mason |
| 5,300,848 A | 4/1994 | Huss |
| 5,406,157 A | 4/1995 | New |
| 5,436,518 A * | 7/1995 | Kawai .................. 310/156.18 |
| 5,486,730 A | 1/1996 | Ludwig |
| 5,514,924 A | 5/1996 | McMullen |
| 5,610,460 A | 3/1997 | Jacobson |
| 5,627,419 A | 5/1997 | Miller |
| 5,674,169 A | 10/1997 | Yang |
| 5,744,887 A | 4/1998 | Itoh |
| 5,751,086 A | 5/1998 | Taghezout |
| 5,767,597 A | 6/1998 | Gondhalekar |
| 5,777,421 A | 7/1998 | Woodward |
| 5,780,950 A * | 7/1998 | Yang ......................... 310/114 |
| 5,844,345 A | 12/1998 | Hsu |
| 5,955,806 A | 9/1999 | Devenyi |
| 5,962,948 A | 10/1999 | Hakala |
| 6,013,693 A | 1/2000 | Takahashi |
| 6,025,769 A | 2/2000 | Chu |
| 6,049,148 A | 4/2000 | Nichols |
| 6,057,613 A | 5/2000 | Trago |
| 6,104,115 A | 8/2000 | Offringa |
| 6,157,109 A | 12/2000 | Schiferl |
| 6,194,797 B1 | 2/2001 | Simon |
| 6,236,124 B1 | 5/2001 | Sekiyama |
| 6,246,146 B1 | 6/2001 | Schiller |
| 6,346,755 B1 | 2/2002 | Tong |
| 6,359,357 B1 | 3/2002 | Blumenstock |
| 6,455,975 B1 | 9/2002 | Raad |
| 6,492,753 B2 | 12/2002 | Zepp |
| 6,700,280 B1 | 3/2004 | Geiger |
| 6,720,688 B1 | 4/2004 | Schiller |

| | | | | | | |
|---|---|---|---|---|---|---|
| 2004/0119371 A1 | 6/2004 | Laing | | JP | 60066658 | 4/1985 |
| | | | | JP | 04-026350 | 1/1992 |
| FOREIGN PATENT DOCUMENTS | | | | JP | 06-014521 | 1/1994 |
| DE | 2433809 | 2/1978 | | JP | 06-141527 | 5/1994 |
| DE | 37 42 502 A1 | 6/1989 | | JP | 06-351212 | 12/1994 |
| DE | 199 54 196 A1 | 6/2000 | | JP | 08-080019 | 3/1996 |
| DE | 101 40 362 A1 | 3/2003 | | JP | 10-174399 | 6/1998 |
| EP | 0208124 A2 | 1/1987 | | JP | 10-174400 | 6/1998 |
| EP | 0251350 A2 | 1/1988 | | WO | WO 00/48297 A1 | 8/2000 |
| GB | 960879 | 6/1964 | | | | |

* cited by examiner

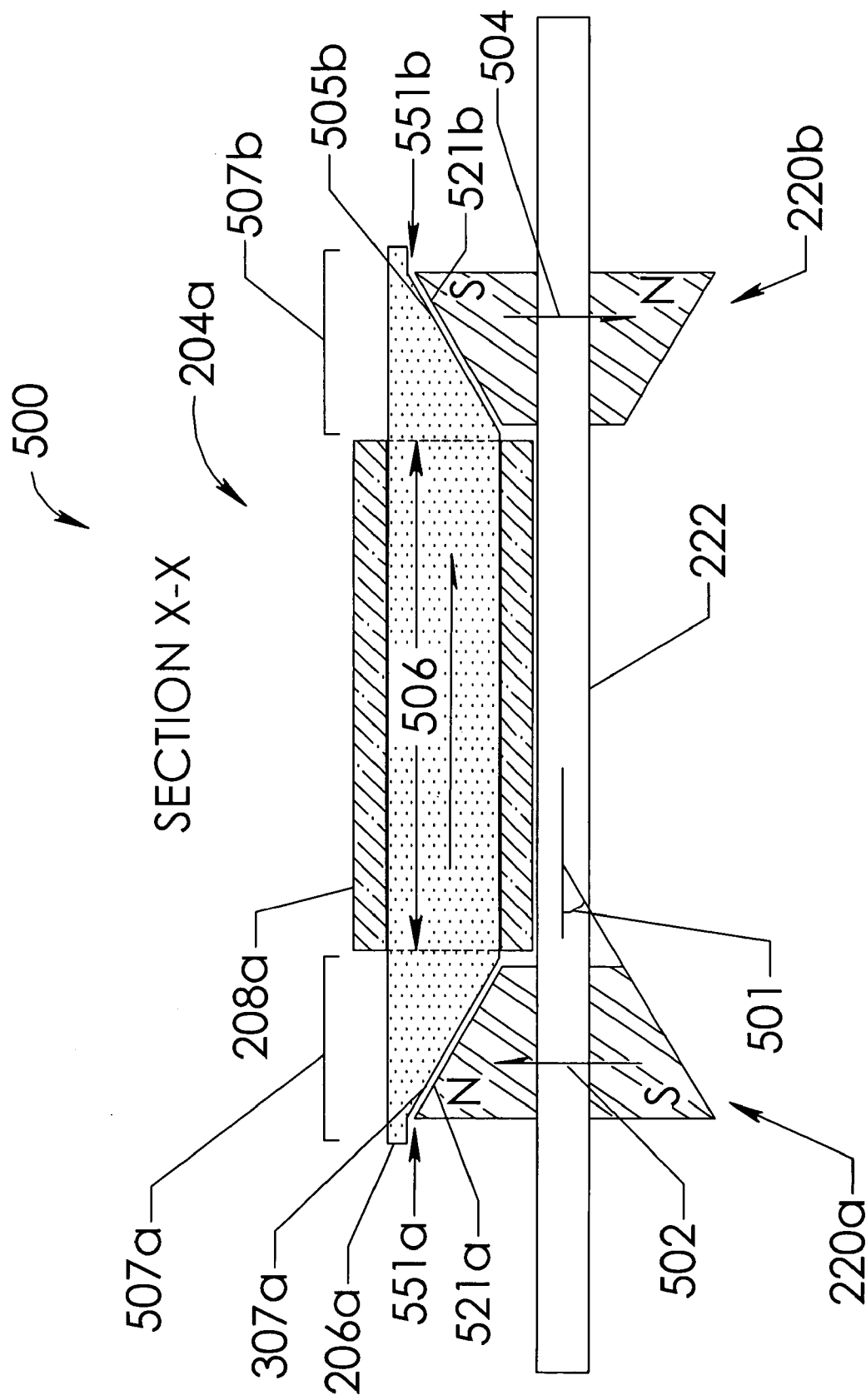

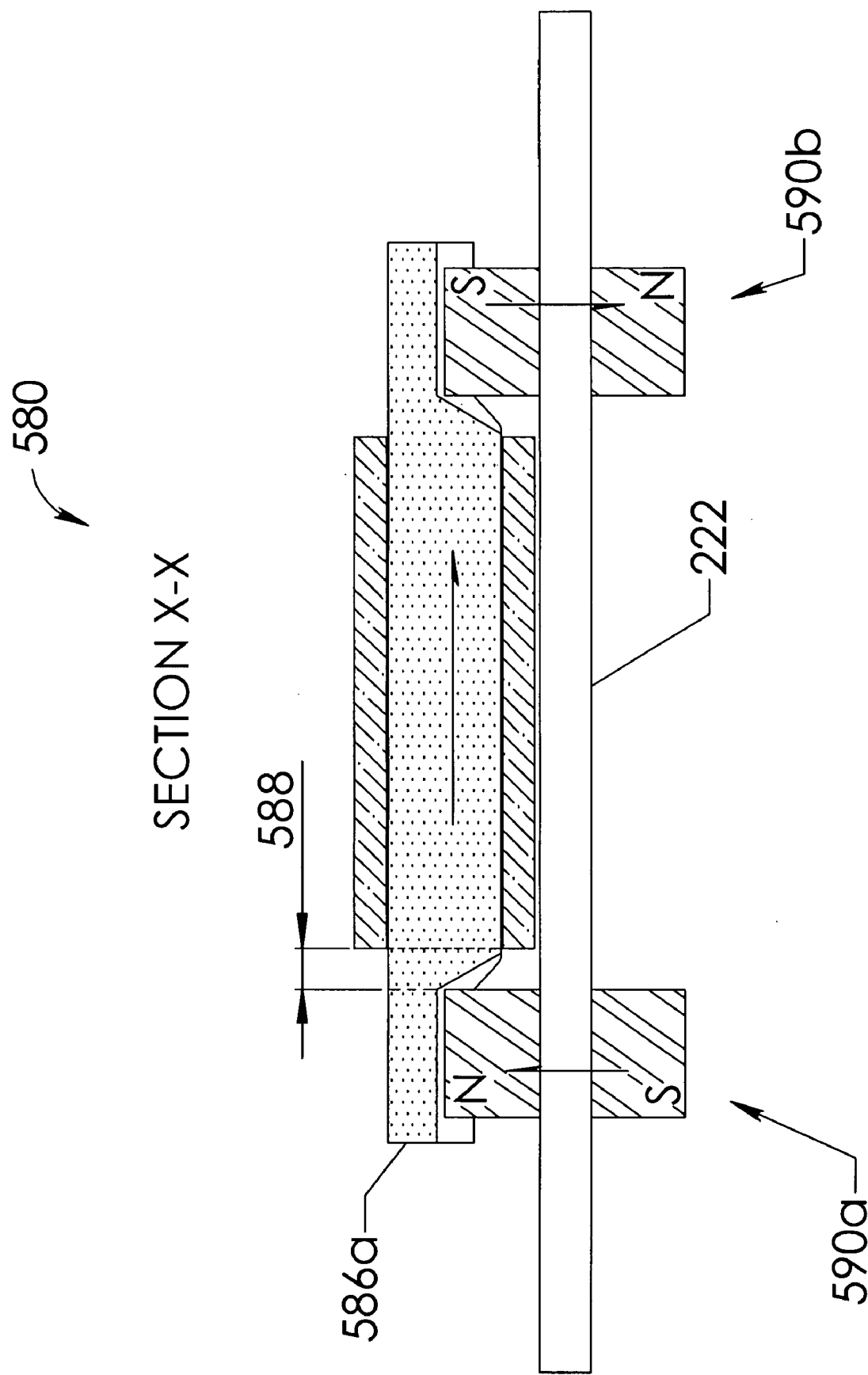

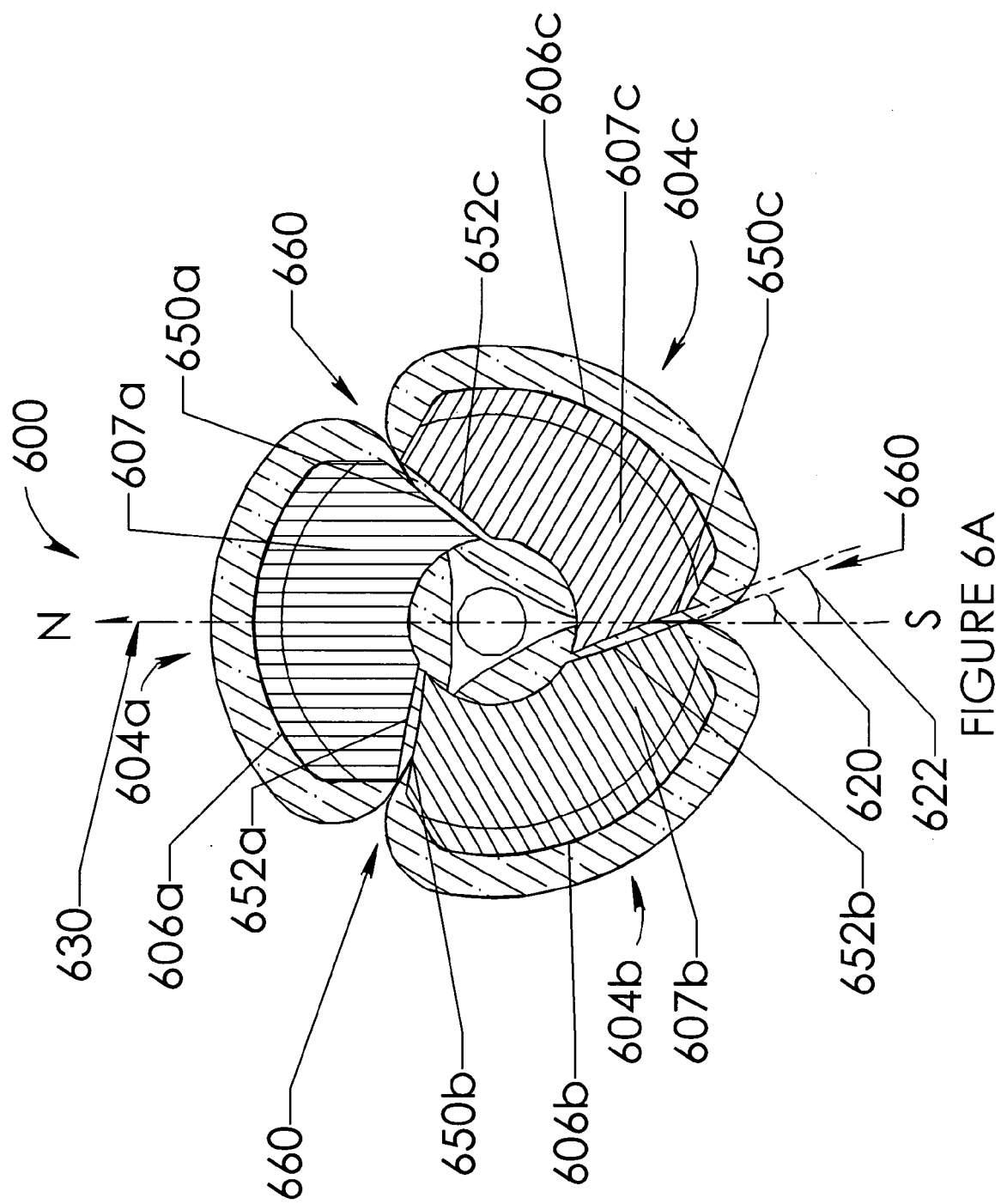

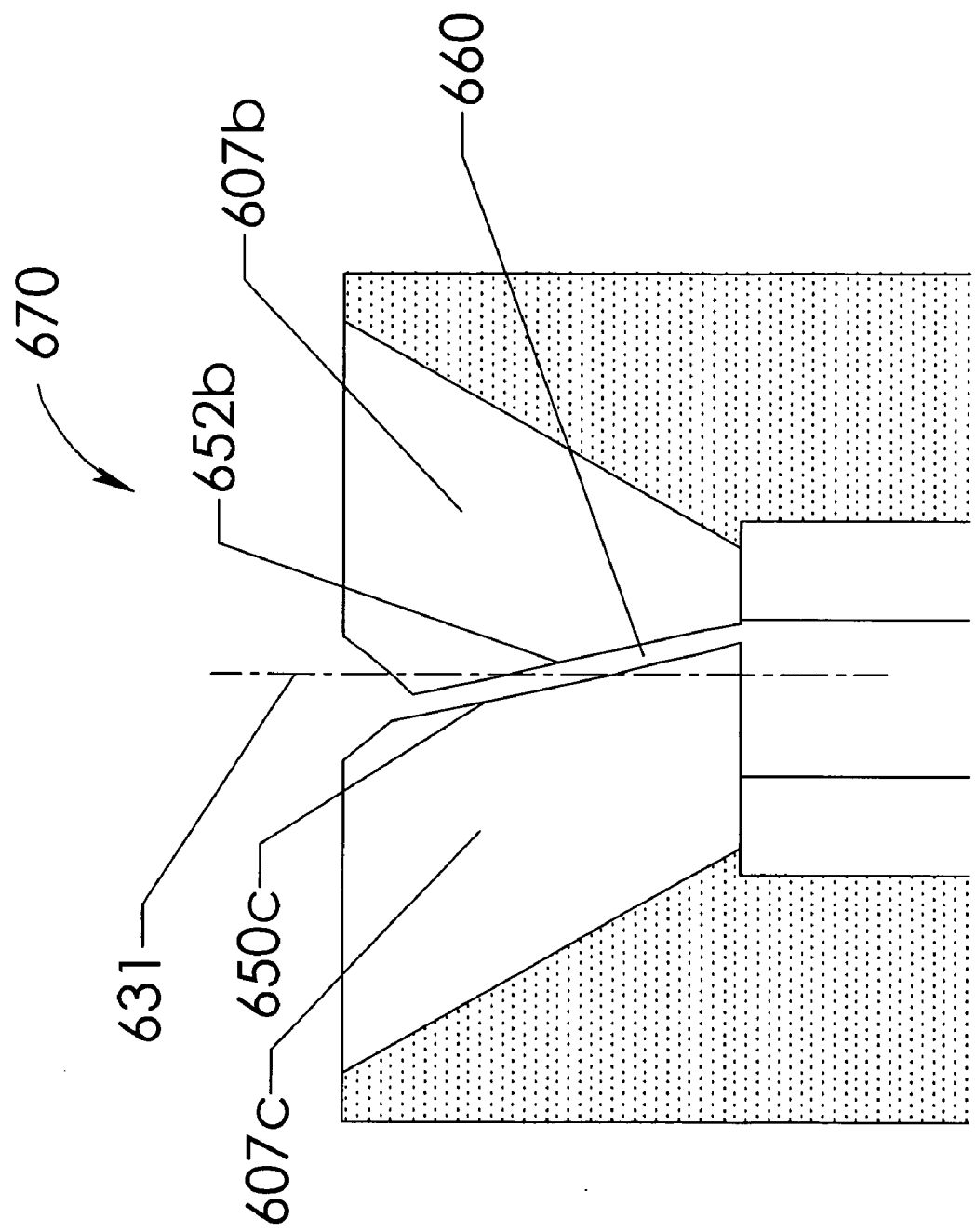

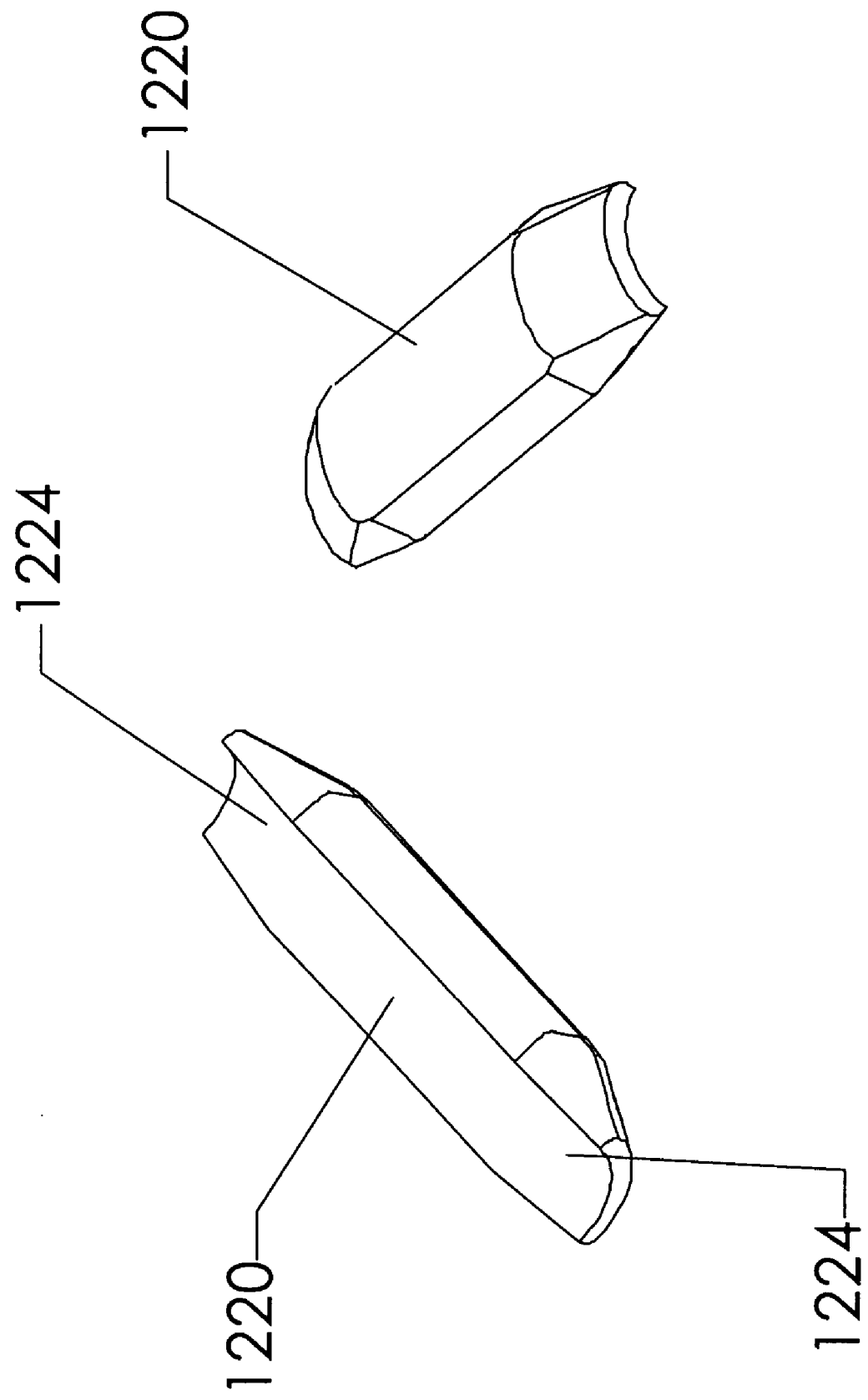

ROTOR-STATOR STRUCTURE FOR ELECTRODYNAMIC MACHINES

CROSS REFERENCE TO RELATED APPLICATION(S)

This application claims the benefit of U.S. Provisional Application No. 60/622,258, entitled "Rotor-Stator Structure for Electric Motors and Generators" and filed on Oct. 25, 2004 and is related to U.S. Nonprovisional application Ser. No. 11/021,417, entitled "Rotor-Stator Structure for Electrodynamic Machines," filed on Dec. 23, 2004, both of which are incorporated herein by reference in their entirety.

BRIEF DESCRIPTION OF THE INVENTION

This invention relates generally to electric motors, alternators, generators and the like, and more particularly, to a rotor-stator structure for motors that, for example, increases output torque per unit size (or per unit weight) either by minimizing the length of magnetic flux paths or by straightening those paths through field pole members, or both. Further, the rotor-stator structure conserves resources, such as reducing manufacturing costs, such as by minimizing wastage and by eliminating "back-iron" material.

BACKGROUND OF THE INVENTION

In traditional stator and rotor structures for fractional and sub-fractional horsepower motors, permanent magnets are often integrated into a rotor assembly that typically rotates in the same plane as a ferromagnetic stator structure that provides magnetic return paths for magnet and current-generated flux. Current-generated flux, which is also referred to as Ampere Turn ("AT")-generated flux, is generated by passing a current through a coil winding that is wrapped about a pole region of a stator member structure. While functional, conventional stator and rotor structures of these and other electric motors have several drawbacks, as are discussed next.

FIG. 1 illustrates a traditional electric motor exemplifying commonly-used stator and rotor structures. Electric motor 100 is a cylindrical motor composed of a stator structure 104, a magnetic hub 106 and a shaft 102. The rotor structure of motor 100 includes one or more permanent magnets 110, all of which are attached via magnetic hub 106 to shaft 102 for rotation within stator structure 104. Stator structure 104 typically includes field poles 118, each having a coil winding 112 (only one is shown) that is wound about each field pole 118. Stator structure 104 includes slots 108 used in part to provide a wire passage for winding coil wire about stator field poles 118 during manufacturing. Slots 108 also provide magnetic separation between adjacent field poles 118. Stator structure 104 includes a peripheral flux-carrying segment 119 as part of magnetic return path 116. In many cases, stator structure 104 is composed of laminations 114, which typically are formed from isotropic (e.g., non-grain oriented), magnetically permeable material. Magnetic return path 116, which is one of a number of magnetic return paths in which permanent magnet-generated flux and AT-generated flux is present, is shown as being somewhat arcuate in nature at peripheral flux-carrying segment 119 but includes relatively sharp turns into the field pole regions 118.

One drawback of traditional electric motors, including electric motor 100, is that magnetic return path 116 requires a relatively long length for completing a magnetic circuit for flux emanating from one rotor magnet pole 110 and traversing via magnetic return path 116 to another rotor magnet pole 110. Furthermore, magnetic return path 116 is not a straight line, which is preferred for carrying magnetic flux. As shown, magnetic return path 116 has two ninety-degree turns in the stator path. Magnetic return path 116 turns once from field pole region 118 to peripheral flux-carrying segment 119, and then again from peripheral flux-carrying segment 119 to another field pole region 118. Both of these turns are suboptimal for carrying flux efficiently. As implemented, magnetic return path 116 requires more material, or "back-iron," than otherwise is necessary for carrying such flux between field poles. Consequently, magnetic return paths 116 add weight and size to traditional electric motors, thereby increasing the motor form factor as well as cost of materials to manufacture such motors.

Another drawback of conventional electric motors is that laminations 114 do not effectively use anisotropic materials to optimize the flux density and reduce hysteresis losses in flux-carrying poles, such as through field poles 118, and stator regions at peripheral flux-carrying segment 119. In particular, peripheral flux-carrying segment 119 includes a non-straight flux path, which limits the use of such anisotropic materials in minimizing hysteresis losses (or "iron losses"). Hysteresis is the tendency of a magnetic material to retain its magnetization. "Hysteresis loss" is the energy required to magnetize and demagnetize the magnetic material constituting the stator regions, wherein hysteresis losses increase as the amount of magnetic material increases. As magnetic return path 116 has one or more turns of ninety-degrees or greater, the use of anisotropic materials, such as grain-oriented materials, cannot effectively reduce hysteresis losses because the magnetic return path 116 in peripheral flux-carrying segment 119 would cut across the directional orientation of laminations 114. For example, if direction 120 represents the orientation of grains for laminations 114, then at least two portions of magnetic return path 116 traverse across direction 120 of the grain, thereby retarding the flux density capacity of those portions of stator peripheral flux-carrying segment 119. Consequently, anisotropic materials generally have not been implemented in structures similar to stator structure 104 since the flux paths are usually curvilinear rather than straight, which limits the benefits provided by using such materials.

Yet another drawback of conventional electric motors is the relatively long lengths of magnetic return path 116. Changing magnetic fields, such as those developed at motor commutation frequencies, can cause eddy currents to develop in laminations 114 in an orientation opposing the magnetic field inducing it. Eddy currents result in power losses that are roughly proportional to a power function of the rate at which the magnetic flux changes and roughly proportional to the volume of affected lamination material.

Other drawbacks of commonly-used electric motors include the implementation of specialized techniques for reducing "cogging," or detent torque, that are not well-suited for application with various types of electric motor designs. Cogging is a non-uniform angular torque resulting in "jerking" motions rather than a smooth rotational motion. This effect usually is most apparent at low speeds and applies additive and subtractive torque to the load when field poles 118 are at different angular positions relative to magnet poles. Further, the inherent rotational accelerations and decelerations cause audible vibrations.

In another type of electric motor, magnetic poles are positioned at relatively large diameters about (or radial distances from) a rotor shaft. These magnetic poles, as well as the permanent magnets giving rise to those magnetic poles, are typically arranged coaxially about the shaft, with adjacent magnetic poles alternating in polarity. An armature disk usually supports the permanent magnets as separate, non-monolithic magnets in a plane perpendicular to the rotor shaft. Structures such as this are designed based on a certain tenet of electric motor design. According to this tenet, an increase in output torque is achieved by increasing the radial distance between the magnetic poles and the rotor shaft. Consequently, the magnetic poles of this type of electric motor are increasingly being positioned at larger distances from the rotor shaft to increase the torque arm distance from the axis of rotation to the air gaps, thereby increasing the output torque. A drawback to this approach is that additional materials are consumed in forming larger motor structures to accommodate the larger torque arm distance, such as those structures that are used to form magnetic flux return paths. These magnetic flux return paths are typically formed using "back-iron" to complete a larger flux path, which is generally circuitous in nature. By adding back-iron to complete a magnetic circuit, the magnetic material volume through which the magnetic flux passes increases, which detrimentally tends to increase the hysteresis and eddy current losses, both of which can be collectively referred to as "core losses." Further, the addition of back-iron to complete a magnetic circuit increases the length of the magnetic flux path, thereby exacerbating core losses. Another drawback to motors of this type is that the motor volume increases as the magnetic poles are positioned farther from the shaft, which, in turn, limits the available applications and uses for this type of motor.

"Back-iron" is a term commonly used to describe a physical structure (as well as the materials giving rise to that physical structure) that is often used to complete an otherwise open magnetic circuit. Back-iron structures are generally used only to transfer magnetic flux from one magnetic circuit element to another, such as either from one magnetically permeable field pole to another, or from a magnet pole of a permanent magnet to a magnet pole of another permanent magnet, or both. Further, "back-iron" structures are not generally formed to accept an associated ampere-turn generating element, such as one or more coils.

In view of the foregoing, it would be desirable to provide a rotor-stator structure that minimizes the above-mentioned drawbacks in electric motors and generators, and to increase output torque and efficiency either on a per unit size or per unit weight basis, or both, as well as to conserve resources during manufacturing and/or operation.

SUMMARY OF THE INVENTION

A system, apparatus and method are disclosed for implementing an exemplary rotor-stator structure for use in electrodynamic machines, such as electric motors, generators, alternators, and the like. According to one embodiment of the present invention, a rotor-stator structure for electrodynamic machines includes cylindrical magnets having cylindrical surfaces arranged axially on an axis of rotation. The cylindrical magnets, for example, can include two cylindrical magnets being positioned so that the directions of polarization of the two cylindrical magnets are in substantially opposite directions. The rotor-stator structure also can include field pole members arranged coaxially to the axis. The field pole members can have flux interaction surfaces formed at the ends of the field pole members adjacent to portions of the cylindrical magnet surfaces that confront the flux interaction surfaces. The flux interaction surfaces and the portions of the cylindrical magnet surfaces define air gaps. Further, the flux interaction surfaces are configured to magnetically couple the field pole members to the cylindrical magnets. Notably, the flux interaction surfaces in some embodiments are contoured to maintain a substantially uniform thickness for each of the air gaps to increase flux interaction between the cylindrical magnets and the field pole members, thereby increasing output torque. In at least one embodiment, the air gaps can have an arc-shaped cross section in a plane perpendicular to said axis of rotation. For instance, cross-sections of the upper and lower boundaries that define the air gaps can align with a segment of the circumference of a circle about the shaft in that plane.

In some embodiments, the rotor-stator structure also includes a shaft on which the cylindrical magnets are affixed, with the shaft defining the axis of rotation and extending through each of the cylindrical magnets. In at least one embodiment, at least one of the field pole members is a substantially straight field pole member configured to provide a substantially straight flux path between a first flux interaction surface and a second flux interaction surface. The substantially straight flux path can be associated with a reluctance lower than that associated with a non-straight flux path extending from the first flux interaction surface to the second flux interaction surface. As an example, the non-straight flux path includes a subsequent flux path segment deviating at an angle of about ninety degrees from a precedent flux path segment, both the subsequent and the precedent flux path segments being consecutive. The flux interaction surfaces each have a surface area dimensioned to generate maximum torque output. In particular, the surface area can be dimensioned as a function of at least the peripheral distances between the field pole members to provide maximum magnetic coupling between the cylindrical magnets and the field pole members while at least minimizing leakage between the field pole members. In at least one embodiment, a plurality of normal vectors orthogonal to portions of the flux interaction surfaces can define the substantially uniform thickness of the air gaps. As such, the normal vectors each generally have a substantially uniform length and terminate at portions of the cylindrical surfaces. For example, each of the normal vectors is generally orthogonal to respective portions of the cylindrical surfaces. But there are at least two normal vectors that are not parallel to each other (e.g., with respect to curved surfaces), especially when those two normal vectors reside in a plane perpendicular to the axis of rotation. In some cases, those portions of the flux interaction surfaces and the cylindrical surfaces are representative of points on respective contoured surfaces of the flux interaction surfaces and of the cylindrical surfaces. In at least one embodiment, the plurality of normal vectors orthogonal to portions of the flux interaction surfaces can define a non-uniform thickness for the air gaps. In at least one case, the pole faces confronting the air gaps are contoured to provide non-uniform air gap thicknesses. An example of a pole face giving rise to a non-uniform air gap thickness is one that has a surface lying substantially in a single, relatively flat plane (e.g., resulting from a straight cut during manufacturing of the field pole member).

Each of the field pole members of the rotor-stator structure can further include laminations such that a medial plane extending in an axial direction divides a quantity of the laminations approximately in half so that on one side of the medial plane laminations generally decrease in at least one dimension as the laminations are positioned farther from the medial plane. The laminations can be formed from a substrate composed of a magnetically permeable material in configurations that reduce wastage of the magnetically permeable material. Note that at least one of the laminations can be anisotropic. In one embodiment, each of the field pole members of the rotor-stator structure can further include magnetically permeable materials that are dimensioned to have variable cross-sections as viewed in the axial direction. Such dimensions may be defined to aid in controlling detent torque, reduce eddy current losses, reduce manufacturing costs, or effectuate all of the foregoing. Note that at least one of the variable dimensioned portions can be anisotropic or any kind of material. In some cases, the variable dimensioned portions may include the same or different material as the pole shoes and/or faces.

In at least one embodiment, each of the flux interaction surfaces further includes a skewed flux interaction surface to skew field pole gaps between adjacent field pole members, thereby minimizing detent torque. In some cases, the skewed flux interaction surface includes a first edge defining a first side of a field pole gap and a second edge defining a second side of another field pole gap, whereby the first edge and the second edge maintain angles that do not align with a direction of polarization of at least one of the cylindrical magnets, wherein one first edge of a first field pole member and one second edge of a second field pole member form a field pole gap.

Each of the field pole members of the rotor-stator structure can include a central field pole member portion having an outer peripheral surface coextensive with a portion of a circle about the axis of rotation to decrease a volumetric dimension of the rotor-stator structure. At least one of the field pole members also can include a coil wound about it to form at least one active field pole member. The directions of polarization of the rotor structure can include a first direction of polarization and a second direction of polarization, whereby one cylindrical magnet of the cylindrical magnets is oriented to have the first direction of polarization and another cylindrical magnet of the cylindrical magnets is oriented to have the second direction of polarization. The first direction of polarization generally is set at a polarization angle from the second direction of polarization to minimize detent torque, the polarization angle being any angle from about 150 degrees to 180 degrees.

In a specific embodiment, the rotor-stator structure is configured to generate magnetic flux paths consisting essentially of the first cylindrical magnet, the second cylindrical magnet, the field pole members, and two or more air gaps, wherein each of the first cylindrical magnet and the second cylindrical magnet is a monolithic magnet. In some cases, one or more of the field pole members can be composed of magnetically permeable material that is continuous from one end of each field pole member to the other end, and at least a portion that is configured to accept an element for generating ampere-turn ("AT") flux. Similarly, each of the cylindrical magnets can be composed of continuous magnet material.

Generally, a quantity of the one or more of the field pole members is independent of a number of magnet poles of the cylindrical magnets. There is no general requirement that the number of magnet poles be the same as the number of field pole members. The field pole members can include one or more of silicon-iron alloys, nickel-iron alloys, cobalt-nickel alloys, steel alloys, iron alloys, magnetic-powdered alloys, and/or soft magnetic composites. The cylindrical magnets are generally permanent magnets that include one or more of the following: neodymium iron ("NdFe"), one or more rare earth magnet materials, and/or one or more ceramic magnet materials. In one aspect, one or more field pole members can be shaped to minimize manufacturing complexity associated with winding the coil on the at least one field pole member by avoiding winding the coil either via a slot or onto an intermediate structure. The coil can extend substantially the length of the at least one active field pole member in an axial direction to reduce flux leakage from the peripheries of the at least one active field pole member. In at least one embodiment, each of the field pole members has laminations and a central field pole member portion between the first flux interaction surface and the second flux interaction surface. The central field pole member portion can have an outer peripheral surface circumscribed by at least a portion of a circle about the axis of rotation such that at least two of the laminations have cross-sections that are of different dimensions.

According to another embodiment of the present invention, a rotor-stator structure for electrodynamic machines has an axis and can include at least a rotor assembly in which is mounted at least two substantially cylindrical magnets arranged axially on the rotor assembly axis and being spaced apart from each other. The cylindrical magnets have regions of predetermined magnetic polarization. Each of the cylindrical magnets has confronting cylindrical magnetic surfaces of principal dimension substantially parallel to the axis. The cylindrical magnets are arranged in relation to the axis in a manner that orients the magnetic polarizations in substantially opposite directions. The magnetic polarizations can be described as lying within planes passing through the cylindrical magnet surfaces while being substantially perpendicular to the axis. The rotor-stator structure also includes field pole members arranged coaxial to the axis with flux interaction surfaces being formed at the ends of the field pole members. The flux interaction surfaces are generally located adjacent the confronting magnetic surfaces, which can be coextensive with the principal dimension thereof. The flux interaction surfaces and the confronting magnetic surfaces generally define functioning air gaps. Each of the field pole members should be magnetically permeable. Each of the field pole members can be substantially straight. The flux interaction surfaces are configured to magnetically couple the field pole members to the cylindrical magnets. In a specific embodiment, each of the flux interaction surfaces further includes a skewed flux interaction surface to skew field pole gaps between adjacent field pole members, thereby minimizing detent torque. In one embodiment, the rotor-stator structure is configured to limit magnetic flux paths to traverse only through two of the cylindrical magnets, the field pole members, the flux interaction surfaces, and the air gaps.

The rotor-stator structure can further include a coil wound about at least one of the field pole members to form active field pole members. Further, the rotor-stator structure can exclude back-iron. Excluding back-iron reduces magnetic losses as well as decreases the amount of materials used to manufacture an electrodynamic machine. Note that either the field pole members can be configured to rotate about the axis relative to the cylindrical magnets or the cylindrical magnets can be configured to rotate about the axis relative to the field pole members. In one embodiment, each of the substantially straight field pole members is configured to minimize linear deviations in a flux path extending from a surface portion of a first flux interaction surface to a surface portion of a second flux interaction surface, the path segment terminating at the surface portions. For example, the amount of deviations and the degree at which flux deviates from a line can be reduced to avoid sudden or relatively sharp turns in the flux path. In one instance, one cylindrical magnet of the cylindrical magnets has a first direction of polarization and another cylindrical magnet of the cylindrical magnets has a second direction of polarization. The first direction of polarization can be at a polarization angle different from the second direction of polarization to minimize detent torque, with the polarization angle being any angle from about 150 degrees to 180 degrees. For example, the first direction can be at a polarization angle of about 150 degrees to 180 degrees from the second direction.

According to yet another embodiment of the present invention, a rotor-stator structure for electrodynamic machines includes a shaft defining an axis of rotation and having a first end portion, a central portion and a second end portion. The rotor-stator structure can also include at least a first magnet structure and a second magnet structure, each having one or more magnet surfaces. The first magnet structure and the second magnet structure each is affixed coaxially on the shaft so that the direction of polarization of the one or more magnet surfaces of the first magnet structure are in substantially opposite directions than the direction of polarization of the one or more magnet surfaces of the second magnet structure. The rotor-stator structure further includes a plurality of sets of windings and a number of field pole members arranged substantially coaxial to the shaft. Each of the field pole members can include a number of laminations. Each of the field pole members has a first pole shoe at a first field pole member end and a second pole shoe at a second field pole member end. The first pole shoe is positioned to be adjacent to a portion of the first magnet structure to form a first flux interaction region and the second pole shoe is positioned to be adjacent to a portion of the second magnet structure to form a second flux interaction region.

Both of the first flux interaction region and the second flux interaction region include air gaps. Each of the air gaps can generally have a substantially uniform thickness and can have an arc-shaped cross section in a plane perpendicular to the axis of rotation. An arc can be described as a segment of the circumference of a circle. In one embodiment, pole faces of the field pole members in the first and second flux interaction regions are not arc-shaped but rather are be relatively flat. In particular, the relatively flat surfaces of the pole faces generally confront the contours of the adjacent magnet surface when viewed in cross-sections in planes that includes the axis. Each of the field pole members also has at least a central field pole member portion around which a set of the plurality of sets of windings can be wound. Each of the first and the second pole shoes includes a transition region connecting each of the first field pole member end and the second field pole member end at a nonorthogonal angle with the central field pole member portion. This reduces reluctance for a flux path between the central field pole member portion and either the first or the second pole shoe, or both. The transition region includes a transitory flux path for providing an acute angle from or to a first flux path segment associated with the central field pole member portion and for providing at the same or a different acute angle from or to a second flux path segment associated with either of the first and the second pole shoes. In some cases, the acute angles are between approximately 0 and 60 degrees from, for example, the direction of the flux path.

In one embodiment, the first magnet structure and the second magnet structure each are dipole magnets, one magnet surface of the first magnet structure having a north pole pointing in a first direction and one magnet surface of the second magnet structure having a north pole pointing in a second direction, the first and the second directions differing by an angle between 150 to 180 degrees, wherein each of the dipole magnets is monolithic. In some embodiments, the first magnet structure and the second magnet structure each are multipole magnets, the one or more magnet surfaces of the first magnet structure include a plurality of north poles and south poles, one of which is pointing in a first direction and the one or more magnet surfaces of the second magnet structure include a plurality of north poles and south poles, one of which is pointing in a second direction, the first and the second directions differing by an angle between 150 to 180 degrees. The first magnet structure and the second magnet structure can include separate magnets each having interfaces contiguous with other separate magnets without any intervening structure. In various embodiments, the first magnet structure and the second magnet structure include either one or more cylinder-shaped magnets each having a cylindrical surface or one or more cone-shaped magnets each having a conical surface, or both. In one embodiment, the one or more magnet surfaces each comprise discrete regions of magnetization, and the first magnet structure and the second magnet structure each comprises a magnet support configured to support the discrete regions of magnetization at principal dimensions either at an acute angle to the axis or parallel to the axis, or both, the magnet support being affixed to the shaft.

The rotor-stator structure can be configured to either receive electrical power as an electrical current into the at least one coil for implementing an electric motor or to receive mechanical power as rotational motion about the axis for implementing an electric generator. Or, the rotor-stator structure can be configured to implement either a compound motor or a series motor, or both, if the rotor-stator structure is implemented within the electric motor, and is further configured to implement either a compound generator or a series generator, or both, if the rotor-stator structure is implemented within the electric generator According to at least one embodiment, an exemplary rotor-stator structure can be disposed within an electric motor to provide more output torque deliverable by such a motor relative to conventional electric motors of the same size and/or weight. In one embodiment, a rotor-stator structure provides a relatively shorter and straighter magnetic path, and a more efficient use of materials than traditional stator-rotor structures for electrodynamic machines. In cases where anisotropic (e.g., grain-oriented materials) magnetically permeable materials are used to form field pole members of specific embodiments of the present invention, the inherent magnetic properties of such materials contribute to an increase of flux density in flux-carrying regions. Note that these materials may or may not be used to form laminations. The elimination or at least reduction of exterior return paths, such as those return paths traditionally implemented using back-iron, therefore saves weight and reduces the overall size of electrodynamic machines implementing various embodiments of the rotor-stator structure of the present invention. In another embodiment, a stator-rotor structure provides a greater motor efficiency than a similarly-sized conventional motor with the same output torque. This efficiency increase is due, at least in part, to lower resistance windings, which translates to lower current-squared-times-resistance (i.e., $I^2 \ast R$) power losses while producing the same ampere turn-generated flux created in similarly-sized packages or motor housings of traditional motors. Further, the rotor-stator structure of the present invention is less complex (e.g., in the coil winding process) and less costly (e.g., due to conservation of materials) to manufacture than conventional motors.

BRIEF DESCRIPTION OF THE FIGURES

The invention is more fully appreciated in connection with the following detailed description taken in conjunction with the accompanying drawings, in which:

FIGS. 5A and 5B depict sectional views illustrating an exemplary magnetic flux path, according to at least one embodiment of the present invention;

FIGS. 5E and 5F depict sectional views illustrating an exemplary magnetic flux path in another rotor-stator structure, according to an embodiment of the present invention;

FIGS. 6A and 6B illustrate an end view of another exemplary rotor-stator structure, according to another embodiment of the present invention;

FIG. 6C depicts a partial sectional view of the rotor-stator structure of FIGS. 6A and 6B, according to one embodiment of the present invention;

FIGS. 12A to 12D illustrate another rotor-stator structure that implements cylindrical magnets in accordance with various embodiments of the present invention;

Like reference numerals refer to corresponding parts throughout the several views of the drawings. Note that most of the reference numerals include one or two left-most digits that generally identify the figure that first introduces that reference number.

DETAILED DESCRIPTION OF EXEMPLARY EMBODIMENTS

Definitions

Figure 1:
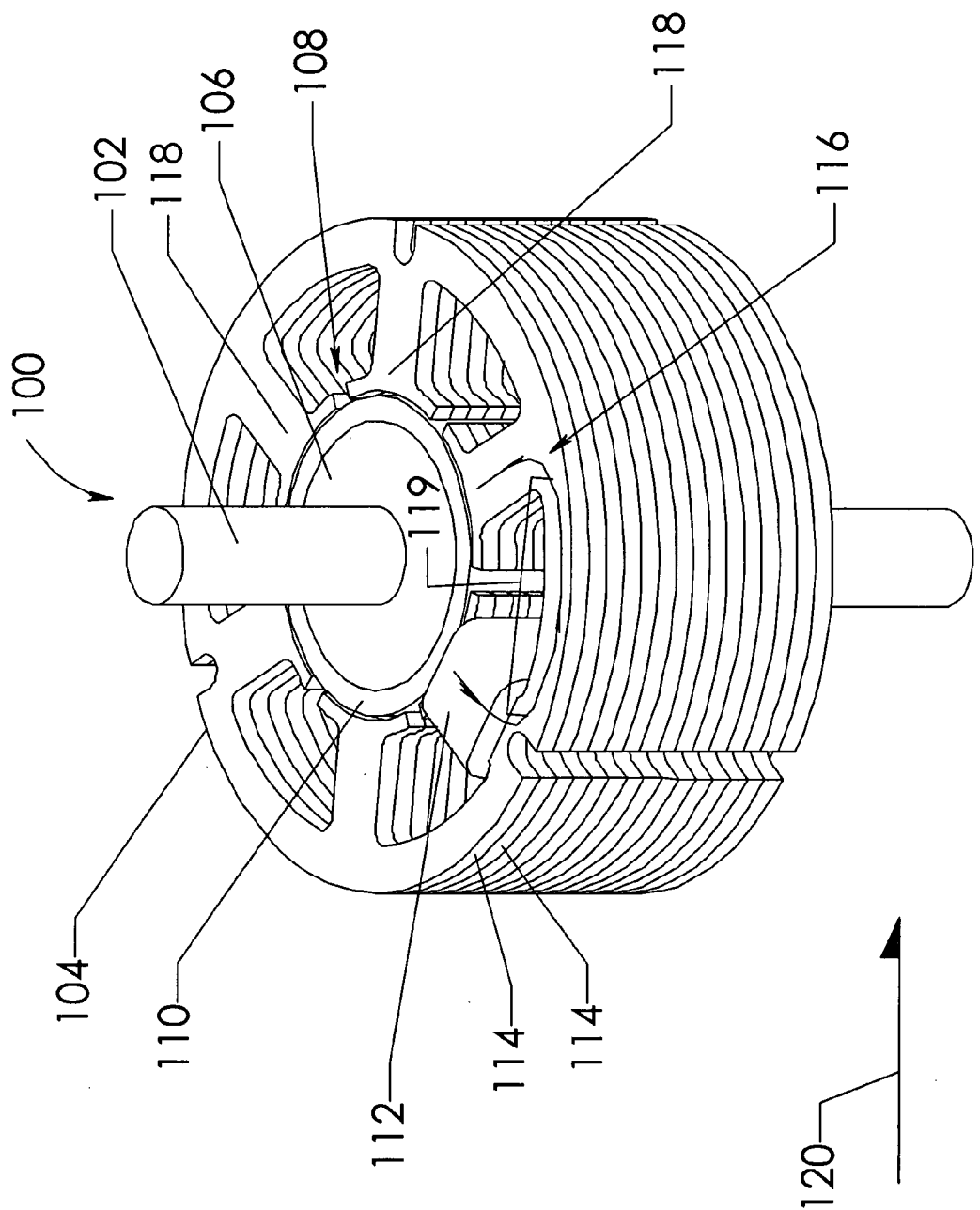
FIG. 1 exemplifies commonly-used stator and rotor structures implemented in a traditional electric motor.

The following definitions apply to some of the elements described with respect to some embodiments of the invention. These definitions may likewise be expanded upon herein.

As used herein, the term "air gap" refers to a space, or a gap, between a magnet surface and a confronting pole face. Such a space can be physically described as a volume bounded at least by the areas of the magnet surface and the pole face. An air gap functions to enable relative rotation between a rotor and a stator, and to define a flux interaction region. Although an air gap is typically filled with air, it need not be so limiting.

As used herein, the term "back-iron" commonly describes a physical structure (as well as the materials giving rise to that physical structure) that is often used to complete an otherwise open magnetic circuit. In particular, back-iron structures are generally used only to transfer magnetic flux from one magnetic circuit element to another, such as either from one magnetically permeable field pole member to another, or from a magnet pole of a first magnet to a magnet pole of a second magnet, or both, without an intervening ampere-turn generating element, such as coil, between the field pole members or the magnet poles. Furthermore, back-iron structures are not generally formed to accept an associated ampere-turn generating element, such as one or more coils.

As used herein, the term "coil" refers to an assemblage of successive convolutions of a conductor arranged to inductively couple to a magnetically permeable material to produce magnetic flux. In some embodiments, the term "coil" can be described as a "winding" or a "coil winding."

As used herein, the term "coil region" refers generally to a portion of a field pole member around which a coil is wound.

As used herein, the term "core" refers to a portion of a field pole member where a coil is normally disposed between pole shoes and is generally composed of a magnetically permeable material for providing a part of a magnetic flux path.

As used herein, the term "field pole member" refers generally to an element composed of a magnetically permeable material and being configured to provide a structure around which a coil can be wound (i.e., the element is configured to receive a coil for purposes of generating magnetic flux). In some embodiments, a field pole member includes a core (i.e., core region) and at least two pole shoes, each of which is generally located at or near a respective end of the core. But note that in other embodiments, a field pole member includes a core and only one pole shoe. Without more, a field pole member is not configured to generate ampere-turn flux. In some embodiments, the term "field pole member" can be described generally as a "stator-core." In some embodiments, a field pole member generally has an elongated shape such that the length of the field pole member (e.g., the distance between the ends of the field pole member) is generally greater than its width (e.g., the width of the core).

As used herein, the term "active field pole member" refers to an assemblage of a core, one or more coils, and at least one pole shoe. In particular, an active field pole member can be described as a field pole member assembled with one or more coils for selectably generating ampere-turn flux. In some embodiments, the term "active field pole member" can be described generally as a "stator-core member."

As used herein, the term "ferromagnetic material" refers to a material that generally exhibits hysteresis phenomena and whose permeability is dependent on the magnetizing force. Also, the term "ferromagnetic material" can also refer to a magnetically permeable material whose relative permeability is greater than unity and depends upon the magnetizing force.

As used herein, the term "field interaction region" refers to a region where the magnetic flux developed from two or more sources interact vectorially in a manner that can produce mechanical force and/or torque relative to those sources. Generally, the term "flux interaction region" can be used interchangeably with the term "field interaction region." Examples of such sources include field pole members, active field pole members, and/or magnets, or portions thereof. Although a field interaction region is often referred to in rotating machinery parlance as an "air gap," a field interaction region is a broader term that describes a region in which magnetic flux from two or more sources interact vectorially to produce mechanical force and/or torque relative to those sources, and therefore is not limited to the definition of an air gap (i.e., not confined to a volume defined by the areas of the magnet surface and the pole face and planes extending from the peripheries between the two areas). For example, a field interaction region (or at least a portion thereof) can be located internal to a magnet.

As used herein, the term "generator" generally refers to an electrodynamic machine that is configured to convert mechanical energy into electrical energy regardless of, for example, its output voltage waveform. As an "alternator" can be defined similarly, the term generator includes alternators in its definition.

As used herein, the term "magnet" refers to a body that produces a magnetic field external to itself. As such, the term magnet includes permanent magnets, electromagnets, and the like.

As used herein, the term "motor" generally refers to an electrodynamic machine that is configured to convert electrical energy into mechanical energy.

As used herein, the term "magnetically permeable" is a descriptive term that generally refers to those materials having a magnetically definable relationship between flux density ("B") and applied magnetic field ("H"). Further, "magnetically permeable" is intended to be a broad term that includes, without limitation, ferromagnetic materials, powder metals, soft magnetic composites ("SMCs"), and the like.

As used herein, the term "pole face" refers to a surface of a pole shoe that faces at least a portion of the flux interaction region (as well as the air gap), thereby forming one boundary of the flux interaction region (as well as the air gap). In some embodiments, the term "pole face" can be described generally as either a "stator surface" or at least a portion of a "flux interaction surface," or both.

As used herein, the term "pole shoe" refers to that portion of a field pole member that facilitates positioning a pole face so that it confronts a rotor (or a portion thereof), thereby serving to shape the air gap and control its reluctance. The pole shoes of a field pole member are generally located near each end of the core starting at or near a coil region and terminating at the pole face. In some embodiments, the term "pole shoe" can be described generally as a "stator region."

As used herein, the term "soft magnetic composites" ("SMCs") refers to those materials that are comprised, in part, of insulated magnetic particles, such as insulation-coated ferrous powder metal materials that can be molded to form an element of the rotor-stator structure of the present invention.

As used herein, the term "transition region" refers to an optional portion of a pole shoe that facilitates offsetting or diverting a segment of a flux path (e.g., within a core region) to another segment of the flux path (e.g., within a pole shoe). One or more pole shoes can implement transition regions to improve motor volumetric utilization (e.g., by placing coils in a compact configuration nearer to an axis of rotation). Specifically, the transition region keeps the reluctance of the field pole member relatively low while facilitating compaction of the elements constituting an electrodynamic machine. Such elements include shafts, field pole members, magnets and the like.

Discussion

Figure 2A:
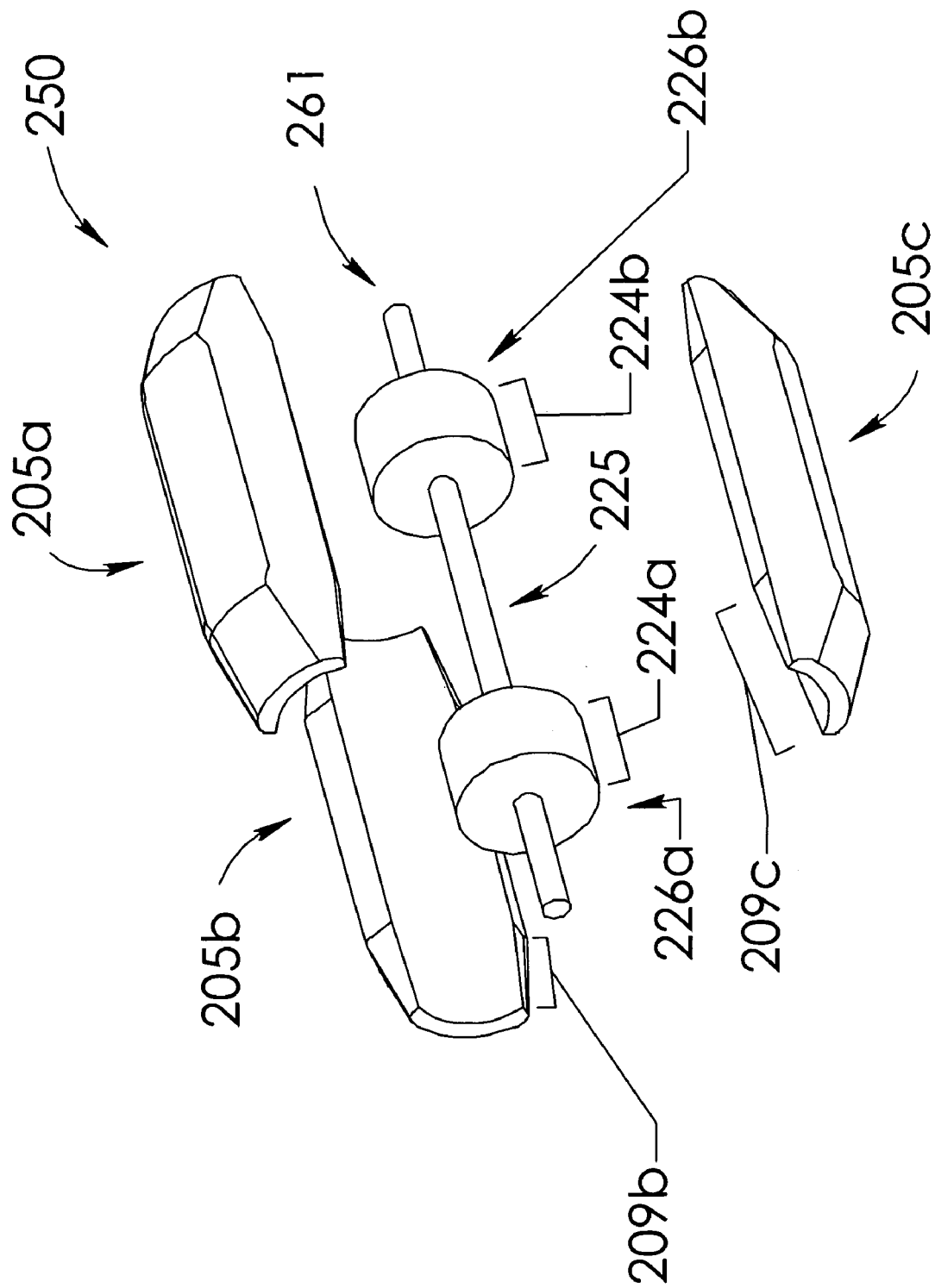
FIG. 2A is an exploded view of exemplary rotor-stator structure implementing cylindrical magnets, according to one embodiment of the present invention.

FIG. 2A is an exploded view of an exemplary rotor-stator structure in accordance with a specific embodiment of the present invention. FIG. 2A depicts a rotor assembly 261 including at least two cylindrical magnets 226a and 226b mounted on or affixed to a shaft 225, each of cylindrical magnets 226a and 226b having magnet surfaces (or at least portions thereof) 224a and 224b, respectively, that are cylindrical. In various embodiments of the present invention, shapes other than cylinders, such as cones, can be implemented to practice rotor-stator structure 250. FIG. 2A also depicts field pole member 205a, 205b, and 205c respectively having pole faces 209a, 209b, and 209c for confronting portions of magnet surface 224a. Note that not all pole faces are shown or identified.

In various embodiments, each of field pole members 205 is configured to increase torque generated per unit size (or per unit weight) for electric motor implementations by at least minimizing the length of magnetic flux paths through field pole members. Further, field pole members 205 provide straight or substantially straight flux paths (or segments thereof) to minimize linear deviations of the magnetic flux. Typically, the path segments are generally parallel to the axis of rotation. So by implementing straight or substantially straight paths, each of those field pole members provide a relatively low reluctance flux path as compared to conventional magnetic return path designs that require magnetic flux to turn sharply about the periphery, such as at an angle of ninety-degrees (or thereabout), between field pole regions. As such, rotor-stator structures in some embodiments can implement straight or substantially straight paths to enable electrodynamic machines to operate with reduced magnetic losses and increased efficiency. Various alternate embodiments and features of the rotor-stator structure of the present invention are described next. The following description is applicable to magnets having other shapes than or equivalents to conical and/or cylindrical magnet shapes.

Figure 2B:
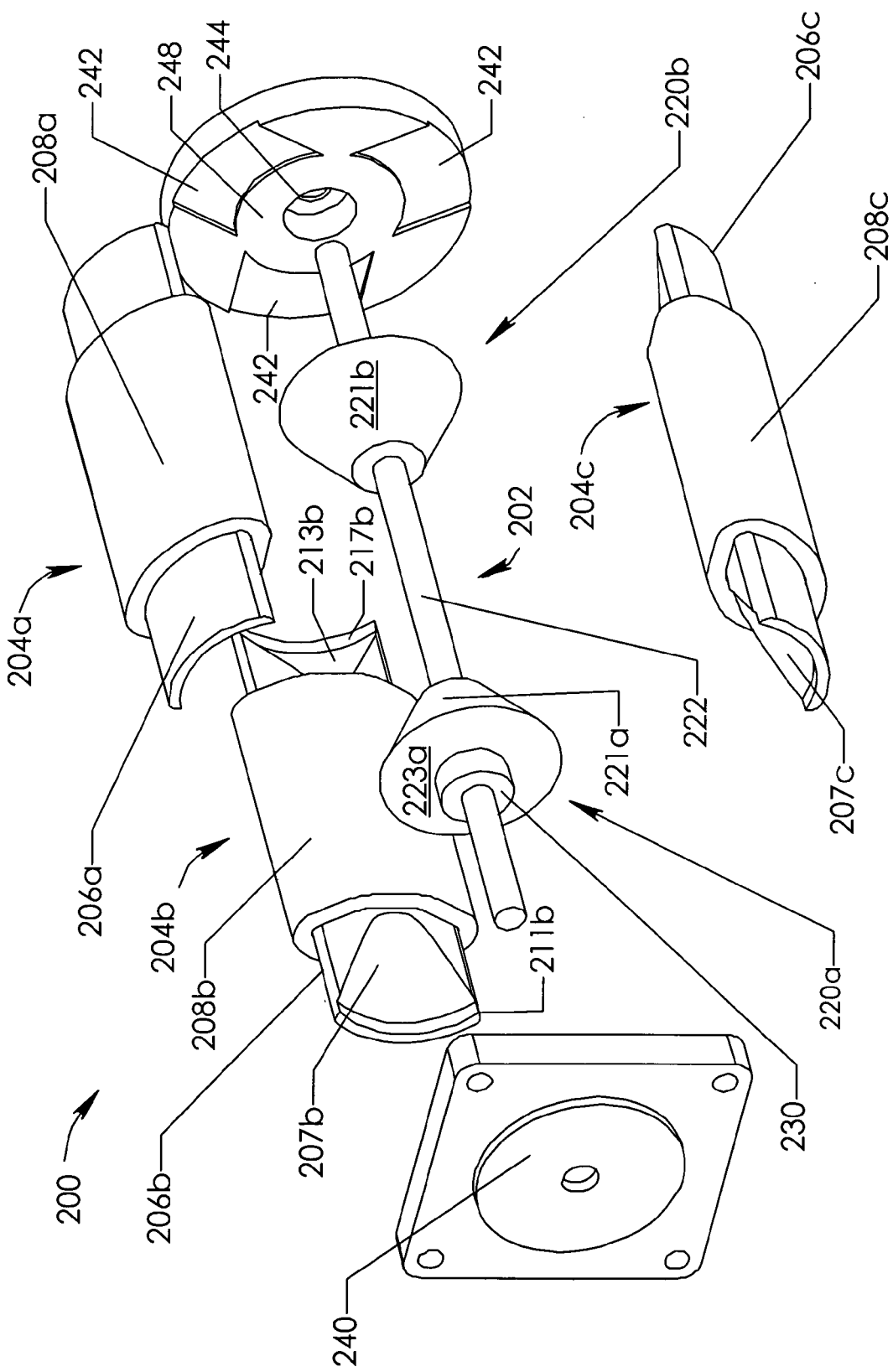
FIG. 2B is an exploded view of an exemplary rotor-stator structure in which the magnets are conical in shape, according to one embodiment of the present invention.

FIG. 2B is an exploded view of an exemplary rotor-stator structure in accordance with a specific embodiment of the present invention. In this example, rotor-stator structure 200 includes a rotor assembly 202 and a number of active field pole members 204 (i.e., active field pole members 204a, 204b, and 204c), whereby active field pole members 204 are configured to magnetically couple to and drive magnets of rotor assembly 202. Rotor assembly 202 includes two conical magnets 220a and 220b mounted on or affixed to a shaft 222 such that at least a portion of a conical magnet surface 221a on conical magnet 220a at least a portion of a conical magnet surface 221b on conical magnet 220b. In particular, the smaller-diameter ends (i.e., nearest the cones' vertices, if present, or nearest the cones' conceptual vertices if otherwise not present due to, for example, truncation of the cone) of the conical magnets 220a and 220b face each other. Further, conical magnets 220a and 220b are each positioned adjacent to one group of ends of active field pole members 204. In various embodiments of the present invention, conical magnet surfaces 221a and 221b each have an angle of inclination with respect to the axis of rotation, where the angle is from about 5 degrees to about 85 degrees. In a specific embodiment, the angle of inclination can be from about 10 degrees to about 80 degrees. In at least one embodiment, the angle of inclination is about 30 degrees with respect to the axis of rotation, for example, when conical magnets 220a and 220b are composed of relatively high performing magnet material (e.g., magnets having relatively high values of maximum energy product and "Br," and high coercivity, as is discussed below). In various embodiments, shaft 222 can be composed of magnetically permeable material, while in other embodiments it can be made of non-magnetic and/or non-electrically conductive materials. As such, rotor-stator structure 200 does not require shaft 222 to form flux paths; active field pole members 204 and conical magnets 220a and 220b are sufficient to form flux paths in accordance with at least one embodiment of the invention.

Each of active field pole members 204 includes a field pole member 206 and an insulated coil 208 wrapped around a respective field pole member 206. Field pole members 206 are positioned coaxial about an axis of rotation, which can be defined by the axis of shaft 222. Coils 208a, 208b and 208c are generally wound about the central portions of field pole members 206a, 206b and 206c, respectively, to produce ampere turn-generated magnetic flux in field pole members 206 when the coils 208 are energized with current. In at least one embodiment, one or more active field pole members 204 constitute, at least in part, a stator assembly (not shown). At each end region of active field pole members 204 are pole faces 207, each of which is located adjacent to and confronting at least a portion of the conical magnet surfaces of the conical magnets 220a and 220b, thereby defining functional air gaps between magnet surfaces (or portions thereof) and pole faces. According to a specific embodiment of the present invention, pole faces 207 are contoured to mimic the surfaces of a magnet, such as that of conical magnet 220a. For example, pole face 207b is a concave surface resembling the curvature of that of a convex surface of conical magnet 220a. In one embodiment of the present invention, an optional extended end, such as an extended end 211b, extends longitudinally from field pole members 206 to extend over and/or past outer surfaces of conical magnets 220a and 220b. As another example, extended end 217b is configured to extend past the outer surface of conical magnet 220b for insertion into one of grooves 242 to construct rotor-stator structure 200. But note that in some embodiments, extended end 211b as well as other extended ends of field pole members 206 are absent, thereby permitting pole faces 207 to confront conical magnets 220a and 220b that have their larger diameter ends (one of which coincides with or is nearest outer magnet surface 223a) extending to or beyond a radial distance associated with the outer surfaces of field pole members 206.

As either rotor assembly 202 or the number of active field pole members 204 can be configured to rotate in relation to the other, rotor-stator structure 200 can optionally include bearings 230 and both a front mounting plate 240 and a rear mounting plate 248. In a specific embodiment, mounting plates 240 and 248 can be made of non-magnetic and/or non-electrically conductive materials. Cavities 244 in mounting plates 240 and 248 are designed to receive bearings 230, and grooves 242 are designed to receive at least a portion of an extended end, such as extended end 217b, of an active field pole member. In some cases, grooves 242 confine the movement of active field pole members 204 to maintain a proper position with respect to rotor assembly 202. A protective housing (not shown) can be added to protect both rotor assembly 202 and field pole members 204 and can also serve as a heat sink for one or more coils 208. While useful to implement the exemplary rotor-stator structure 200, various embodiments of the invention are not limited to including mounting plates 240 and 248 as well as bearings 230 and grooves 242, especially when generating a flux path in accordance with embodiments of the present invention.

Note that although each field pole member 206 is shown to be wrapped by insulated coil 208, fewer than all of field pole members 206 can be wrapped by coil 208, according to a specific embodiment. For example, coils 208b and 208c can be omitted from active field pole members 204b and 204c, respectively, to form an electrodynamic machine that, for example, costs less to manufacture than if coils 208b and 208c were included. Without coils 208b and 208c, members 204b and 204c constitute field pole members rather than active field pole members. Also note that although field pole members 206a, 206b and 206c are shown as straight field pole members, there is no requirement that field pole members 206a, 206b and 206c be straight or substantially straight. In some embodiments, one or more of field pole members 206a, 206b and 206c can be shaped to implement transition regions, such as described below, in field pole members to convey flux in other than a straight flux path. For example, field pole members 206a, 206b and 206c can be shaped to position coils 208 closer to shaft 222, thereby decreasing the volume of an electrodynamic machine implementing rotor-stator structure 200.

In at least one specific embodiment, each of one or more active field pole members 204 include only one or more coils 208 and a field pole member, such as any of 206a, 206b and 206c. In some cases, active field pole members 204 can include tape, paper, and/or paint, or the like that do not add substantial support for coil windings that are wound about a field pole member. Generally, the windings of one or more coils 208 are wound directly on the field pole member itself. The conductors of one or more coils 208 can generally include insulation. But in this specific embodiment, each of active field pole members 204 does not include any other intermediate structure, such as a coil carrier structure, which requires additional material cost and labor during a manufacturing process.

Figure 3:
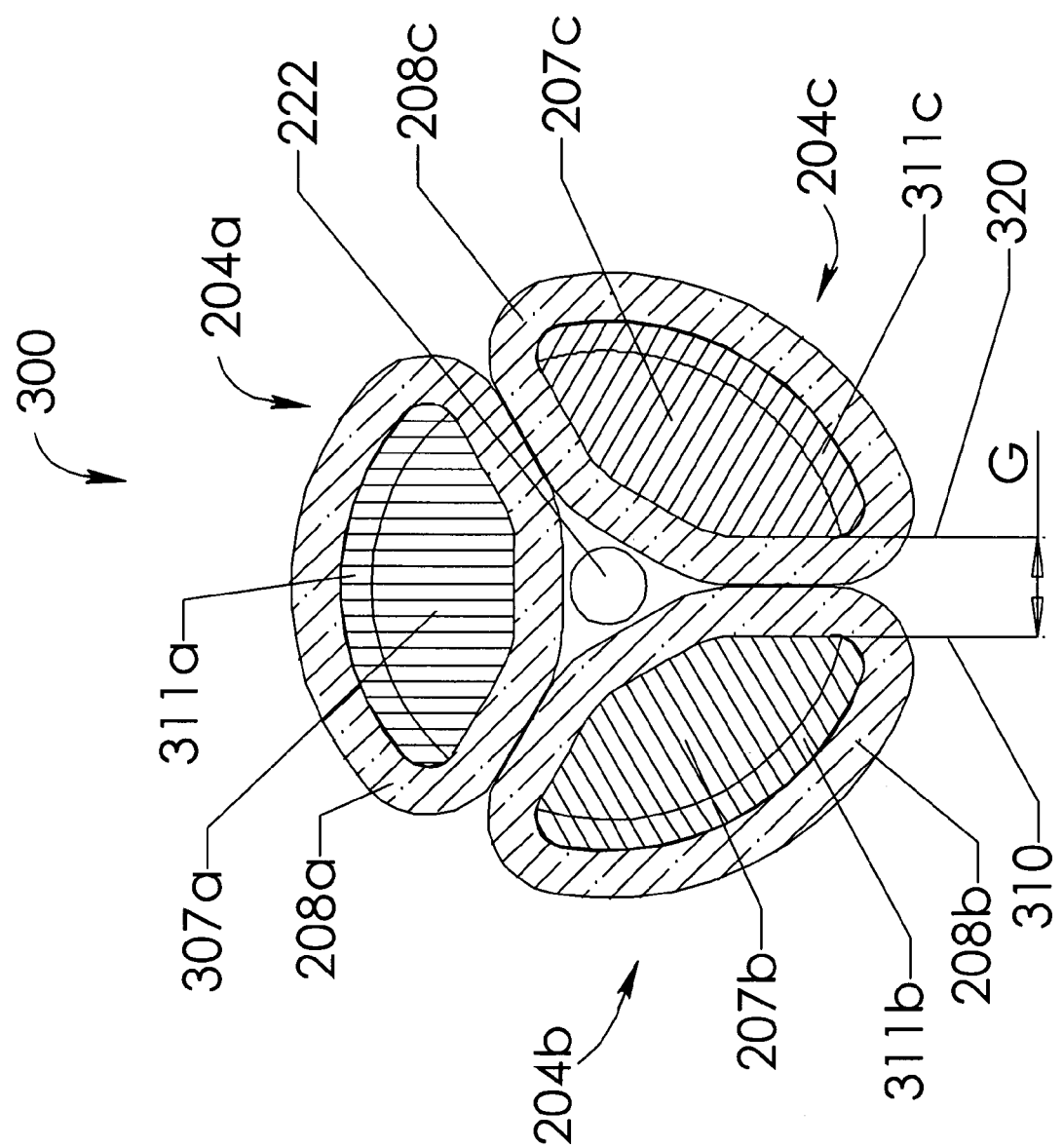
FIG. 3 depicts an end view for the rotor-stator structure of FIG. 2B without a magnet to illustrate the orientation of the pole faces that are configured to interact via an air gap with a confronting magnetic surface of a conical magnet, according to one embodiment of the present invention.

FIG. 3 depicts an end view 300 of rotor-stator 200 illustrating orientation of the pole faces that are configured to interact via an air gap with a confronting magnetic surface of conical magnet 220a, according to one embodiment of the present invention. Absent from FIG. 3 is front mounting plate 240, bearings 230 and conical magnet 220a, all of which are omitted to depict the end views of both the active field pole member and coil shapes, as well as the field pole gaps ("G") between the field poles. As shown, coils 208a, 208b, and 208c respectively encompass field pole members 206a, 206b and 206c to form active field pole members 204a, 204b and 204c, all of which are compactly positioned to increase the packing density of a motor or generator implementing rotor-stator structure 200 (as compared to conventional motors using coil windings that typically are wound using slots 108 of FIG. 1). FIG. 3 also depicts edges of extended ends 311a, 311b, and 311c, and pole faces 307a, 207b, and 207c of respective active field pole members 204a, 204b and 204c. Pole faces 307a, 207b, and 207c are positioned to form magnetic air gaps between each of those pole faces, or surfaces, and at least a portion of the conical magnet surface of conical magnet 220a. Further, field pole gaps are defined by the sides (or edges) of the field pole members that constitute active field pole members 204a, 204b and 204c. For example, gap "G" represents any of the field pole gaps as defined, for example, by planes 310 and 320 extending from sides of respective field pole members 206b and 206c (FIG. 2B). In at least one specific embodiment, a surface area associated with each of pole faces 307a, 207b, and 207c is dimensioned to generate maximum torque output in an optimal configuration. An example of such a configuration is one where magnetic coupling between conical magnet 220a and field pole members 206a, 206b and 206c is at or near a maximum amount while leakage across gap "G" between the field pole members is at or near a minimal amount. Note that by increasing the surface area of any of pole faces 307a, 207b, and 207c, magnetic coupling is increased.

Figure 4:
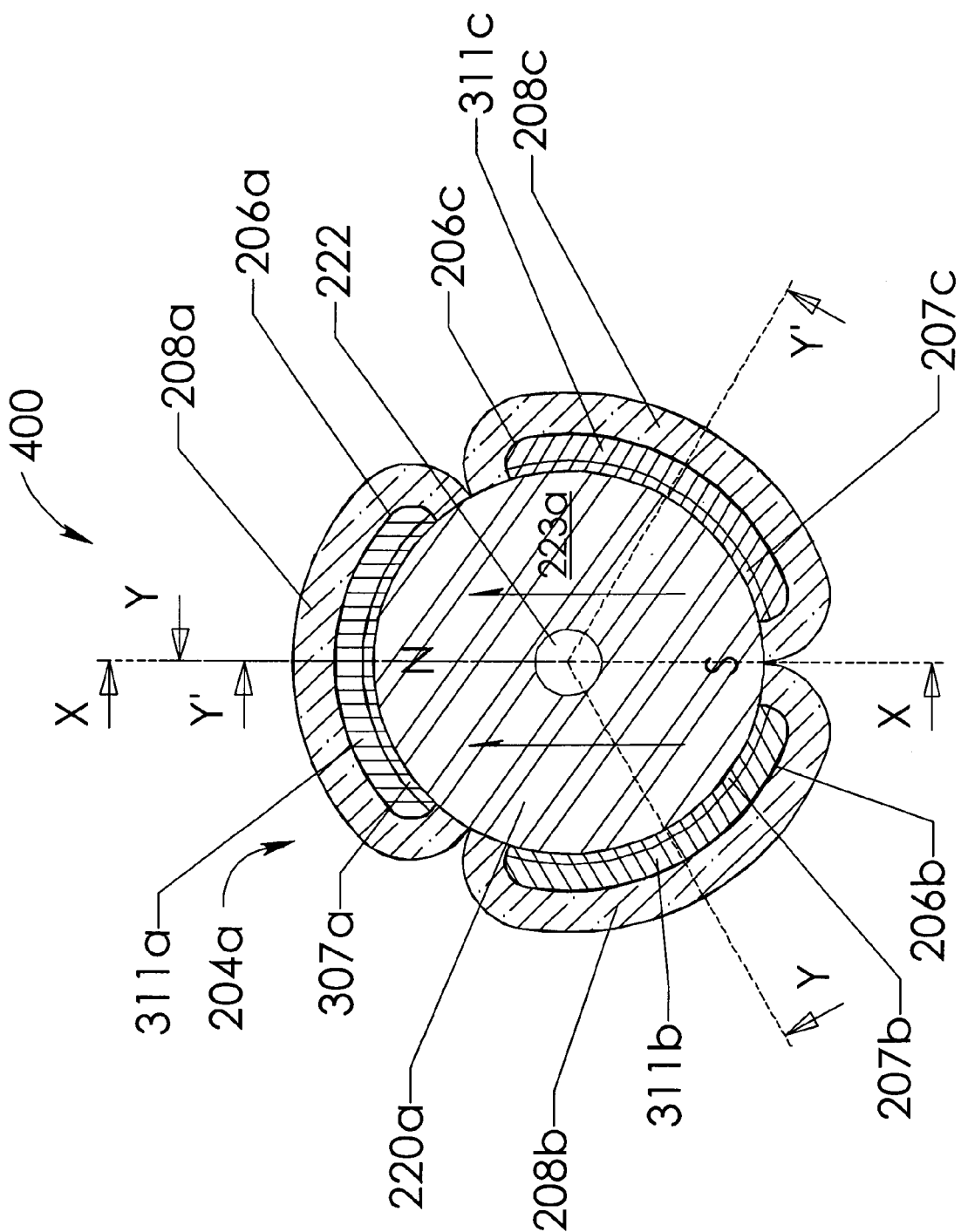
FIG. 4 depicts another end view for the rotor-stator structure of FIG. 2B illustrating a conical magnet positioned adjacent to pole faces in accordance with an embodiment of the present invention.

FIG. 4 depicts another end view 400 of rotor-stator 200 and conical magnet 220a positioned adjacent to pole faces 307a, 207b, and 207c (FIG. 3) in accordance with an embodiment of the present invention. As shown, outer magnet surface 223a of conical magnet 220a is visible, as are the protruding edges of extended ends 311a, 311b, and 311c and coils 208. Note that while this example shows conical magnet 220a as a dipole magnet (e.g., a permanent magnet) having a north pole ("N") and a south pole ("S"), conical magnet 220a can have any number of north poles and south poles. Note that in some embodiments, conical magnets 220a and 220b can be implemented using electromagnets. Also, FIG. 4 defines three sectional views. The first sectional view, X-X, cuts straight through as a centerline bisecting field pole member 206a and coil 208a and then passes via magnet 220a through a field pole gap between other field pole members 206b and 206c. A second section view, Y-Y, bisects field pole member 206a and coil 208a and then passes via magnet 220a through field pole member 206b and coil 208b. A third view section view, Y'-Y', which is similar to the second section view, Y-Y, bisects field pole member 206a and coil 208a and then passes via magnet 220a through field pole member 206c and coil 208c. Section view X-X is shown in FIG. 5A, whereas views Y-Y and Y'-Y' produce similar drawings, both of which are depicted in FIG. 5B.

Figure 5B:
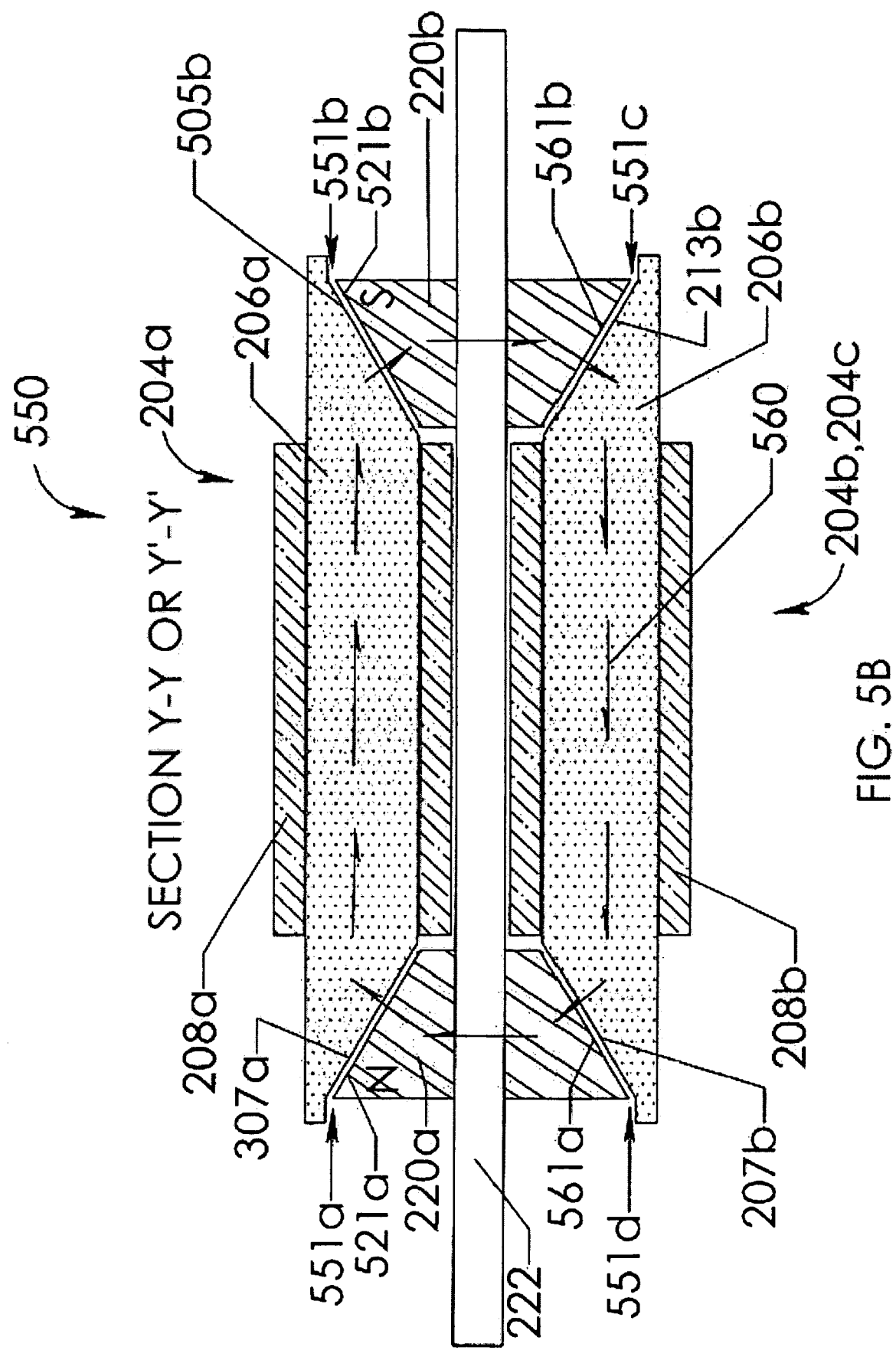

FIGS. 5A and 5B depict sectional views illustrating an exemplary magnetic flux path, according to at least one embodiment of the present invention. FIG. 5A depicts a cross section of active field pole member 204a of rotor-stator structure 500, the cross section showing a sectional view X-X of coil 208a and field pole member 206a. In this example, active field pole member 204a includes pole faces 307a and 505b, pole shoes 507a and 507b, a coil region 506 and coil 208a. In view X-X of FIG. 5A, conical magnets 220a and 220b are diametrically magnetized in opposite directions and are positioned adjacent to respective pole shoes 507a and 507b of field pole member 206a. Correspondingly, pole face 307a of pole shoe 507a forms a magnetic air gap 551a with at least a portion 521a of magnet surface 221a of FIG. 2B, with portion 521a confronting pole face 307a and shown as a cross-section. Similarly, pole face 505b of pole shoe 507b forms a magnetic air gap 551b with at least a portion 521b of magnet surface 221b of FIG. 2B, with portion 521b confronting pole face 505b and shown as a cross-section. Note that portions 521a and 521b need not extend the axial length of conical magnets 220a and 220b, respectively. For example, portions 521a and 521b can be defined by regions that are bounded between the largest and smallest cross-sectional diameters of conical magnets 220a and 220b, but can be of any size. Accordingly, portions 521a and 521b need only form air gaps with a pole face, with other surface portions of conical magnets 220a and 220b being configured not to form air gaps, according to at least one embodiment. Further, coil 208a encloses a coil region 506 of field pole member 206a, whereby coil region 506 is defined approximately by the axial length of coil 208a surrounding a portion of field pole member 206a. Absent in FIG. 5A is a depiction of one or more field interaction regions, which can encompass a space larger than an air gap, such as air gap 551a, and can extend into, for example, conical magnet 220a.

In at least one embodiment of the present invention, at least one of magnet portions 521a and 521b of surfaces on respective conical magnets 220a and 220b can be defined as being bounded by an angle of inclination ("θ") 501, which is an angle with respect to an axis of rotation. In the example shown, the axis of rotation is coterminous with shaft 222. In a specific embodiment, angle of inclination ("θ") 501 is 30 degrees from shaft 222. But note that angle 501 can be any angle.

With opposite polarizations, conical magnet 220a is polarized with its north pole ("N") pointing in direction 502, and conical magnet 220b is polarized with its north pole ("N") pointing in direction 504. In some embodiments, conical magnets 220a and 220b are diametrically magnetized in exactly opposite directions (i.e., 180 degrees between directions 502 and 504). But in other embodiments, directions 502 and 504 can be offset to any angle between those directions other than 180 degrees, for example, to reduce detent torque ("cogging"). In a specific embodiment, directions 502 and 504 are offset to an angle between from about 150 degrees to about 180 degrees. In various embodiments, conical magnets 220a and 220b (or other types of magnets) are each polarized to have a direction of polarization in one or more planes that are substantially perpendicular to the axis of rotation.

FIG. 5B depicts cross sections of active field pole member 204a and either active field pole member 204b or active field pole member 204c of FIG. 3, and depicts a magnetic flux path, according to one embodiment of the present invention. For ease of discussion, only view Y-Y will be discussed. View Y-Y is a sectional view of coil 208a and field pole 206a passing though coil 208b and field pole member 206b. Magnetic flux path 560 passes through both field pole members 206a and 206b and through both conical magnets 220a and 220b. For purposes of illustration, magnetic flux path 560 (or flux path) may be described as comprising two flux paths that are combined by the principle of superposition. Conical magnets 220a and 220b form the first flux path (i.e., permanent magnet-generated flux), whereas flux developed by amp-turns of the coil form the second flux path (i.e., ampere turn-generated flux). In this example, magnet flux as the first flux path exits the north pole ("N") of conical magnet 220a and crosses air gap 551a to enter pole face 307a (FIG. 3), the north pole coinciding with surface portion 521a, which confronts pole face 307a. The first flux path then traverses longitudinally through field pole member 206a and then exits pole face 505b at the end of field pole member 206a adjacent to conical magnet 220b. The first flux path continues by crossing air gap 551b and enters the south pole ("S") of conical magnet 220b, the south pole generally coinciding with a surface portion 521b of magnet surface 221b and confronts pole face 505b. The first flux path passes through conical magnet 220b to its north pole, which generally coincides with a surface portion 561b of magnet surface 221b that confronts pole face 213b. Next, the first flux path crosses air gap 551c and enters pole face 213b (FIG. 2B). From there, the first flux path returns through field pole member 206b to pole face 207b from which it exits, crosses air gap 551d, and then enters the south pole of conical magnet 220a, thereby completing the first flux path. Generally, the south pole of conical magnet 220a coincides with a surface portion 561a of magnet surface 221a (FIG. 2B) that is confronting pole face 207b. Note that in the case shown, the flux exiting pole face 207b is equivalent to that flux exiting pole face 207c. Note that no supplemental structure or material need be required to form any portion of magnetic flux path 560. As such, rotor-stator structure 550 does not include back-iron.

In a specific embodiment, the diameters of conical magnets 220a and 220b are set so that the length of the flux path in each of conical magnets 220a and 220b is relatively large with respect to the four air gaps 551a to 551d, thereby establishing a favorable magnet load line. Note that each of the four air gaps 551a to 551d provides for a flux interaction region to facilitate magnetic flux interaction between (or through) pole faces and the magnet. Note further that a flux path in either conical magnet 220a or 220b is shown to align along the axis of magnetization (i.e., from the south pole to the north pole), which can contribute to low magnet manufacturing costs and to magnets that can generate a relatively high output torque per unit volume (or size). The coercivity of the magnet, which is the property of the magnet that determines how well a magnet will keep its internal flux alignment in the influence of strong external magnetic fields, can be optimally selected by using appropriate magnet materials for a specific application.

In at least one embodiment, rotor-stator structure 550 (FIG. 5B) generates at least a portion of magnetic flux path 560 that extends substantially linearly from about surface portion 521a of the magnet surface of first conical magnet 220a to about surface portion 521b of the magnet surface of second conical magnet 220b. In one instance, the portion of the magnetic flux path consists essentially of surface portion 521a of first conical magnet 220a, surface portion 521b of the second conical magnet 220b, at least one of the field pole members, such as field pole member 206a, and two or more air gaps, such as air gaps 551a and 551b.

In at least one embodiment of the present invention, conical magnets 220a and 220b can have at least the following two magnetic properties. First, conical magnet 220a and 220b are able to produce magnetic flux, such as measured in terms of flux density, "B," with CGS units of Gauss. "CGS" refers to units described in terms of the centimeter, the gram, and the second. Second, the magnet materials of conical magnet 220a and 220b are such that the magnets resist demagnetization. Materials that have an ability to highly resist demagnetization are often described as having "high coercivity," as is well known in the art. Suitable values of demagnetizing fields can be used to drive a specific magnet material flux density output to zero. As such, magnet materials that have relatively high values of coercivity generally indicate that a magnet material is capable of withstanding large values of adverse external magnetic field intensities without suffering demagnetization effects. In a specific embodiment, conical magnet 220a and 220b are composed of magnet materials having a recoil permeability value relatively close to 1.00 and sufficient coercivity, Hd, under operating conditions as to be reliable in reasonably expected conditions of operation.

Magnet materials are often characterized in part by a maximum energy product of such materials. In addition, magnet materials may be characterized by "Br," which is the magnetic flux density output from a magnet material when measured in a closed circuit and no measured external magnetic fields are being applied to that magnetic material. That maximum flux density value is frequently denoted as "Br." A high value of Br indicates that a magnet material is capable of large magnetic flux production per pole area (i.e., a high flux density). In at least one embodiment, conical magnets 220a and 220b use magnets having high flux production capability (e.g., having high values of "Br") in configurations where relatively high torque is desired in relatively small device volumes.

In various embodiments, conical magnets 220a and 220b (or other magnets) use high-valued Br magnets that can be relatively short in the axial direction and use a cone angle of about 30 degrees, for example, from the axis of rotation. But in some embodiments, conical magnets 220a and 220b (or other magnets suitable for practicing the present invention) use magnet materials having lower cost and lower values of Br. In this case, the magnets generally are implemented with an air gap having a relatively larger area than those associated with higher values of Br. In particular, an increased area for an air gap is formed by increasing the axial length of a magnet, thereby increasing the surface area of a magnetic surface confronting a respective pole face. As such, lesser cone angles (e.g., less than 30 degrees) in a same outer diameter device (e.g., motor housing) can be used, albeit longer in the axial direction. Although the output torque performance, and Km, can remain the same over many embodiments, the manufacturing cost can be less in the low-valued Br version even though there can be an increase in axial length.

While various embodiments of the present invention cover a multitude of design motor and/or generator designs using any of known available magnet materials, at least one embodiment uses magnet materials with low ratios of values of B to values of adverse applied field intensity, H, such ratios, as is typically specified in many magnet material data sheets, being measured at the respective material's Br point, those ratios defining the "recoil permeability at Br" of such materials. While in some cases magnet materials need not only be limited to high values of coercivity, the magnet materials should exhibit predictable output flux densities when subjected to expected adverse magnetic field or thermal conditions. As such, the value of "recoil permeability" can be at least one factor when designing motors and/or generators using a rotor-stator structure of the present invention.

Recoil permeability is generally an expression of the relationship between values of B and the values of adverse applied field intensity. The values of recoil permeability are typically evaluated in terms of CGS units (because the permeability of air is 1.0 in CGS units) and can be determined by dividing a value of B (e.g., expressed in Gauss), near or at Br, by a value of adverse applied field intensity (e.g., H, near or at Hc, expressed in Oerstead). For some magnet materials, an average recoil permeability value can be determined and may be useful in magnet material selection. In one embodiment, recoil permeability can be defined for various magnetic materials by Magnetic Materials Producers Association ("MMPA") Standard 0100-00, as maintained by the International Magnetics Association ("IMA"). Note that recoil permeability can also be described in terms of MKS units (i.e., meter, kilogram, and second).

Generally, values of recoil permeability are not less than one when expressed in CGS units. The closer that a recoil permeability value is to 1.0, however, the higher the coercivity can be for a specific measured material. In most embodiments of the present invention, a value of recoil permeability is typically less than 1.3. Typical high-coercivity magnet materials, such as magnets composed of neodymium-iron ("NdFe") and variants thereof, can have a recoil permeability value of about 1.04 in CGS units. Examples of recoil permeability values from various suppliers are as follows: 1.036 for grade 32H (as manufactured by Hitachi, Ltd.); 1.028 for grade 35H (as manufactured by Magnetic Component Engineering, Inc. or "MCE"); and 1.02 for grades 22H through 33H as well as 1.05 for grades 35SA through N52 (as manufactured by Shin-Etsu Magnetics Inc.). An example of such a variant is Neodymium-Iron-Boron, or "NdFeB." Common low-cost ceramic magnets, such as those composed of ferrite ceramic, can have a ratio value of about 1.25, which permits ceramic magnets to perform adequately in most applications. Note that the average recoil permeability of typical high performance ceramic magnets is usually within a range of 1.06 to 1.2 in CGS units, more or less. Example values from one supplier, Hitachi, Ltd., are as follows: 1.2 for isotropic grade YBM 3 and 1.06 for anisotropic grades YBM 1 and 2. Permanent magnets in various embodiments of the present invention can comprise any magnetic material known to those ordinarily skilled in the art. Examples of such magnet materials include one or more rare-earth magnet materials that are known in the art, such as Neodymium Iron Boron ("NdFeB"), Samarium Cobalt ("SmCo") and variants of both, as well as ceramic magnets.

Coils 208 wound around each of field pole members 206 form the second flux path. In this example, the flux generated by the ampere-turns in coils 208a and 208b of FIG. 5B travels in a similar path to the permanent magnet flux, with the exception that conical magnets 220a and 220b (FIG. 2B) and cylindrical magnets 226a and 226b (FIG. 2A) have effective properties similar to that of air as viewed by the ampere turn-generated flux. As such, the ampere-turn flux generated within field pole member 206a (e.g., within coil region 506) is present at the pole faces adjacent to conical magnets 220a and 220b of FIGS. 5A and 5B and cylindrical magnets 226 of FIG. 2A. Note that coils 208, as conductors, can be wires having a circular cross-section or any other shape, such as square or rectangular.

In at lease one specific embodiment, coils 208 can include foil conductors that are conductors having a rectangular cross-section with a relatively large width and a relatively small height. Foil conductors with insulation between layers can be used in place of wire to decrease winding resistance and increase current handling capacity in the same available winding volume. Use of a foil conductor can also decrease the inductance of the winding. In one embodiment, the insulation is affixed to one side of the foil to isolate the foil conductor in subsequent windings around the core. That is, only one side of the foil conductors need be insulated since that one side insulates a non-insulated side of a previous wound portion of the foil conductor (or foil coil). Advantageously, this reduces the amount of insulation required for coils 208, thereby saving resources, increasing packing density and increasing the number of ampere turns (while decreasing the number of conductor turns) in a space otherwise filled by fully insulated conductors (i.e., insulated on all sides, such as an insulated wire). As the foil conductor also provides for relatively smaller bending radii, it can thereby decrease the winding resistances usually common in conductors having sharper bends. By decreasing the resistance, this type of conductor can also conserve power in generating amp-turn flux, especially in battery-powered motor applications.

Figure 5C:
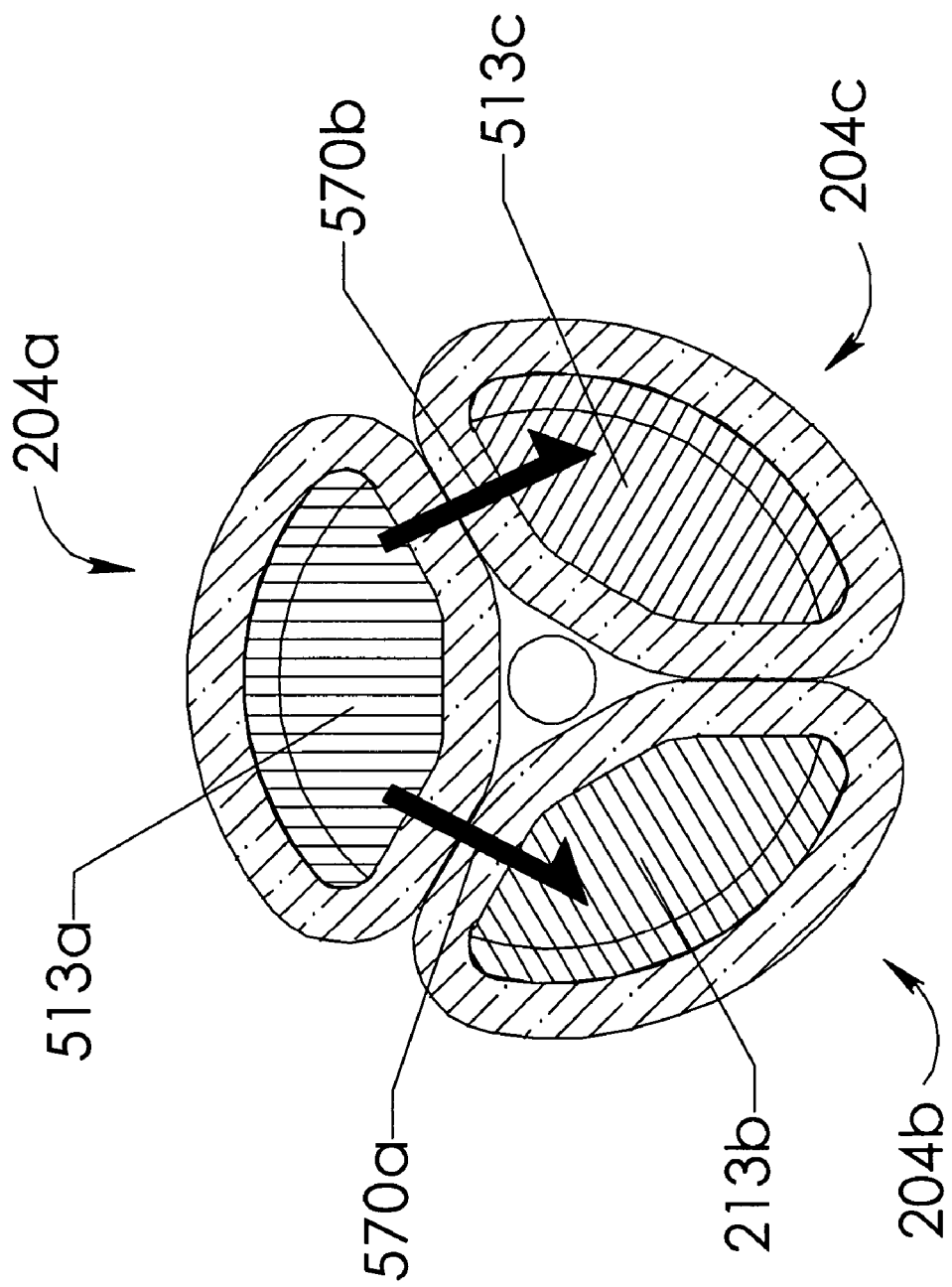
FIG. 5C depicts an example of a second flux path exiting a pole face of a stator member generating an ampere-turn magnetic flux, according to one embodiment of the present invention.

FIG. 5C depicts an example of a second flux path exiting a pole face of the active field pole member that generates that ampere-turn magnetic flux, according to one embodiment of the present invention. In this figure, ampere-turn ("AT")-generated flux is generated in active field pole member 204a and then exits from pole face 513a of FIG. 5C (or as shown as pole face 505b in FIG. 5B) while dividing approximately in half to form flux 570a and 570b. Then, ampere-turn flux 570a enters pole face 213b, and ampere-turn flux 570b enters pole face 513c. Then, respective portions of the second flux path then travel longitudinally through the other field pole members (e.g., field pole members 206b and 206c) to the other ends of those other field pole members to return to active field pole member 204a, which initially generated the second flux path.

Figure 5D:
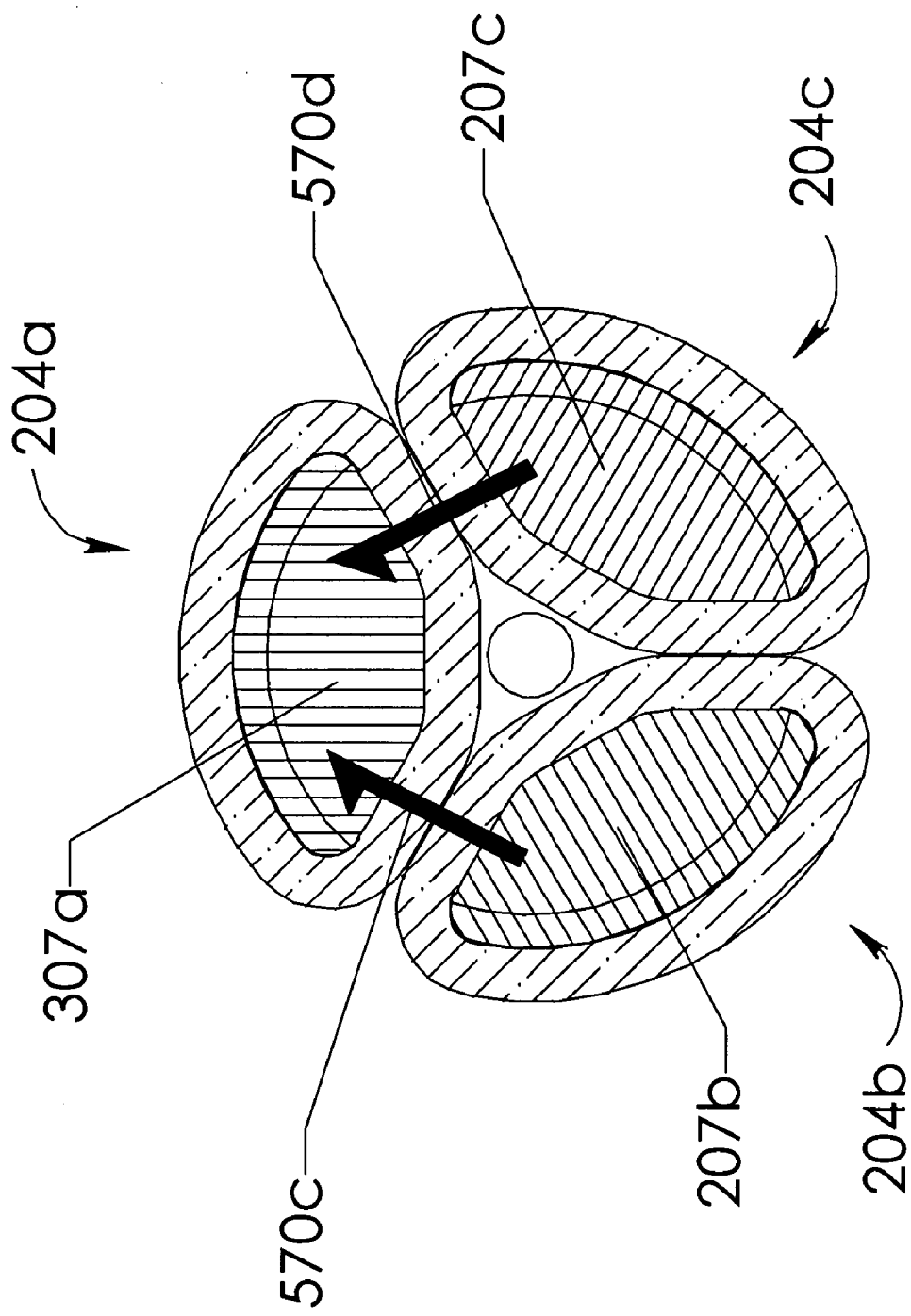
FIG. 5D depicts an example of a second flux path(s) entering a pole face of an active field pole member that originally generated the ampere-turn magnetic flux of FIG. 5C, according to one embodiment of the present invention.

FIG. 5D depicts an example of the second flux path(s) returning to a pole face of the active field pole member that generated the ampere-turn magnetic flux, according to one embodiment of the present invention. As shown, ampere-turn magnetic flux 570c and 570d exit respective pole faces 207b and 207c to enter pole face 307a, thereby completing the magnetic circuit of the second flux path (i.e., the ampere-turn magnetic flux path).

Conceptually, the magnetic fields generated by the ampere-turns in each field pole member of active field pole members 204a, 204b, and 204c in FIG. 5D can be viewed as regions of magnetic potential at each of the pole faces at the end regions or pole shoes of the active field pole members. In the air gaps between the confronting surfaces of the conical magnets and their adjacent pole faces, the flux of the first flux path and the flux of the second flux path interact in a manner familiar to those skilled in the art, where such an interaction is useful to generate torque by an electric motor implementing rotor-stator structure 200, according to at least one embodiment of the present invention. The first and the second flux paths of rotor-stator structure 200 are efficient, at least in part, because the flux is contained within the core regions 506 (FIG. 5A) of field pole members 206 by the currents running through coils 208. The magnet flux generated by each of the conical magnets 220a and 220b interacts in a flux interaction region with the magnetic flux from pole faces of active field pole members 204. As such, flux leakage paths are generally limited to relatively very small regions at pole shoes 507a and 507b (FIG. 5A), both of which include the sides and the backs of field pole members 206. As the first and second flux paths are also mostly straight in the magnetically permeable material of field pole members 206, these field pole members are well suited to be implemented with anisotropic (e.g., grain-oriented), magnetic materials in an efficient manner. As such, field pole members 206 can be composed of any anisotropic, magnetic materials capable of carrying higher flux densities and lowering magnetic losses in the direction of magnetic orientation, such as along the grains of grain-oriented materials, as compared to the use of isotropic, non-grain oriented, magnetic materials.

To illustrate, consider that an exemplary anisotropic (e.g., grain-oriented) material can have a magnetic saturation value of at least 20,300 Gauss, whereas a typical isotropic lamination material can have a saturation value of 19,800 Gauss. An example of a suitable anisotropic material for practicing at least one embodiment of the invention is grade M6 material, as defined by the American Iron and Steel Institute ("AISI"). An example of an isotropic material is M19 material, as designated by AISI. Moreover, the anisotropic material requires only 126 Oerstead of applied field to reach saturation compared to the isotropic material, which requires 460 Oerstead. Core losses for the anisotropic grain-oriented material (e.g., laminations of 0.014 inch thick) can be about 0.66 Watts per pound at 60 Hz with 15,000 Gauss induction for Flat-Rolled, Grain-Oriented, Silicon-Iron Steel. By contrast, a typical isotropic material such as AISI lamination material M19 can have core losses of about 1.72 to 1.86 Watts per pound under similar conditions (e.g., at thicknesses of 0.0185 inches). In view of the foregoing, the use of anisotropic materials in forming field pole members 206 is advantageous over the use of isotropic materials. According to at least one embodiment, a relatively straight shape for field pole members 206 enables effective use of anisotropic materials, unlike magnetic flux paths of traditional motors.

Unlike output torque generation of conventional motors, the output torque generated by rotor-stator structures 200 of various embodiments of the present invention need not be proportional to the radius from the axis of rotation of shaft 222 to the active air gaps 551a to 551d (FIG. 5B). All other factors being the same, increasing the radial distance of the pole faces and air gaps from shaft 222 does not change the output torque in the way that traditional motor design formulas indicate. For example, traditional motor design concepts teach that the regions carrying ampere-turn flux should be designed to have low reluctance paths, including the part of the ampere-turn magnetic flux path that is the air gap. According to various embodiments of the present invention, the ampere-turn flux path has a relatively high reluctance path through the space occupied by permanent magnets, such as conical magnets 220, yet peak torque production is relatively high in comparison to that of most traditional motors of the same size or weight (again, with other factors being equal). In a specific embodiment, the magnet materials that constitute conical magnets 220a and 220b of FIG. 2B and/or cylindrical magnets 226 of FIG. 2A, have a magnet permeability value similar to that of air, and as such, the volume of each conical magnet 220a and 220b or cylindrical magnet 226 appears as an additional air gap to the ampere-turn magnetic circuit. In at least one embodiment, the output torque generated by an electrodynamic machine is proportional, in whole or in part, to the volumes of conical magnets 220a and 220b or to the volumes of cylindrical magnets 226.

In operation of rotor-stator structure 200, coils 208 are sequentially energized to cause rotation of rotor assembly 202. The energized coils generate magnetic potentials at the pole faces. These magnetic potentials tend to re-orient the internal field directions of the magnets (e.g., conical magnets 220) to the direction of the applied external field. The external field, in effect, presents an angularly-directed demagnetizing field to conical magnets 220a and 220b such that the demagnetizing field is capable of reaching relatively large amplitudes when a motor implementing rotor-stator structure 200 is under high torque loads. The intense demagnetizing field can detrimentally re-magnetize magnet materials of conical magnets 220a and 220b that have insufficient coercivity. For this reason, at least one embodiment of the present invention uses magnet materials suited for high torque loading and have: (1) a low B-to-adverse-applied-field intensity ratio, and (2) a relatively low recoil permeability, such as less than 1.3 in CGS units, for example.

In an embodiment of the present invention, the produced torque is through the natural inclination of the magnets, such as conical magnets 220, to seek the lowest energy position. Accordingly, the magnet poles of conical magnets 220, which can be permanent magnets, tend to rotate toward regions of greatest magnetic attraction and away from regions of magnetic repulsion, whereby such regions of "magnetic potential" are created at the air gaps at both ends of energized active field pole members 204 by the ampere-turn generated magnetic fields. Since a magnet having a relatively high coercivity will resist attempts to angularly displace the direction of its internal magnetic field, this resistance to angular displacement is manifested as mechanical torque on the body of the permanent magnet, thereby transferring torque to the shaft. As such, the magnets (e.g., conical magnets 220) can develop and then transfer torque to the shaft as useful output torque applied to a load.

Figure 5F:
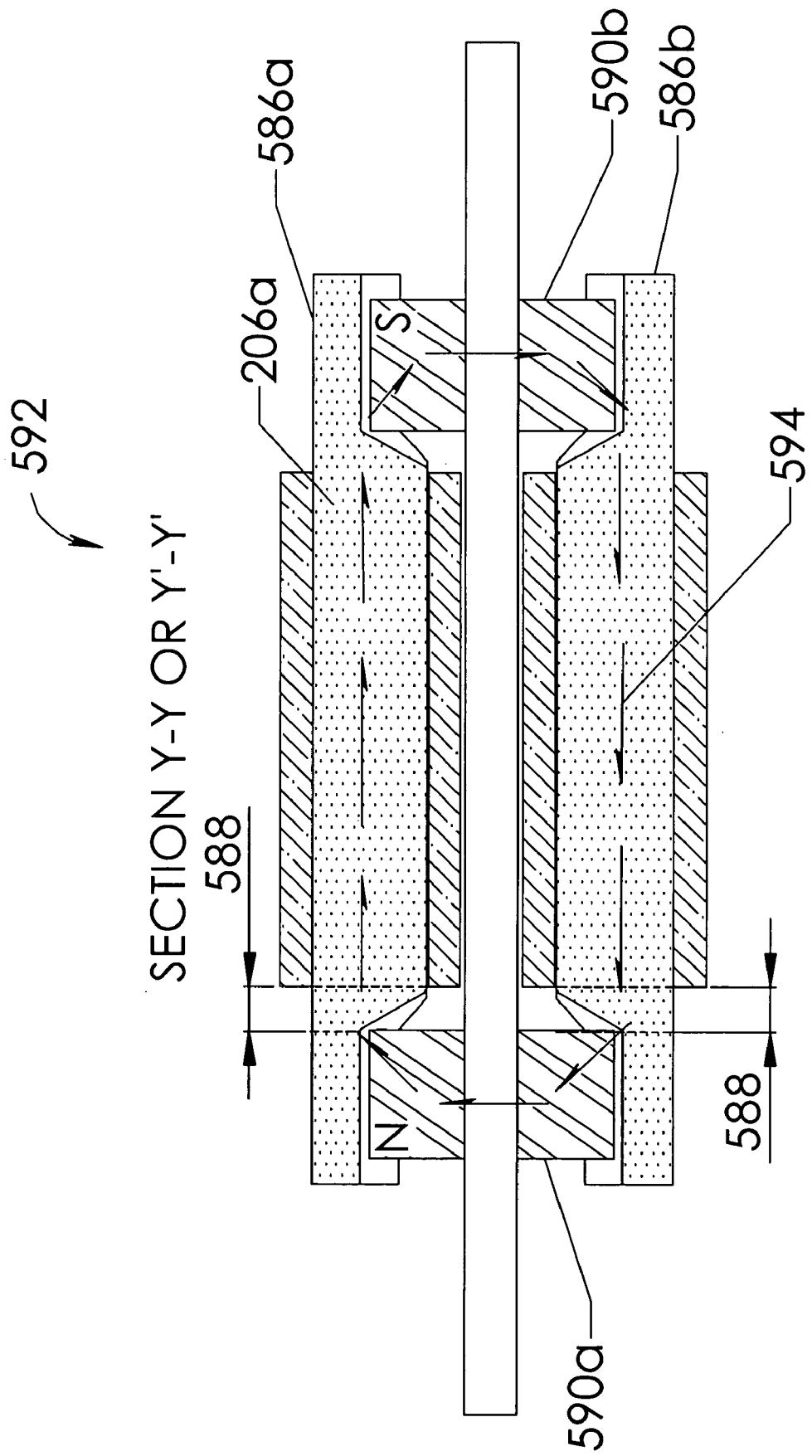

FIGS. 5E and 5F depict sectional views illustrating an exemplary magnetic flux path for another rotor-stator structure that includes cylindrical magnets, according to at least one embodiment of the present invention. FIG. 5E depicts a cross section of active field pole member 586a of rotor-stator structure 580, the cross section showing a sectional view X-X of field pole member 586a and cylindrical magnets 590a and 590b. While the pole faces, pole shoes, a coil region and coil are similar in functionality to similarly-named elements of FIG. 5A, field pole member 586a includes an additional structural and/or functional element. Namely, field pole member 586a includes a transition region 588, the function and structure of which are described below, such as in one or more of FIGS. 17A to 20. FIG. 5F depicts a sectional view of at least two active field pole members similar to FIG. 5B, and depicts a magnetic flux path, according to one embodiment of the present invention. Similar to sectional view Y-Y, as defined in FIG. 5B, rotor-stator structure 592 is a sectional view of field pole member 586a and field pole member 586b. Magnetic flux path 594 passes through both field pole members 586a and 586b and through both cylindrical magnets 590a and 590b. Also shown are transition regions 588. Note that the shaft, pole faces, pole shoes, coil regions and coils are similar in functionality to similarly-named elements of FIG. 5B.

Figure 6B:
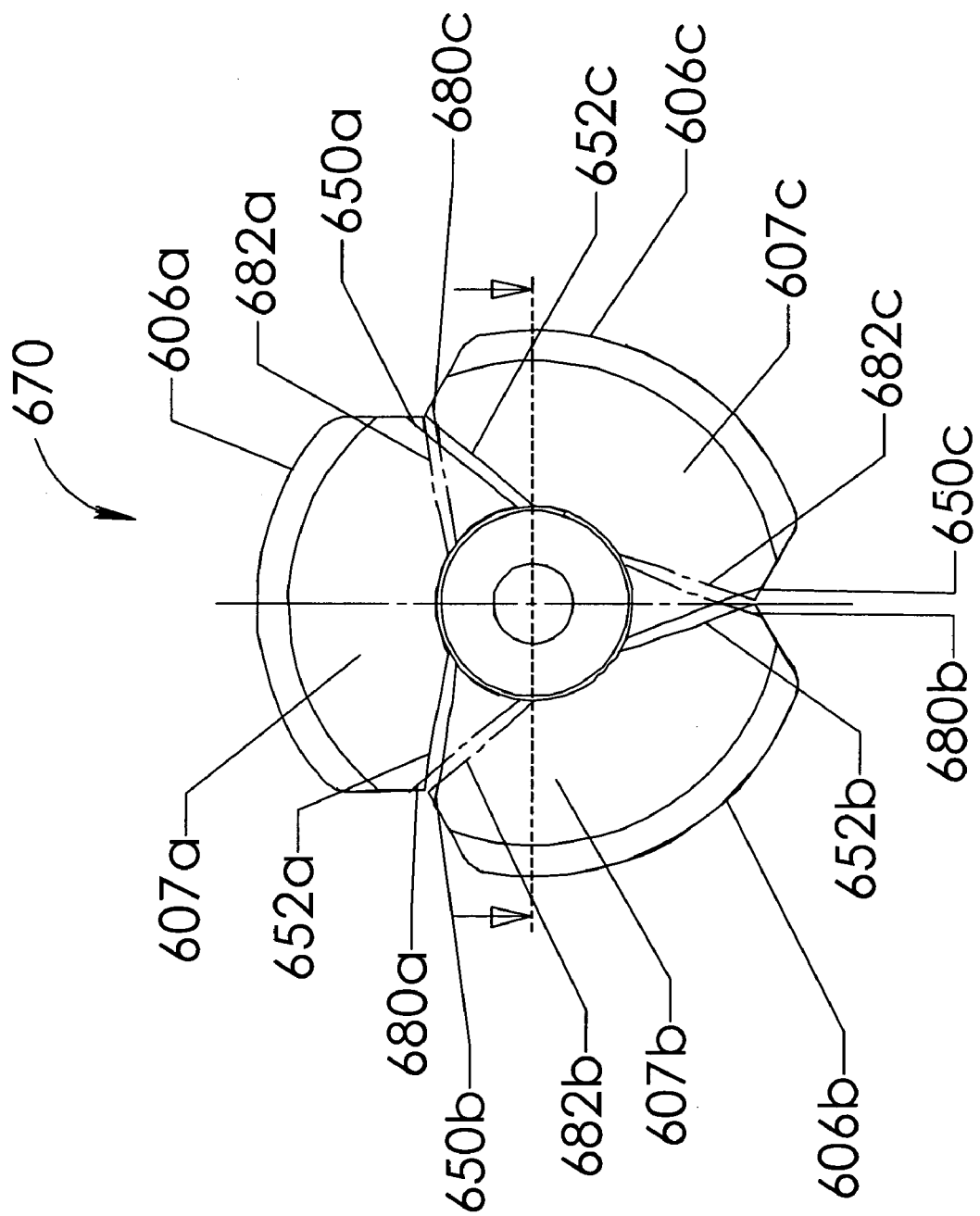

FIGS. 6A, 6B and 6C illustrate an end view 600 of another exemplary rotor-stator structure, according to another embodiment of the present invention. FIGS. 6A and 6B show end views 600 of a rotor-stator structure while FIG. 6C is a partial sectional view A-A of FIG. 6B. FIG. 6A shows active field pole members 604 each having a skewed pole face 607 at an end of a respective field pole member 606. Each skewed pole face 607 has a contoured surface that generally tracks the surface characteristics of that of a confronting surface portion of an adjacent magnet, such as conical magnet 220a, to form an air gap having, for example, a relatively constant air gap thickness. Air gap thickness generally refers to the orthogonal distance between a point on a pole face and a point on a confronting surface of a magnet. The skewed pole faces 607 are, at least in part, defined by surface edges and/or sides of field pole members 606 that are slightly angled or skewed with respect to the magnetization direction, (e.g., direction of polarization), of an adjacent magnet. Skewed edges and/or sides are shown in FIG. 6A as first skewed edges 650 and second skewed edges 652, both of which are configured as edges of field pole members 606 to form skewed field pole gaps 660 when active field pole members 604 are arranged in a rotor-stator structure. As an example, consider that first skewed edge 650c is configured to form an angle 622 with respect to at least one direction of polarization 630 of a magnet (not shown). Consider further that second skewed edge 652b is configured to form an angle 620 with respect to direction of polarization 630. Angles 620, 622 can be the same angle or can be any other angle that is suitable for forming field pole gaps 660 that are skewed in relation to the directions of polarization of one or more magnets. Note that FIG. 6C is a partial sectional view showing skewed edges being configured so that the plane of magnetic polarization 631 does not align with either of field pole edge 650 or field pole edge 652. In particular, field pole edge 650c and field pole edge 652b both do not align (i.e., are skewed) relative to plane of magnetization 631. In at least one embodiment, field pole edge 650a and field pole edge 652 are each parallel to a first plane that is at an angle with a second plane that includes or is parallel to plane of magnetization 631.

FIG. 6B is an end view 670 showing skewed pole face edges at both ends of field pole members 606. By implementing skewed field pole gaps 660 of FIG. 6A in a rotor-stator structure, detent torque ("cogging") is reduced. In at least one embodiment, skewed field pole gaps 660 are adapted for use with permanent magnets that are diametrically polarized, such as conical magnets 220. In this instance, end view 670 of FIG. 6B is an end view showing pole faces 607 that are configured to have surface contours similar to that of an adjacent conical magnet 220a, pole faces 607 being similar to those shown in FIG. 6A. Also shown in FIG. 6B are first skewed edges 680 and second skewed edges 682, which are associated with pole faces at the other end of field pole members 606 (e.g., at the other pole shoe opposite than that associated with first skewed edges 650 and second skewed edges 652 as indicated by the broken lines). First skewed edges 680 and second skewed edges 682 in this case have angles similar to those of first skewed edges 650 and second skewed edges 652, respectively, but face a magnet surface associated with conical magnet 220b, for example. As such, the angular directions of the field pole gaps formed by edges 650 and 652 are opposite in the angular direction of the field pole gaps formed by edges 680 and 682. Consequently, the diametrically polarized magnets will generally not align with a field pole gap having pole face sides similar to those that form field pole gap "G" between planes 310 and 320 (FIG. 3), which can be a source of cogging torque in an electric motor. Note that distance between edges 650 and 652, as well as between edges 680 and 682, can be configured to be as narrow as necessary to minimize the cogging effects of the field pole gaps. In at least one embodiment, first skewed edges 680 and second skewed edges 682 can have angles similar to those of first skewed edges 650 and second skewed edges 652. But edges 680 and 682 lie in the same respective planes as edges 650 and 652. Advantageously, this helps to balance torque that tends to twist the shaft, and also to balance axial forces that derive from the direction of magnet polarization relative to the skewed edges of field pole members 606.

Figure 7A:
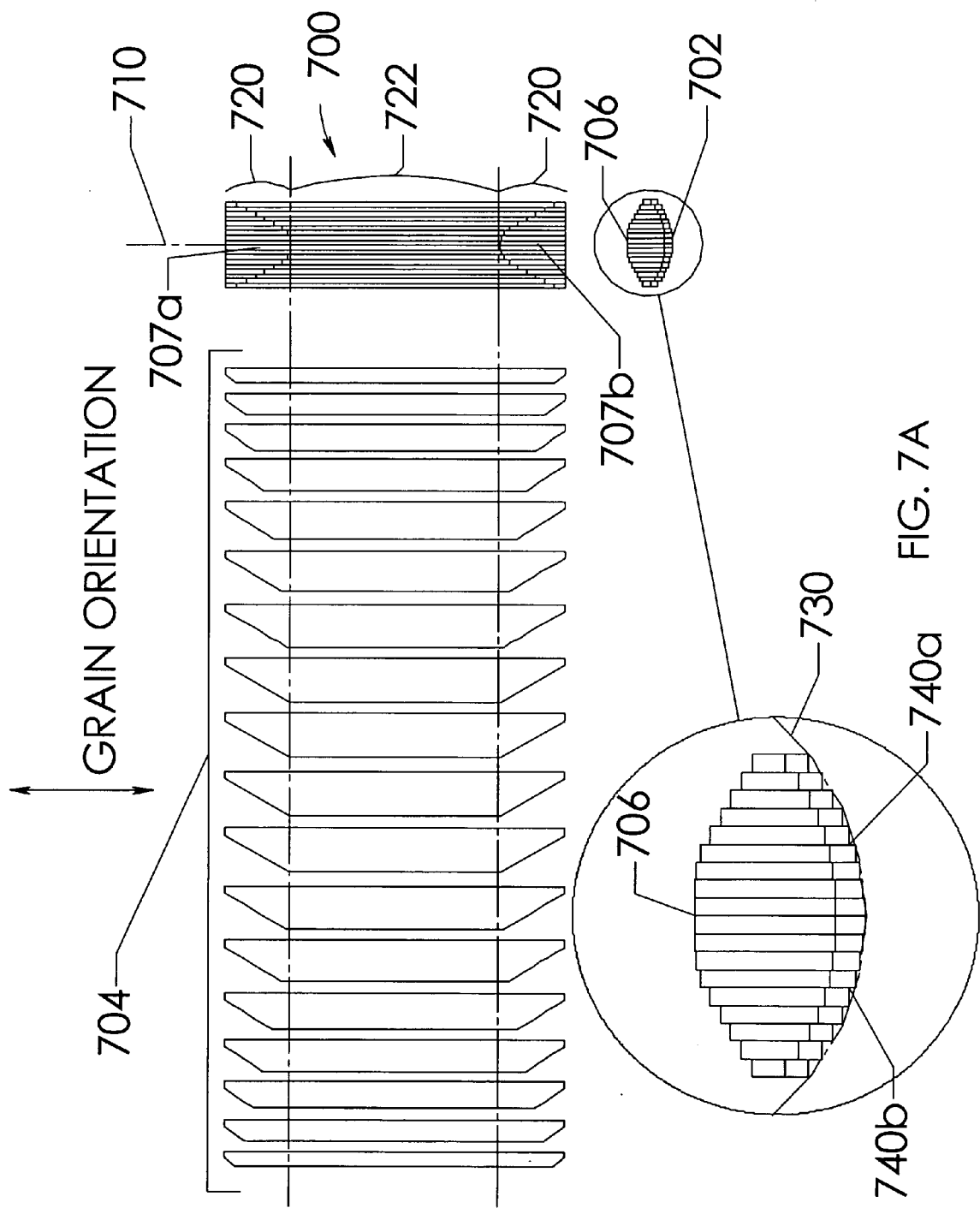
FIGS. 7A to 7E illustrate examples of implementations of field pole members, according to various embodiments of the present invention.
Figure 7B:
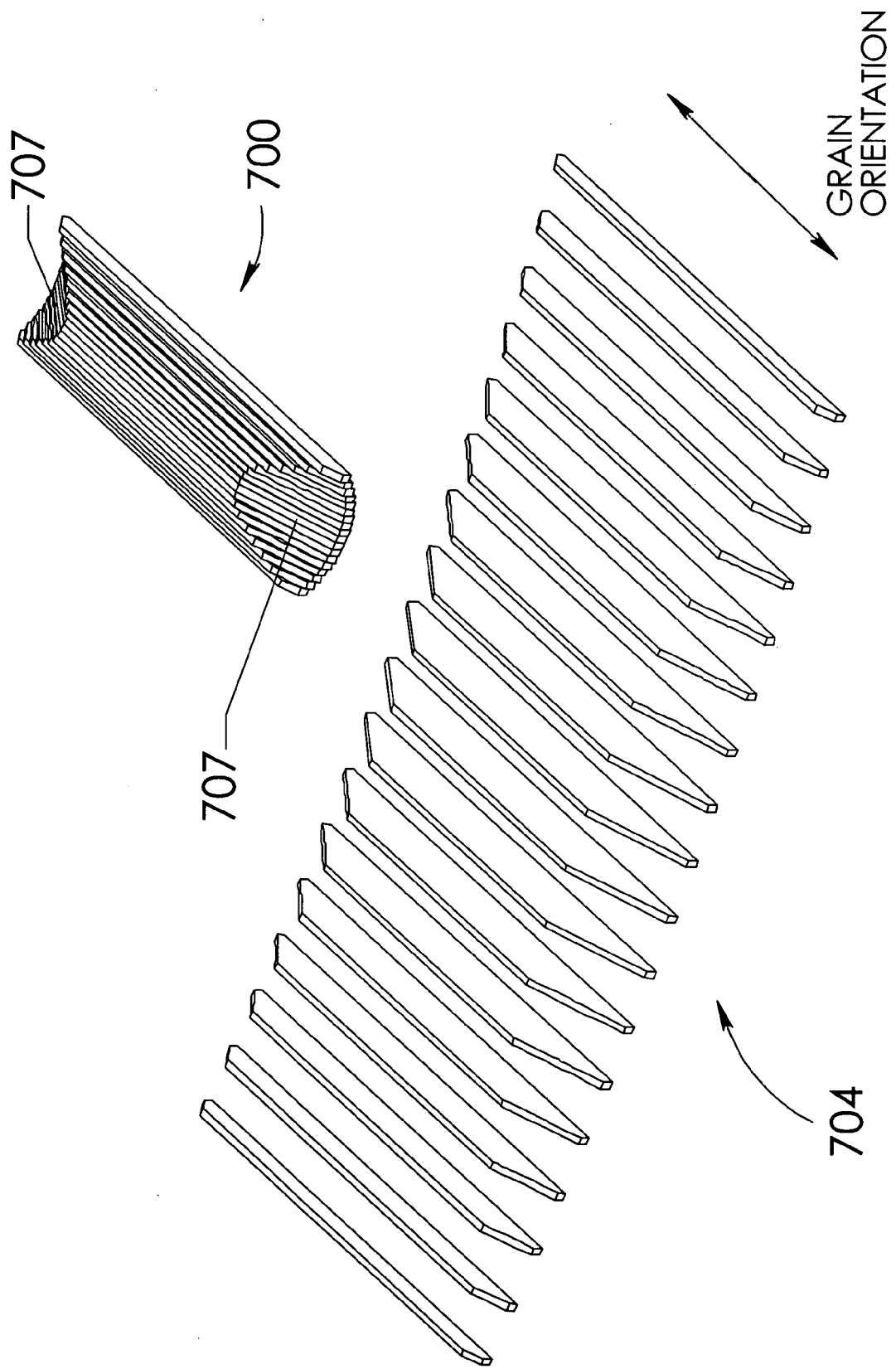

FIGS. 7A and 7B illustrate an exemplary field pole member, according to one embodiment of the present invention. Although each of field pole members 206a, 206b, and 206c can be composed of a single piece of magnetically permeable material (e.g., a piece formed by a metal injection molding process, forging, casting or any other method of manufacture), these field pole members can also be composed of multiple pieces, as is shown in FIGS. 7A and 7B. FIG. 7A depicts one of field pole members 206 as a stacked field pole member 700 composed of a number of laminations 704 integrated together. In this instance, stacked field pole member 700 has an outer surface 702 having a cylindrical outside diameter with an arc and a relatively straight inner surface 706 to increase the coil packing density while still leaving room for the rotating shaft. Field pole member end regions 720 generally include pole faces 707 for interacting with the flux of permanent magnets at each end of field pole member 700, whereas a central portion 722 (i.e., a central field pole member portion) generally includes a core region between pole faces 707, such as coil region 506 (FIG. 5A). A coil (not shown) can be wound more or less about central portion 722. FIG. 7B is a perspective view of stacked field pole member 700 and laminations 704, which can be composed of an anisotropic material. In this example, the anisotropic material includes grain-oriented material.

In at least one embodiment, a field pole member 700 includes a central field pole member portion 722 having an outer peripheral surface, such as outer surface 702. The outer peripheral surface is generally coextensive with a portion of a circle 730 about the axis of rotation, regardless of whether the field pole is composed of laminates. By forming the outer peripheral surface of a field pole member to fit within a circle or an equivalent shape, a more compact rotor-stator structure provides an electrodynamic machine with a smaller volume than if the outer peripheral surface coincided with a portion of a square, for example. As depicted in FIG. 7A, a field pole member 700 includes laminations and a central field pole member portion 722 between a first flux interaction surface (e.g., a pole face 707) and a second flux interaction surface (e.g., the other pole face 707). In this example, outer surface 702 is circumscribed by at least a portion of a circle 730, whereby one or more points (e.g., points 740a and 740b) intersect or touch circle 730. In at least one embodiment, the structure of field pole member 700 can be described in reference to a conceptual median plane, which appears as medial line 710. Medial line 710 extends in an axial direction and divides a quantity of laminations constituting field pole member 700 approximately in half (e.g., includes percentages from 50/50 to 60/40). With respect to one side of medial line 710, the laminations generally decrease in at least one dimension as the laminations are positioned farther from medial line 710.

Note that although not required, the laminations can be formed from a substrate composed of a magnetically permeable material in configurations that help reduce wastage of the magnetically permeable material. But again, wastage need not necessarily be a required factor in the design of each embodiment of laminated field pole of the present invention.

Figure 7C:
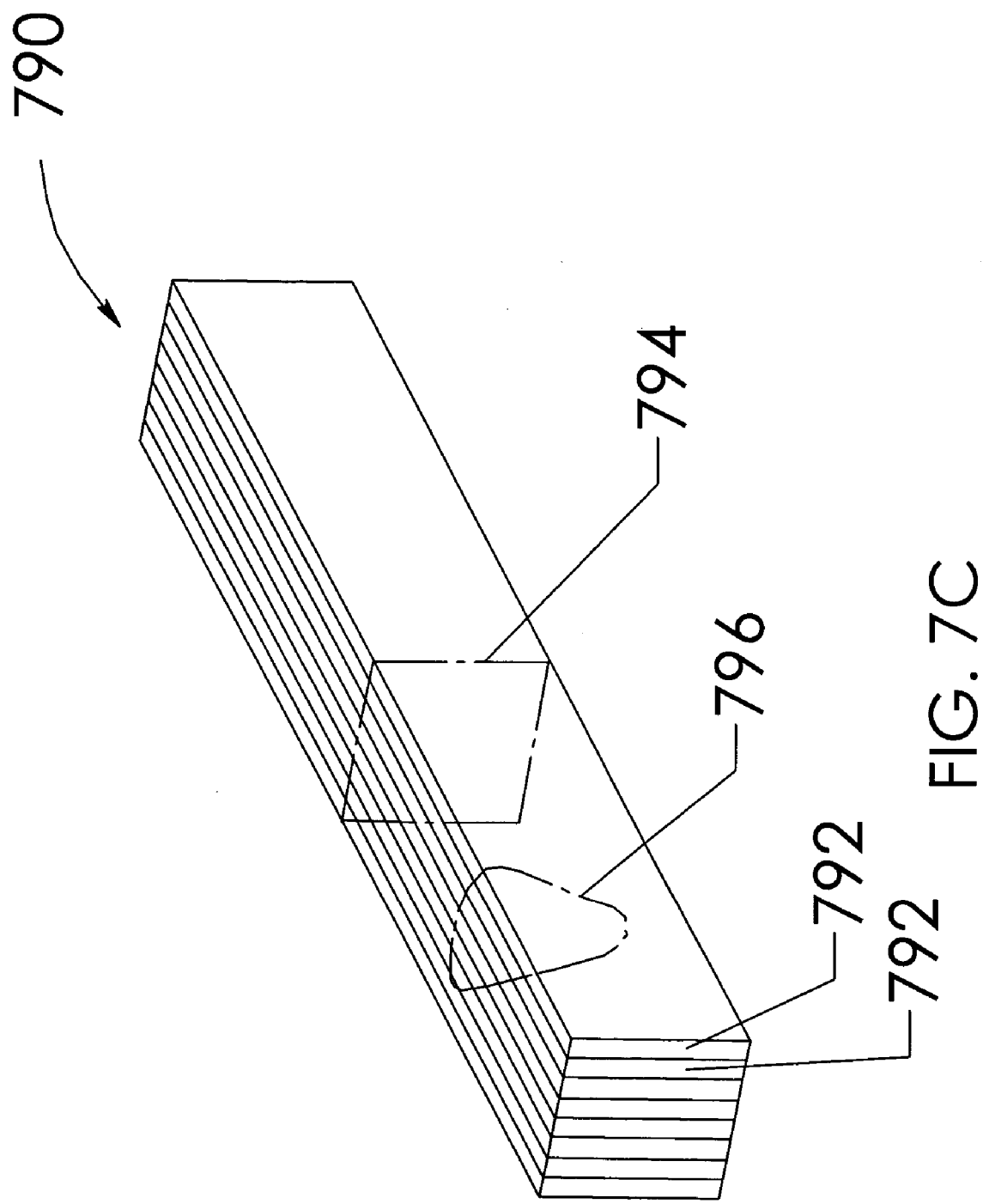

FIG. 7C shows an example of at least a central portion of a field pole member, according to at least one specific embodiment of the present invention. Note that pole shoes having contoured pole faces are omitted so as not to obscure the depiction of cross-sections for at least the central portion of a field pole member. Field pole member 790 is formed from laminations 792 and is configured to have a square-shaped form factor to increase field pole cross-sectional area, which in turn increases an amount of magnetic flux can pass through field pole member 790. For example, square cross-sectional area 794 can carry more magnetic flux than the oval-like shaped cross-sectional area of field pole member 700 of FIG. 7A. FIG. 7C also shows a tear-drop cross-sectional area 796 that can be implemented in at least one embodiment. In particular, tear-drop cross-sectional area 796 lies in a plane having a substantially radial direction. This orientation facilitates the accommodation of field pole members 790 as the quantity of field pole members 790 increases. Tear-drop cross-sectional area 796 can be configured to optimize the ratio of a winding (e.g., copper conductor) to the material (e.g., iron) constituting field pole members 790 within a specific set of magnetic flux requirements and the envelope constraints of the motor.

Note also that various winding patterns can be implemented in any of the field poles in FIGS. 7A to 7C to enhance performance. For example, a cantered or full-coverage winding can cover substantially all of the sides and/or the back of field pole member 700, at both ends of the structure, to reduce the flux that might leak from one field pole member to another. As such, the wire of a coil need not be wound in planes generally perpendicular to the long axis of the field pole member, but at an oblique angle. With coils being placed close to the magnetic air gap, those coils can be more effective in reducing flux leakage, for example, in pole shoe regions. Note that the above-described winding patterns are applicable to any of the field pole members described herein.

Figure 7D:
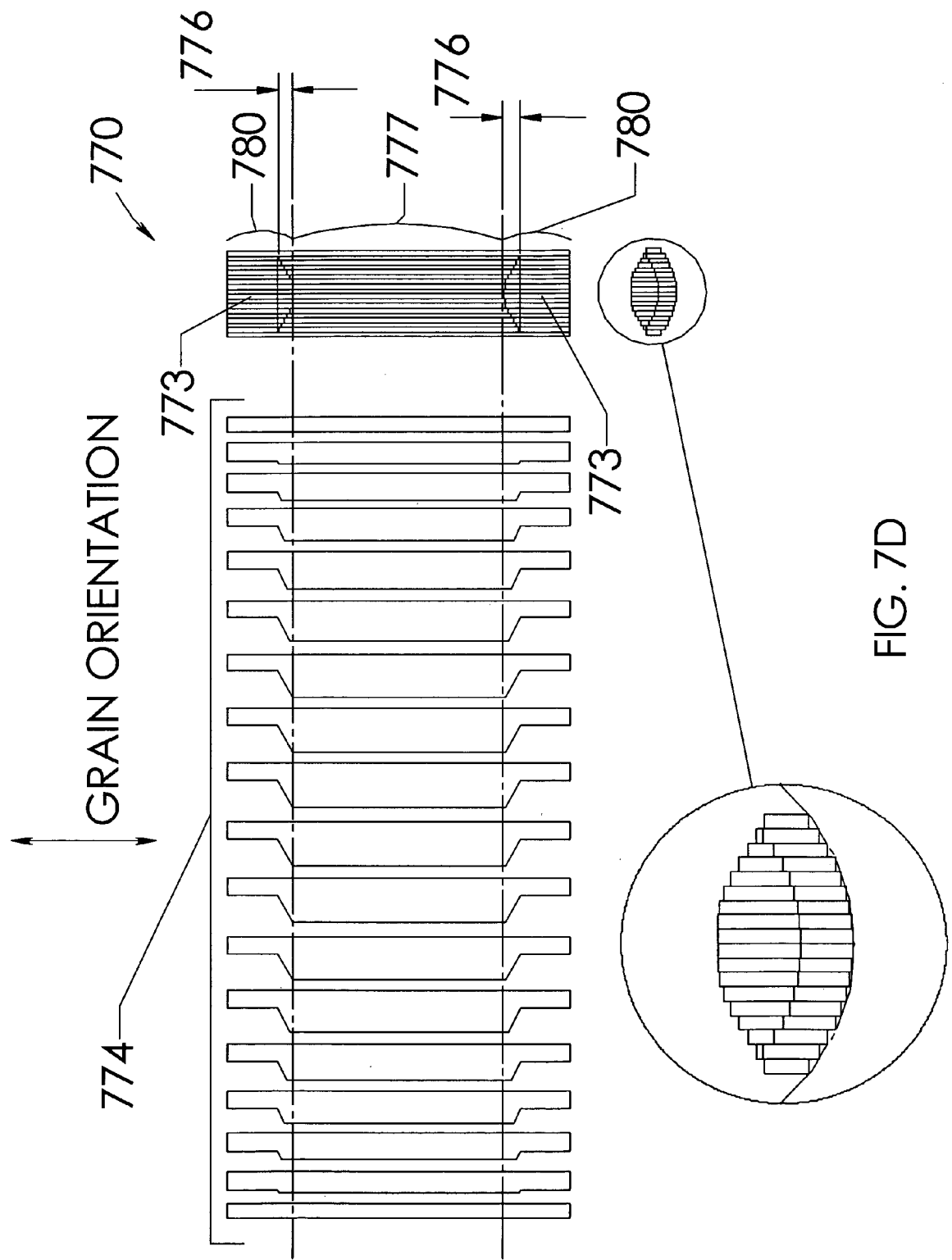
Figure 7E:
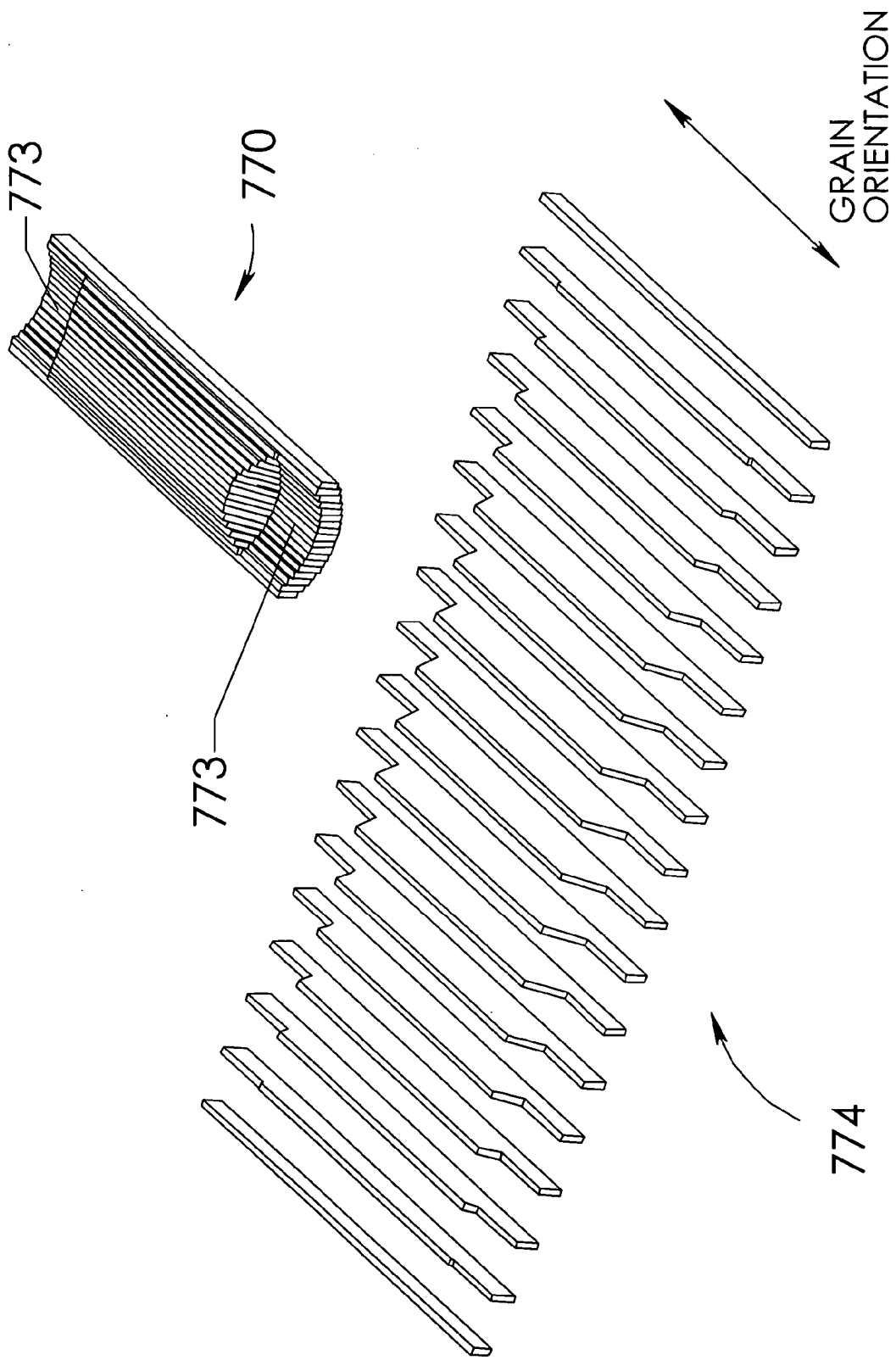

FIGS. 7D and 7E illustrate another exemplary field pole member, according to another embodiment of the present invention. Although similar to FIG. 7A, FIG. 7D depicts one of field pole members 586a and 586b (FIG. 5F) as a stacked field pole member 770. As shown, field pole member 770 is composed of a number of laminations 774 integrated together. Field pole member end regions 780 generally include pole faces 773 for interacting with the flux of permanent magnets at each end of field pole member 770, whereas a central portion 777 (i.e., a central field pole member portion) generally includes a core region between pole faces of field pole members 586a (FIG. 5E). At ends 780, which can be synonymous with pole shoes in some embodiments, field pole member 770 includes transition regions 776. These transitions regions are described below in more detail. FIG. 7E is a perspective view of stacked field pole member 770 and laminations 774, which can be composed of an anisotropic material. In this example, the anisotropic material includes grain-oriented material.

Figure 8:
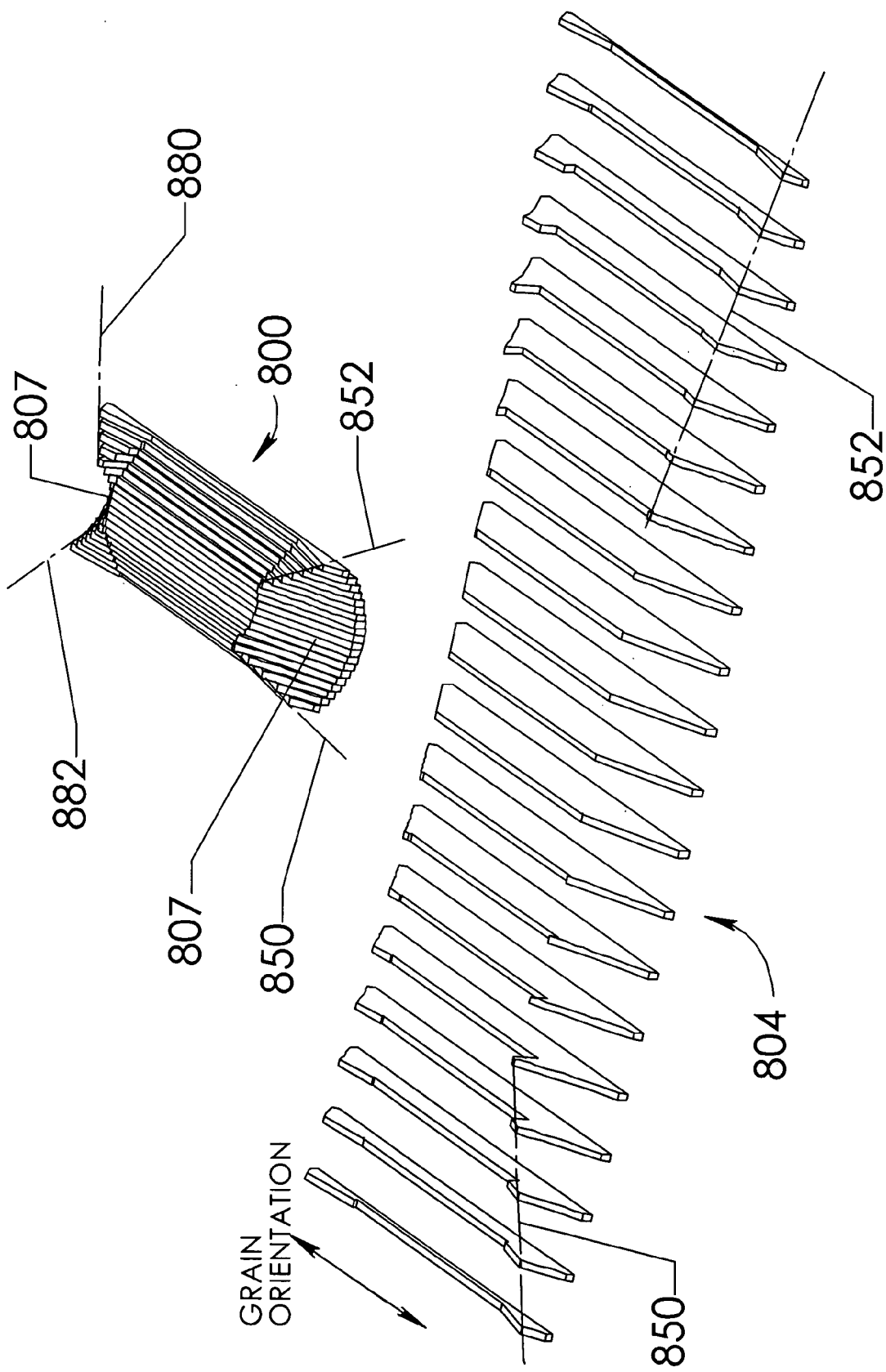
FIG. 8 illustrates another exemplary field pole member having skewed pole faces, according to a specific embodiment of the present invention.

FIG. 8 illustrates another exemplary field pole member having skewed pole faces, according to a specific embodiment of the present invention. As shown, stacked field pole member 800 is constructed from a number of laminations 804, similar to stacked field pole member 700. Laminations 804 are patterned to provide skewed pole faces 807. Pole face 807 is bound by both a first skewed edge 850 and a second skewed edge 852, whereas the other pole face 807 at the other pole shoe is bound by a first skewed edge 880 and a second skewed edge 882. Note that edges 850, 852, 880 and 882 can respectively correspond to edges 650, 652, 680, and 682 of FIG. 6B. Also note that edges 850 and 882 can be formed to lie in the same planes as edges 880 and 852, respectively, to balance torque that might twist the shaft and also to balance axial forces that derive from the direction of magnet polarization relative to the skewed edges of field pole members 800. In some cases, laminations 804 (as well as laminations 704) advantageously can be formed (e.g., stamped out) in a series of either similarly or differently patterned shapes from a single substrate (e.g., a sheet of metal or the like) or from different substrates in a manner that minimizes waste during manufacturing. A substrate can either be a single sheet or an elongated strip of material that, for example, can be rolled from a spool. Note that the manufacture of laminations 704 (FIG. 7B) and 804 (FIG. 8), for example, does not waste materials typically jettisoned to create circular holes in circular stator structures.

In some embodiments, laminations 704 and 804 can be assembled from laminated anisotropic (e.g., grain-oriented) sheet stock with the direction of magnetic orientation being oriented longitudinally, such as parallel to an axis of rotation. This is so that flux can be easily conducted axially from one end of the motor to the other. The laminations can be electrically insulated from each other, which can reduce eddy current losses. In one embodiment, laminations 704 and 804 are composed of grain-oriented steel and provide various field pole members with high permeability, low loss and/or high saturation levels in a relatively low cost material. One type of anisotropic material suitable for implementing laminations 704 and 804 is cold-rolled-grain-oriented steel, or "CRGO lamination steel." To illustrate the advantages of using grain-oriented lamination in accordance with at least one embodiment, cold rolled grain oriented steel, such as grade M6 lamination (as designated by AISI) having a thickness of 0.014 inches, can have a typical permeability of 50,000 while subjected to an applied field of 10,000 Gauss. By contrast, an isotropic laminate steel (e.g., "M19" laminates of 0.0185 inches thick) can have a typical permeability of about 3700, under similar conditions. Note that permeability, as described above, is in terms of direct current ("DC") permeability. Field pole members can be made from many different magnetically permeable materials, such as silicon iron alloys, steel alloys, iron alloys, nickel iron alloys, cobalt nickel alloys, magnetic powdered alloys, soft magnetic composites, and the like, according to various embodiments of the present invention. Soft magnetic composite materials, which are also known as "SMC materials," are composed of compacted, electrically insulated particles that are also magnetically permeable. As such, SMC materials exhibit relatively low eddy current losses when compared to traditional SiFe lamination materials at relatively high frequencies. Another significant advantage of SMC materials is its ability to be formed in three dimensions through use of properly designed compaction molds and dies.

Figure 9A:
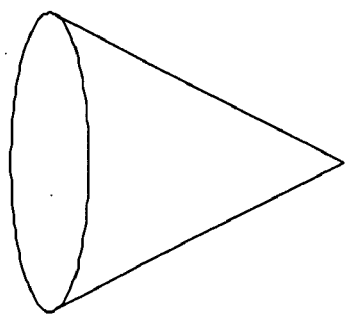
FIGS. 9A to 9P illustrate examples of other-shaped permanent magnets that can be implemented in an exemplary rotor-stator structure, according to various embodiments of the present invention.
Figure 9B:
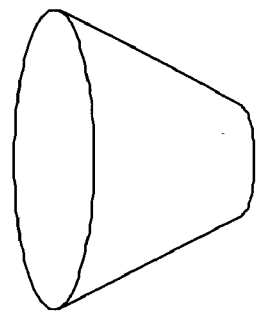
Figure 9C:
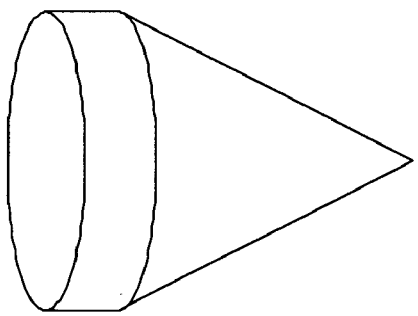
Figure 9D:
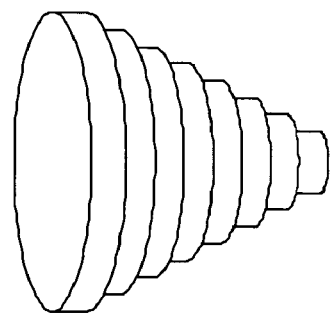
Figure 9E:
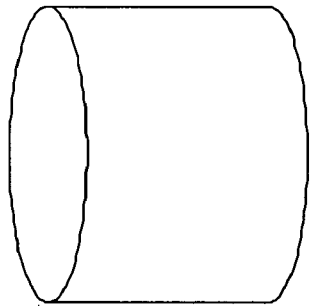
Figure 9F:
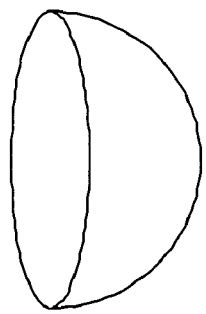
Figure 9G:
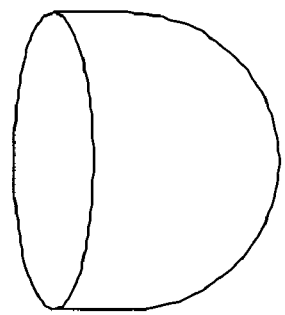
Figure 9H:
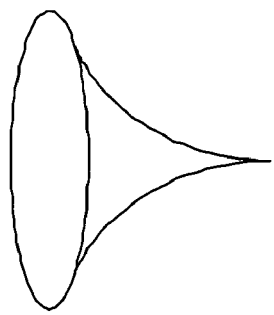
Figure 9I:
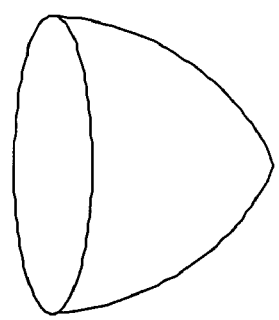
Figure 9J:
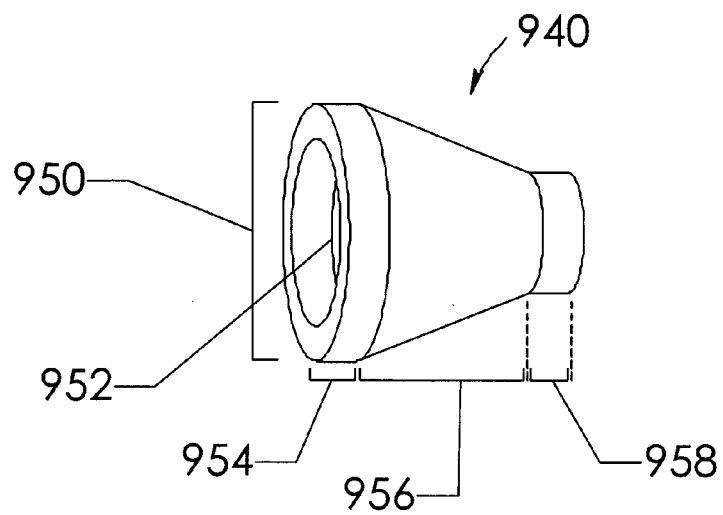
Figure 9K:
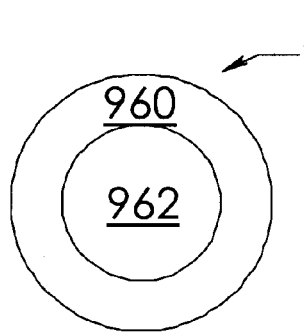
Figure 9L:
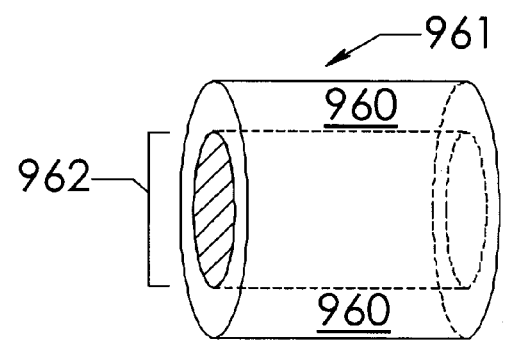
Figure 9M:
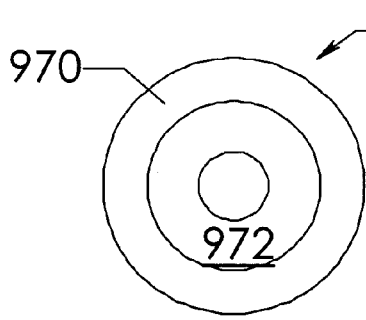
Figure 9N:
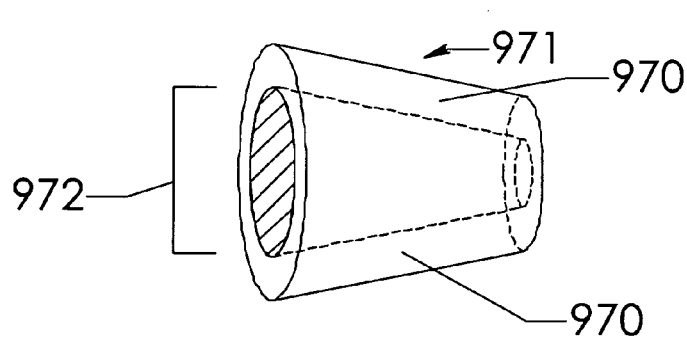
Figure 9O:
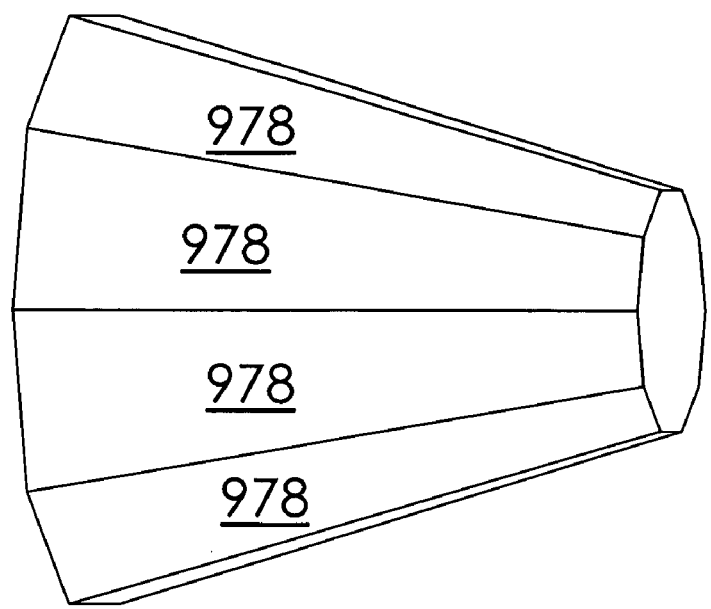
Figure 9P:
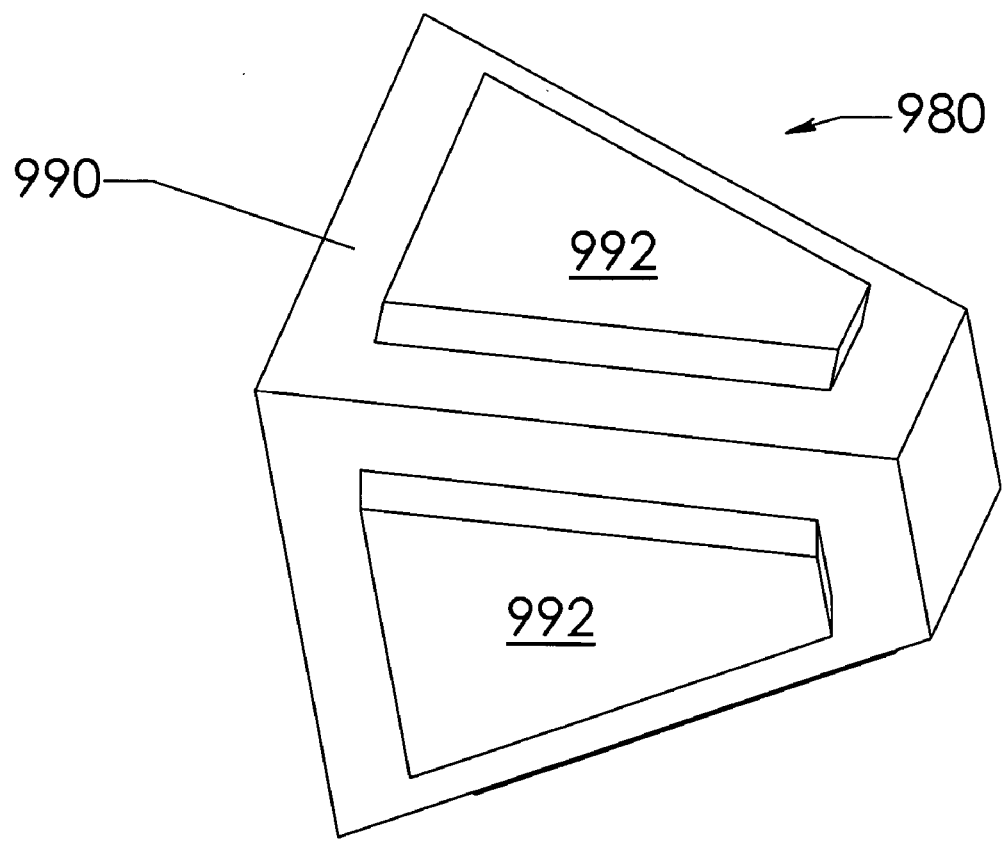

FIGS. 9A to 9P illustrate examples of other-shaped permanent magnets that can be implemented in a rotor-stator structure, according to various embodiments of the present invention. Although the magnets shown in FIG. 2B are conical in shape, the term "conical" is intended to be construed broadly to include one or more shapes that form one or more surfaces, or portions thereof, that when coaxially mounted on a shaft, are at an angle to the shaft such that at least one surface, when extended, would intersect an axis of rotation. So, the term "conical magnet" is meant to cover any configuration of magnet that has at least a portion of a surface that is conical or tapered toward a point coaxial with, or on, an axis of rotation. For example, at least one type of conical magnet has one or more surfaces whereby the cross-sections of the magnet at each of those surfaces generally (or on average) either increase or decrease progressively along the axial length of the magnet. In at least one specific embodiment, a relevant dimension for describing a portion of conical magnet surface is a surface boundary, such as a contoured surface area that can be oriented in space with respect to a line. Note that FIGS. 9E, 9K and 9L depict cylindrically-shaped magnets that do not include at least a portion of a confronting surface (i.e., a surface configured to confront a pole face) that is other than cylindrical. As such, these types of shapes are generally not considered within the definition of what is deemed a conical magnet.

FIG. 9A shows a full cone-shaped magnet as an example of a conical magnet, whereas FIG. 9B depicts a conical magnet being a truncated cone magnet described as a "frustum of a right circular cone," which is a frustum created by slicing the top off a right circular cone (e.g., the slice forming an upper base parallel to the lower base, or outer surface, of the right circular conical magnet). Note that other cone angles other than that shown in FIG. 9A are within the scope of the present invention. FIG. 9C shows that a conical magnet can include cylindrical portions added to the large diameter end (or, in some cases, to the small diameter end, such as shown in FIG. 9J) to optimize magnetic flux in the circuit. FIG. 9D illustrates a conical magnet being of a "stepped" or graduated form. FIGS. 9F and 9G show examples of alternative shapes suitable for implementing a magnet in accordance with embodiments of the present invention, where a conical magnet can be a hemispherically-shaped magnet. FIGS. 9H and 9I are general representations showing that conical magnets of various embodiments can have any type of concave surface and/or any type of convex surface, respectively.

FIG. 9J shows an exemplary conical magnet in accordance with one embodiment of the present invention. Here, conical magnet 940 includes an outer surface 950 in which a cavity 952 is formed. Cavity 952 is optional and can be used to house bearings or the like. In some embodiments, cavity 952 extends inside one or more of surfaces 954, 956 and 958. Note that cavity 952 can have differing inside dimensions along its axial length. Conical magnet 940 includes three surfaces: a first cylindrical surface 954, a conical surface 956 and a second cylindrical surface 958. In various embodiments, conical magnet 940 can include: fewer or more surfaces, cylindrical surfaces having larger or small diameters, steeper or shallower angles of inclination for conical surface 956, etc.

FIGS. 9K and 9L show an end view and a side view, respectively, of an exemplary cylindrical magnet, according to one embodiment of the present invention. Cylindrical magnet 961 is composed of two cylindrical magnets 960 and 962. In this example, cylindrical magnet 962 is disposed (e.g., inserted) within cylindrical magnet 960. In one embodiment, cylindrical magnet 962 is composed of NdFe magnetic material (or a variant thereof) and cylindrical magnet 960 is composed of a ceramic magnetic material. In some embodiments, cylindrical magnet 962 is absent, thereby forming a ring magnet composed of cylindrical magnet 960 (mounting fixtures not shown). In at least one specific embodiment, cylindrical magnet 962 can be composed of a magnetically permeable material rather than a magnet material. In one embodiment, cylindrical magnet 962 need not extend through cylindrical magnet 960, but rather can extend from one end to any axial length within cylindrical magnet 960. FIGS. 9M and 9N show an end view and a side view, respectively, of an exemplary conical magnet, according to one embodiment of the present invention. Conical magnet 971 is composed of two conical magnets 970 and 972. In this example, conical magnet 972 is disposed (e.g., inserted) within conical magnet 970. In one embodiment, conical magnet 970 is composed of NdFe magnetic material (or a variant thereof) and conical magnet 972 is composed of a ceramic magnetic material. In some embodiments conical magnet 972 can be composed of a magnetically permeable material instead of magnet material. In some embodiments, conical magnet 972 is absent, thereby forming a hollowed conical magnet composed of conical magnet 970 (mounting fixtures not shown). In one embodiment, conical magnet 972 need not extend through conical magnet 970, but rather can extend from one end to any axial length within conical magnet 970.

FIGS. 9O and 9P illustrate yet other conical magnets in accordance with yet other embodiments of the present invention. FIG. 9O illustrates a pyramidal-shaped magnet as a conical magnet, albeit truncated, formed with any number of truncated triangular surfaces 978. FIG. 9P illustrates a conical magnet 980 of at least one embodiment, where conical magnet 980 includes a truncated pyramidal magnet 990 including magnetic regions 992 formed either therein or thereon. Magnetic regions 992 include magnet material that is different from that of truncated pyramidal magnet 990. Each of those magnetic regions 992 can be selected to have any predetermined polarity. In one embodiment, truncated pyramidal magnet 990 is four-sided and is composed of a ceramic material (e.g., magnet material), and each magnetic region 992 (two of which are hidden from view) is composed of NdFe magnet material that is formed upon truncated pyramidal magnet 990. In other embodiments, pyramidal magnet 990 can have any number of sides. In various embodiments, pyramidal magnet 990 is a magnet support and need not be composed of a magnet material, but rather can be composed of magnetically permeable material. In some embodiments, a magnet support 990 can be formed as having any shape as those shown in FIGS. 9A to 9I, with any number of magnetic regions 992 being disposed on magnet support 990. In that case, magnetic regions 992 can be of any shape suitable to be disposed on specific shapes of magnet support 990. For example, while the FIGS. 9O and 9P depict conical magnets, the magnet in FIG. 9O can be cylindrical in nature (i.e., with numerous flat surfaces 978 constituting the cylindrical magnet surface, with the end views appearing like a hexagon or some other polygon). As another example, the magnet in FIG. 9P can include a cylindrically-shaped magnet support 990 rather than pyramidal-like shape. Again, other than FIGS. 9E, 9K and 9L, the conical magnets that are illustrated in the foregoing are merely examples of conical magnets of the present invention.

In a specific embodiment of the present invention, conical magnets are anisotropic, diametrically magnetized, and shaped as a truncated cone with about 30 degrees of cone angle relative to an axis of rotation. The conical and cylindrical magnets, according to some embodiments, are diametrically magnetized in directions that are generally in a plane that is substantially perpendicular to the axis. At least one advantage of these types of magnet configurations is that such diametric conical magnets can be magnetized in the same direction as the original magnetic orientation of the magnet material, which provides a higher energy product for the magnet (i.e., a more powerful magnet). Anisotropic magnets are also relatively easy to manufacture and have relatively high magnetic efficiency per unit magnet volume. Another advantage of a diametric (i.e., 2 pole) magnet is that in a motor having three active field pole members and three phases, there is only one electrical revolution for each mechanical revolution of the motor. Accordingly, the diametric magnet, in whole or in part, reduces eddy current losses, hysteresis ("core" or "iron") losses and electrical switching losses in a motor drive circuit. In some embodiments, a conical magnet can: (1) include a steel core instead of being solid magnet material, (2) be constructed from ring magnets exhibiting good coercivity, (3) be constructed from arc-segment magnets, (4) be molded directly onto the shaft, (5) be radially polarized, (6) include a hollow core instead of being solid magnet material, or can include any other similar characteristics.

Figure 10:
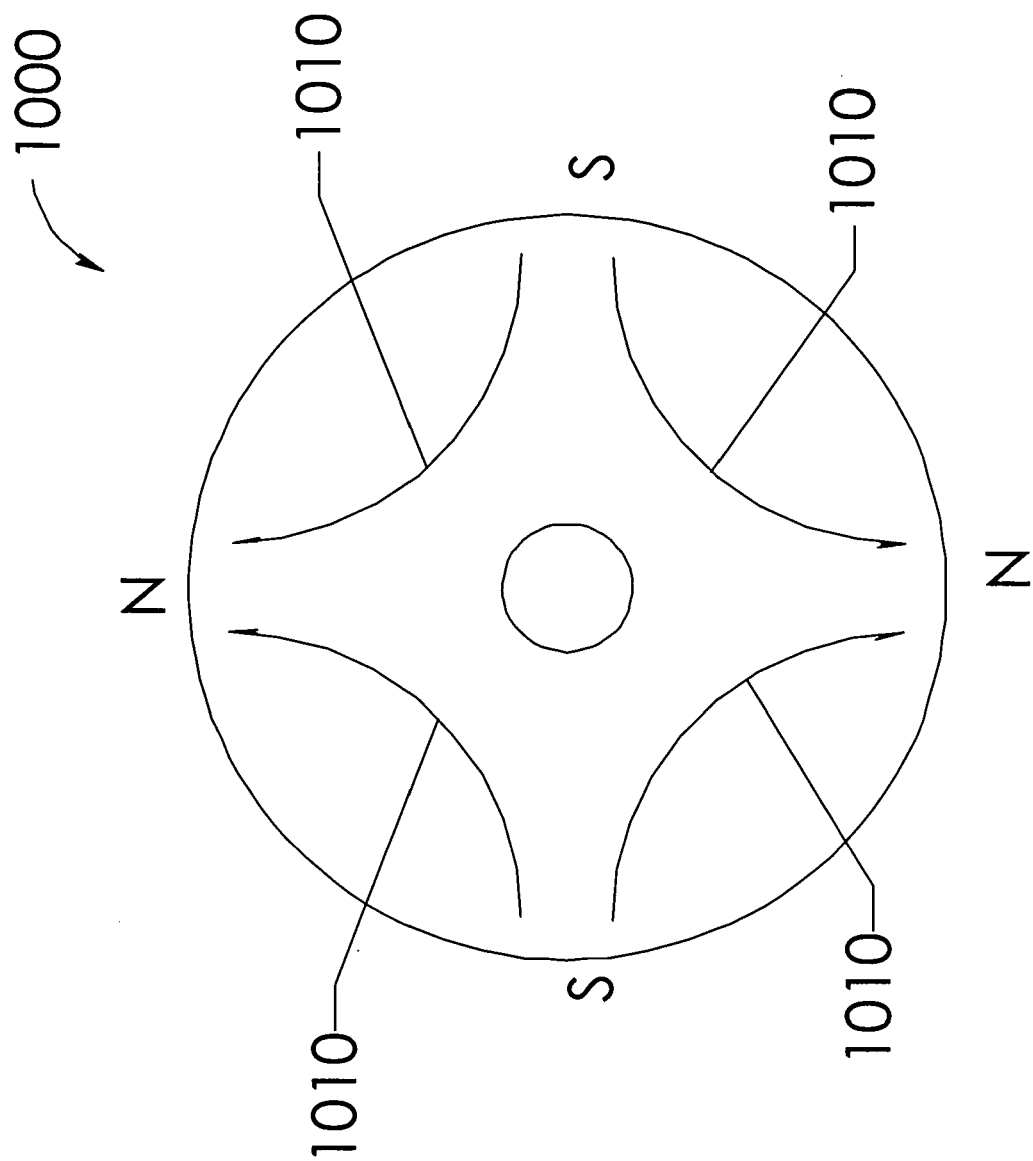
FIG. 10 shows a multiple pole magnet, according to an embodiment of the present invention.

FIG. 10 shows a multiple pole magnet, according to one embodiment of the present invention. In this example, permanent magnet 1000 is a four-pole magnet being magnetically oriented to have arcuate magnetic paths 1010 from south poles ("S") to north poles ("N"). Other numbers of poles and magnet orientations are within the scope and spirit of the present invention. Further, a multiple pole magnet, such as permanent magnet 1000, can be either a monolithic magnet or a non-monolithic magnet according to some embodiments. As used herein, the term "monolithic," as applied to a permanent magnet, suggests that the permanent magnet is composed of integrated magnetic poles, such that the permanent magnet is non-discrete and is substantially homogenous in structure. As such, a monolithic permanent magnet lacks any physical interfaces between the magnetic poles. A monolithic magnet therefore is composed of continuous magnet material. By contrast, permanent magnet 1000 can be a non-monolithic magnet composed of separate magnets, with each separate magnet contributing an outward facing north or south pole, whereby physical interfaces exist between the separate subcomponents. As such, a non-monolithic magnet therefore can be composed of contiguous, but noncontinuous magnet material. In particular, each separate subcomponent includes continuous magnet material, but the physical interfaces give rise to discontinuities in the magnet material that constitutes the magnet as a whole. Note that the term "monolithic" can also apply to field pole members and other elements of the various rotor-stator structures of the present invention. Note that in at least one embodiment, non-monolithic magnets can include those magnets where separate subcomponents are arranged at a distance from each other such that they do not contact each other.

Figure 11A:
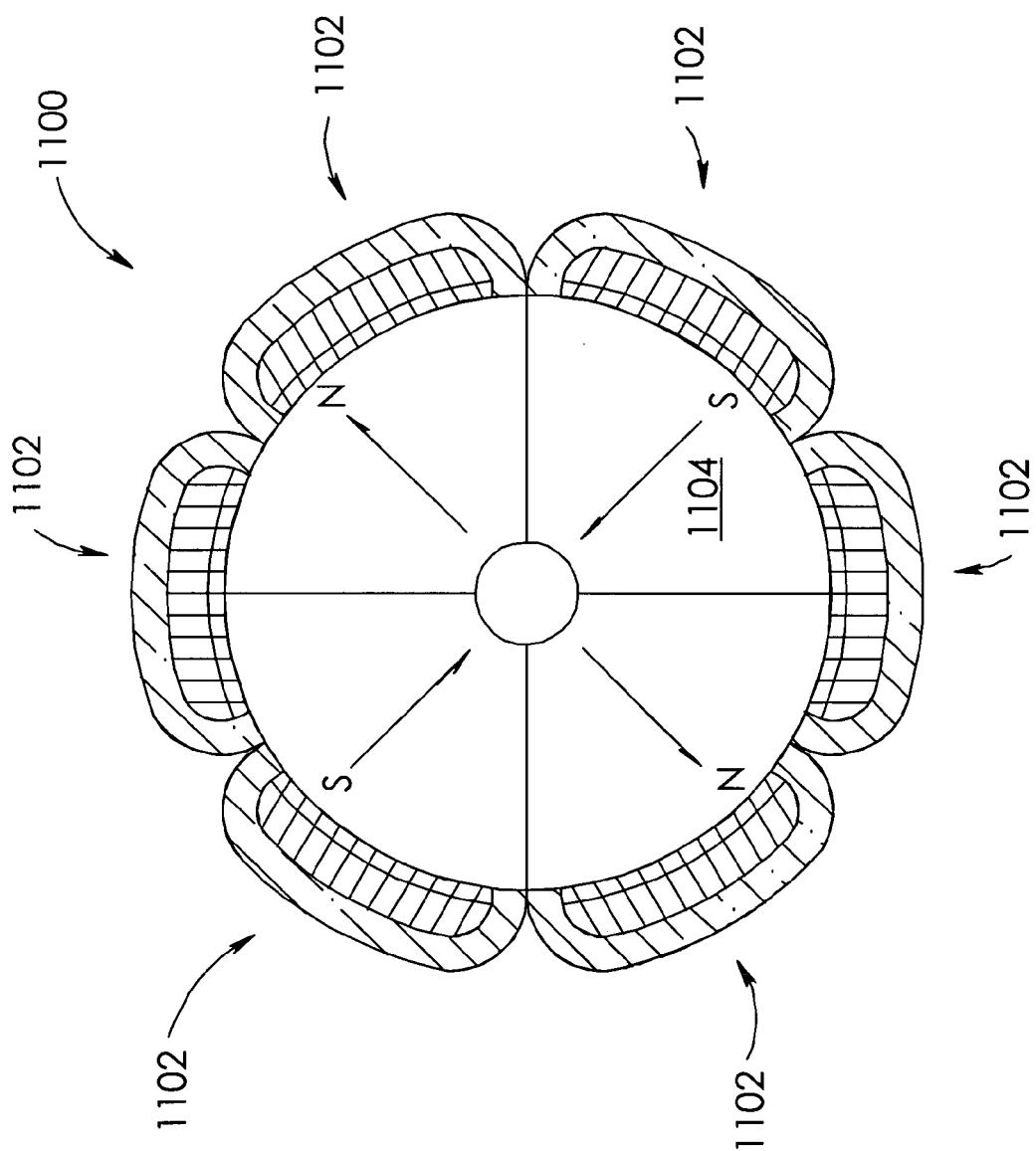
FIGS. 11A to 11C depict other examples rotor-stator structures in accordance with various embodiments of the present invention.

FIG. 11A shows a side view of a rotor-stator structure 1100 as an alternate embodiment of the present invention. Generally, a quantity of three active field pole members efficiently uses a cylindrical volume or space that is typically available inside the motor or generator. As such, "three" active field pole members are generally used to provide a relatively high packing density. But to provide more balanced operation, more than three active field pole members can be used. As shown, six active field pole members 1102 are arranged coaxially to and positioned equidistantly about an axis of rotation. Also, a four-pole magnet 1104 is positioned adjacent to the pole faces of active field pole members 1102. In this instance, four-pole magnet 1104 is a composite of individual magnet arc-segments. Rotor-stator structure 1100 can provide more balance magnetically relative to rotor-stator structures that include three active field pole members, because coils of opposing active field pole members 1102 can generally be excited at the same time. Other numbers of active field pole members and other even numbers of magnet poles can suitably be combined to implement rotor-stator structures of the present invention.

Figure 11B:
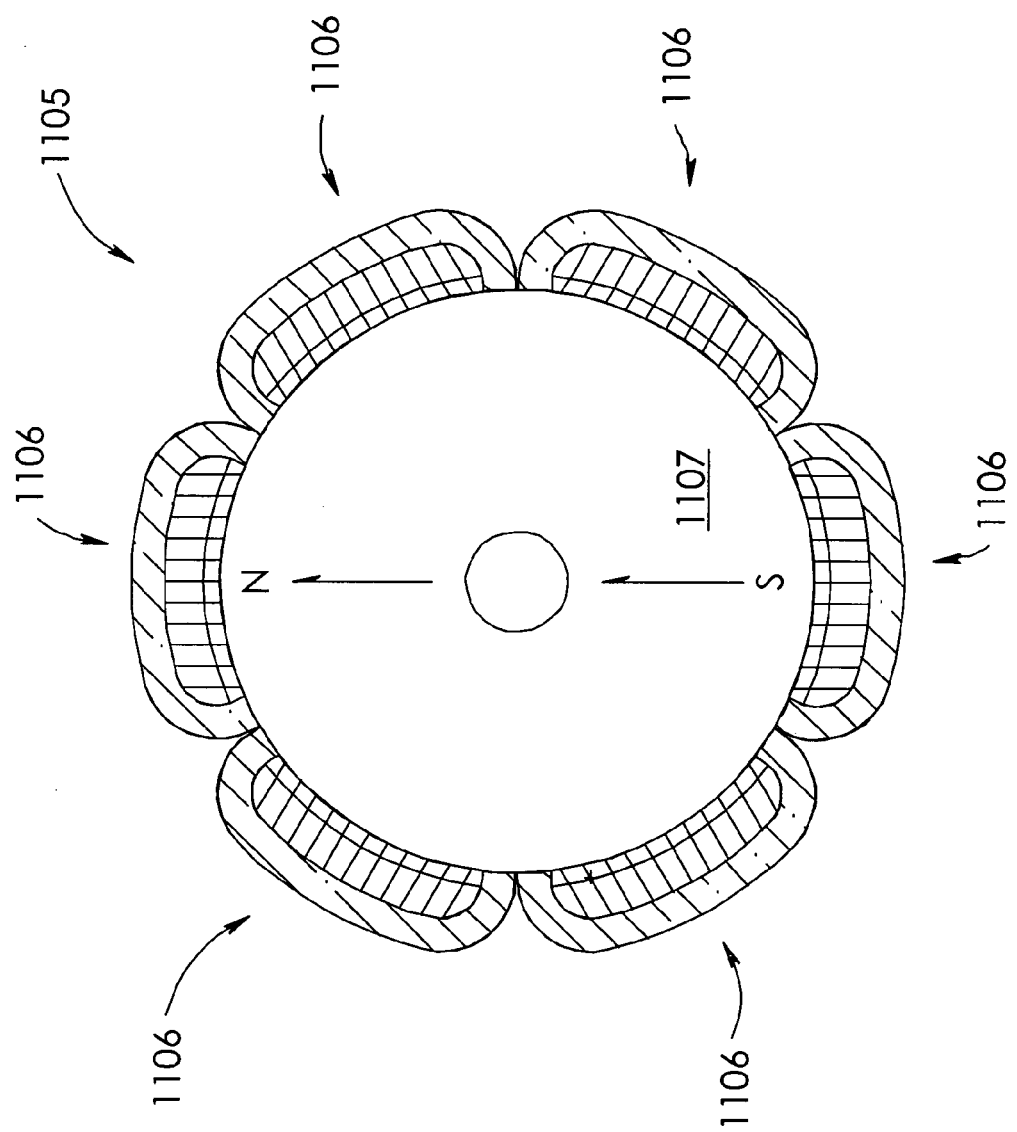
Figure 11C:
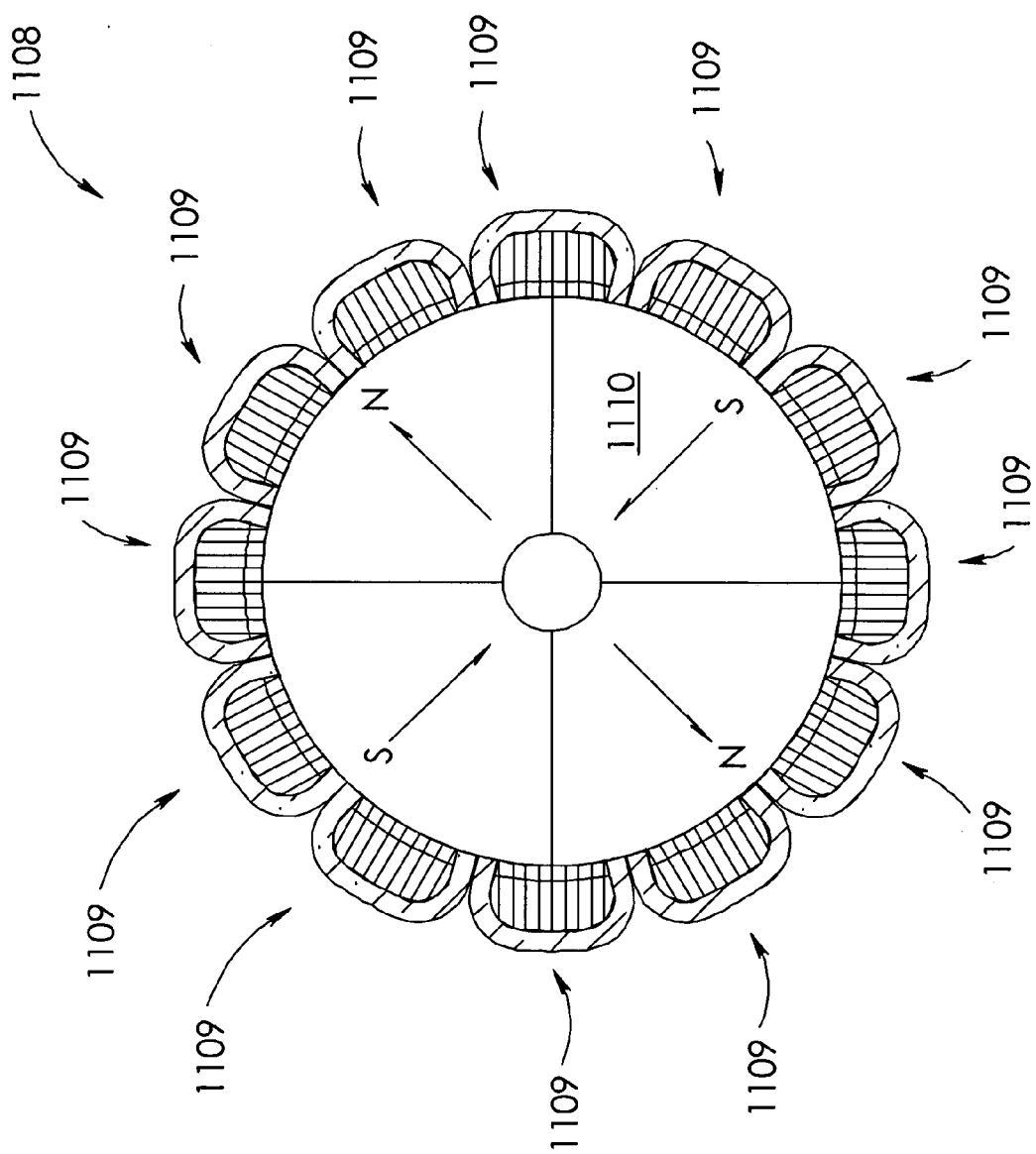

FIGS. 11B to 11C illustrate a subset of the variations in the number of field pole members and/or magnet poles, according to various embodiments of the present invention. FIG. 11B shows a side view of a rotor-stator structure 1105 having six field pole members 1106 and a two-pole magnet 1107, according to one embodiment of the invention. FIG. 11C depicts a side view of a rotor-stator structure 1108 that includes twelve field pole members 1109 and a four-pole magnet 1110, according to another embodiment of the present invention. Again, rotor-stator structures 1100, 1105 and 1108 depict only a few of the many field pole member-magnet pole combinations in accordance with various embodiments of the present invention.

In at least one specific embodiment of the present invention, an exemplary rotor-stator structure is disposed in an electrical motor to generate a torque amplitude that depends on at least one or more of the following: the volume of the magnets, the vector directions of the interacting fields in the flux interaction regions, the flux density in flux interaction regions, the area of the air gaps, and the area of the pole faces. So, the higher the flux density produced by the permanent magnets and the higher the flux density produced by the active field pole members, the higher the torque that will be developed until significant saturation is reached in the field pole members. The magnet materials of such a rotor-stator structure should have sufficient coercivity to prevent partial or total demagnetization in an intended application.

Figure 12A:
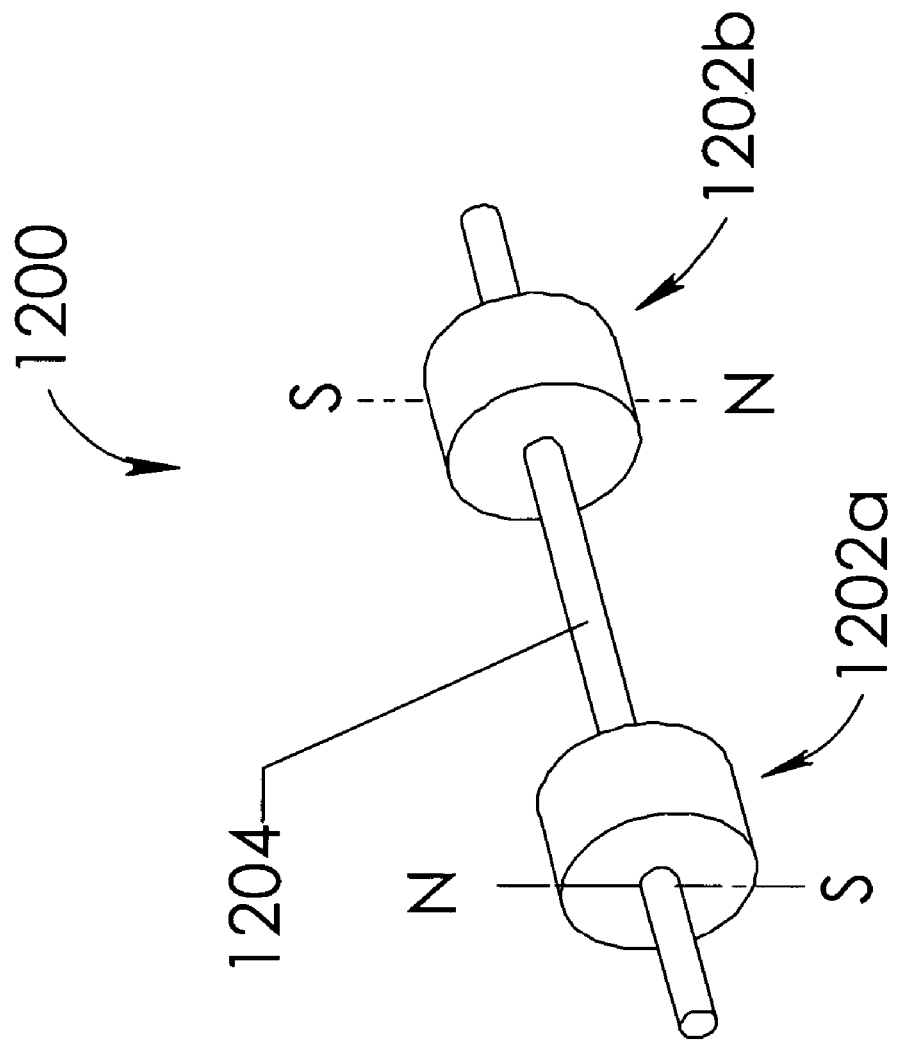
Figure 12C:
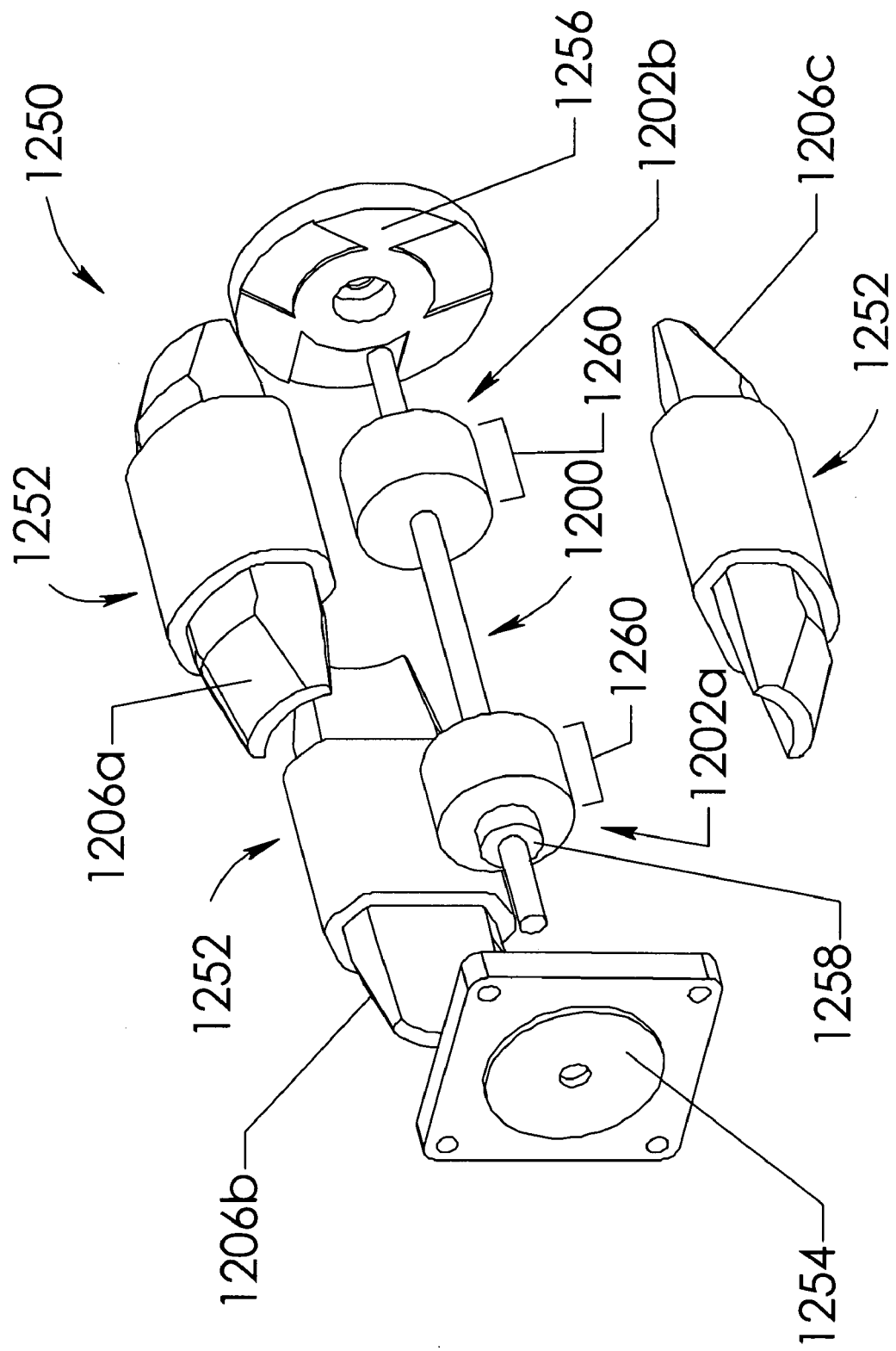

FIGS. 12A to 12D illustrate another rotor-stator structure in accordance with the present invention. FIG. 12A depicts a rotor assembly 1200 including at least two cylindrical permanent magnets 1202a and 1202b mounted on or affixed to a shaft 1204. As shown, cylindrical magnets 1202a and 1202b are diametrically magnetized and positioned to have their north poles ("N") pointing in substantially opposite directions. FIG. 12B shows two views of a field pole member 1220 including two pole faces 1224. Note that pole faces 1224 in this example are contoured or shaped so as to mimic the contours of the cylindrical surfaces of cylindrical permanent magnets 1202a and 1202b, thereby providing a relatively uniform air gap thickness for either portions of the cylindrical surfaces or the entire cylindrical surfaces. In various embodiments, field pole member 1220 can be composed of laminations (not shown) and can have functionality and/or structure as described with respect to other embodiments. FIG. 12C is an exploded view of an exemplary rotor-stator structure in accordance with a specific embodiment of the present invention. In this example, rotor-stator structure 1250 is configured to increase torque generated per unit size (or per unit weight) for electric motor implementations by at least minimizing the length of magnetic flux paths through field pole members. As field pole members 1206 provide substantially straight flux path segments therein, linear deviations of magnetic flux can be minimized. Typically, the path segments are generally parallel to the axis of rotation. Further, rotor-stator structure 1250 can implement field pole members 1206 that are straight or substantially straight to minimize reluctance of those field pole members. As reluctance is minimized, so too are magnetic losses. In the example shown in FIG. 12C, rotor-stator structure 1250 includes rotor assembly 1200, three active field pole members 1252 (each of which implements field pole member 1206 and a coil), end plates 1254 and 1256, and bearings 1258. Note that cylindrical surfaces 1260 (also referred to as magnet surfaces) of cylindrical magnets 1202*a* and 1202*b* are used to confront pole faces 1224 (FIG. 12B). Such magnet surfaces can be described as being interfacial as magnetic flux passes through those surfaces when the flux enters or exits pole faces 1224. The magnet surfaces, in whole or in part (i.e., cylindrical portions thereof), define air gaps between cylindrical surfaces 1260 and pole faces 1224. In at least one embodiment, pole faces 1224 are contoured to maintain a uniform thickness for each of the air gaps to increase flux interaction between cylindrical magnets 1202*a* and 1202*b* (FIG. 12C) and field pole members 1206*a*, 1206*b*, and 1206*c*, thereby increasing output torque in a predictable manner. In cases where field pole members 1206*a*, 1206*b*, and 1206*c* are composed of laminates, pole faces 1224 are contoured to maintain at least a substantially uniform thickness for each of the air gaps.

Figure 12D:
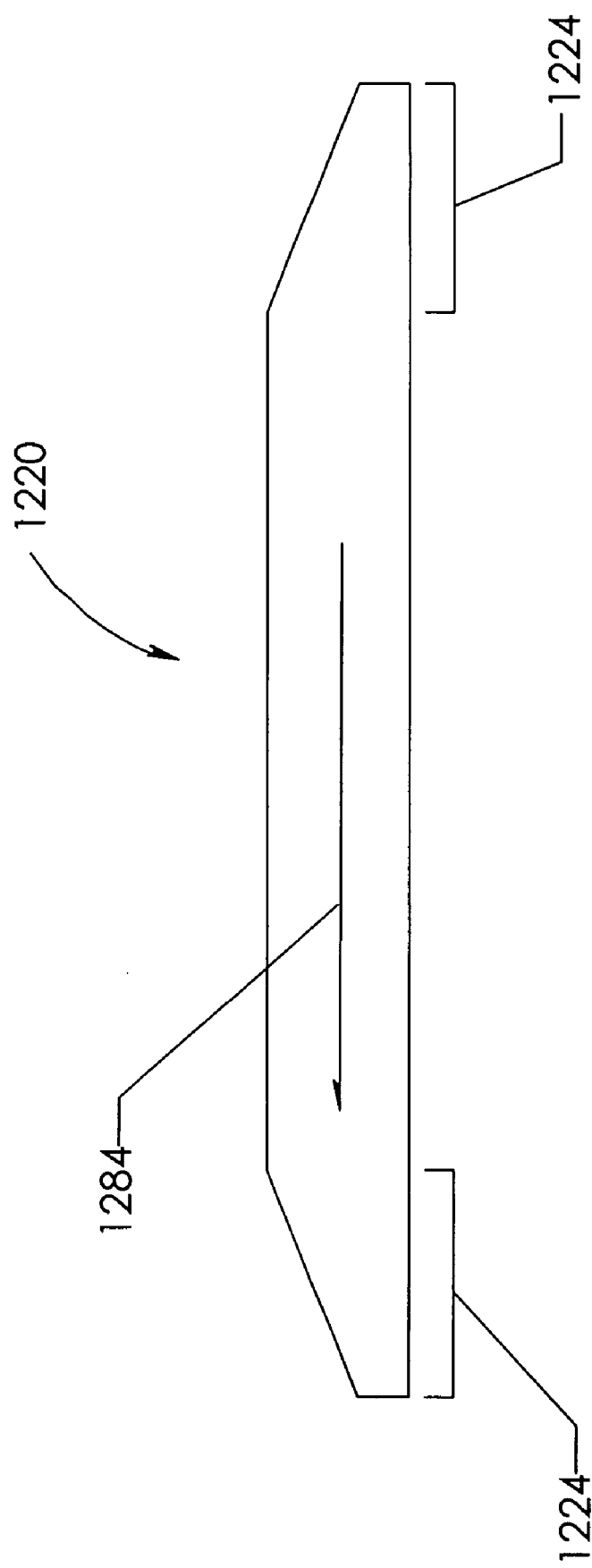

FIG. 12D shows a side view of a cross-section for field pole member 1220 (FIG. 12B) depicting a straight line 1284 that is indicative of a straight flux path segment in field pole member 1220 regardless of whether the magnetic flux path passes from either a permanent magnet or an Ampere Turn ("AT")-generated flux. In various embodiments of the present invention, the path over which flux passes is a function, in whole or in part, of the shape of field pole member 1220. Note that straight line 1284 is representative of straight flux paths between pole faces 1224 of field pole member 1220.

Figure 13A:
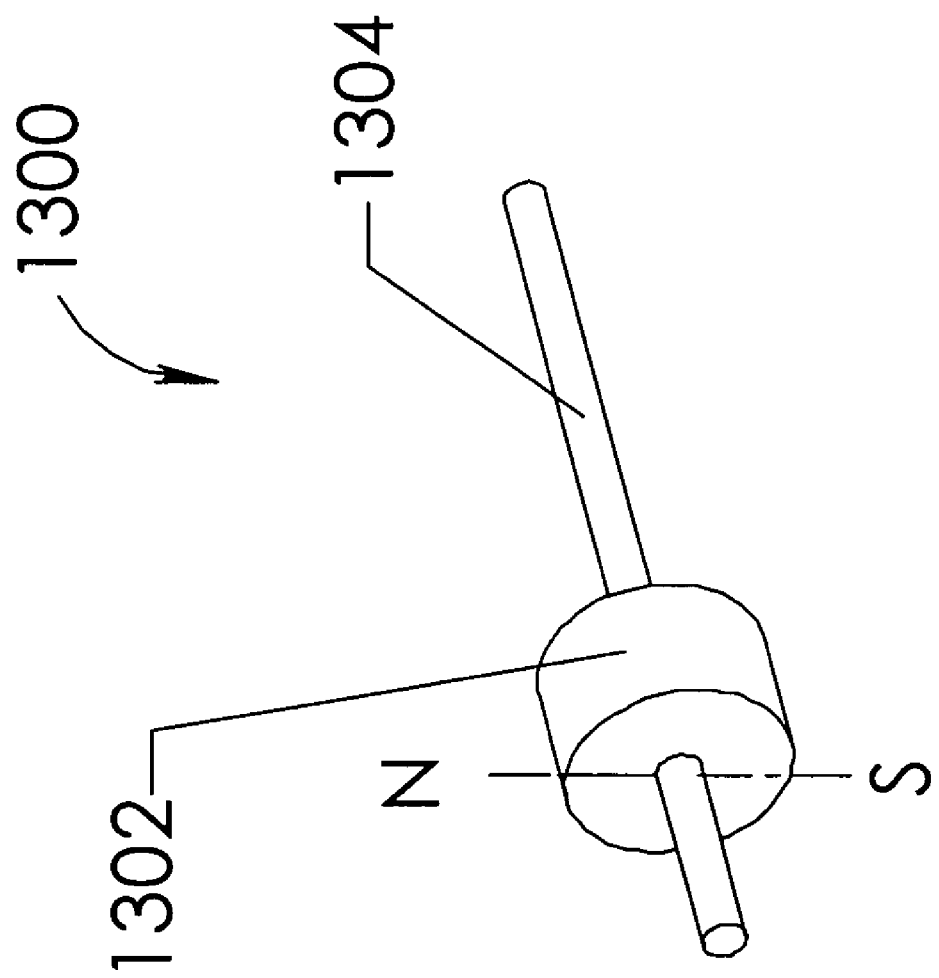
FIGS. 13A to 13D illustrate examples of other rotor-stator structures that implement only one magnet in accordance with various embodiments of the present invention.
Figure 13B:
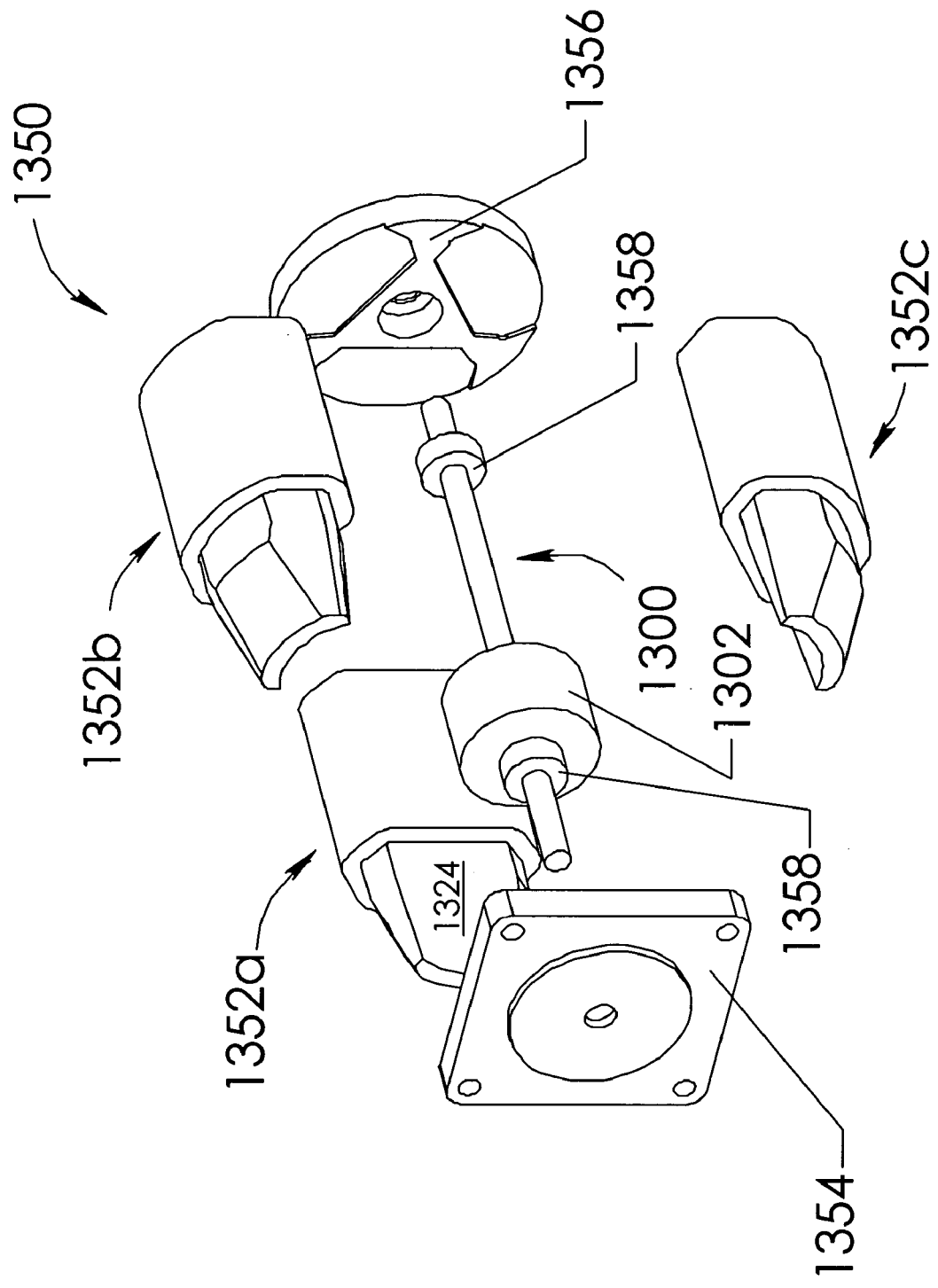

FIGS. 13A and 13B illustrate yet another rotor-stator structure in accordance with at least one embodiment with the present invention. FIG. 13A depicts a rotor assembly 1300 including only one magnet, which in this example, is a cylindrical magnet 1302 mounted on a shaft 1304. As shown, FIG. 13B is an exploded view of an exemplary rotor-stator structure in accordance with a specific embodiment of the present invention. In this instance, rotor-stator structure 1350 includes rotor assembly 1300, three active field pole members 1352 (i.e., 1352*a*, 1352*b*, and 1352*c*), end plates 1354 and 1356, and bearings 1358. In one embodiment, plate 1354 is a non-magnetic end plate and end plate 1356 is a magnetically permeable end plate for transferring flux between active field pole members 1352. In some embodiments, end plate 1356 is a non-magnetic end plate and rotor-stator structure 1350 includes a flux-carrying member (not shown) that is magnetically permeable to complete the magnet circuit through cylindrical magnet 1302. The flux-carrying member magnetically couples the other ends of active field pole members 1352 at which there are not pole faces. The field pole member implemented as part of active field pole members 1352 is similar in some respects to field pole member 1220 of FIG. 12B and to any one of field pole members 1206*a*, 1206*b*, and 1206*c* of FIG. 12C. But in this instance, each of the field pole members of active field pole members 1352 includes only one pole face as there is only one permanent magnet with which to interact. One example of a single pole face is pole face 1324. In alternate embodiments, other-shaped magnets can be substituted for cylindrical magnet 1302 to implement other configurations of rotor-stator structure 1350. Further, rotor-stator structure 1350 can additionally include other features of the various embodiments described herein.

Figure 13C:
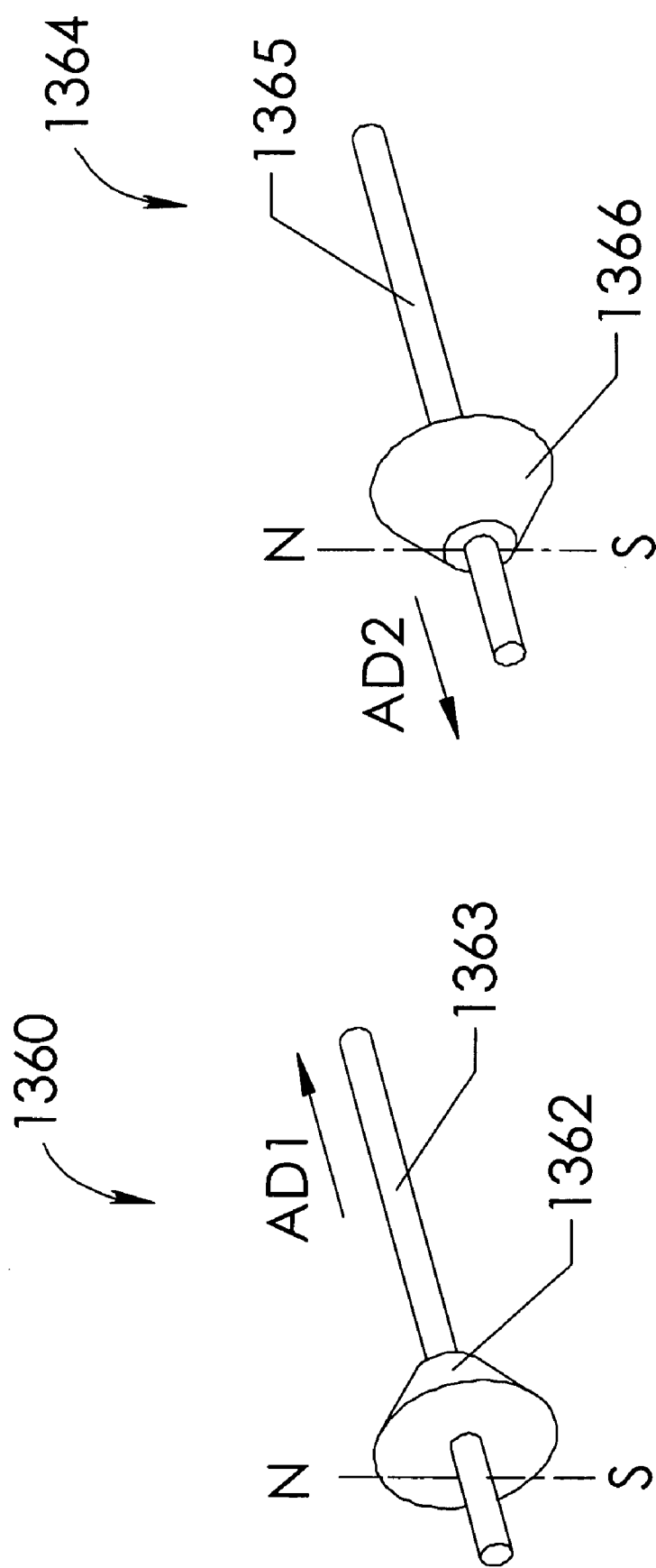
Figure 13D:
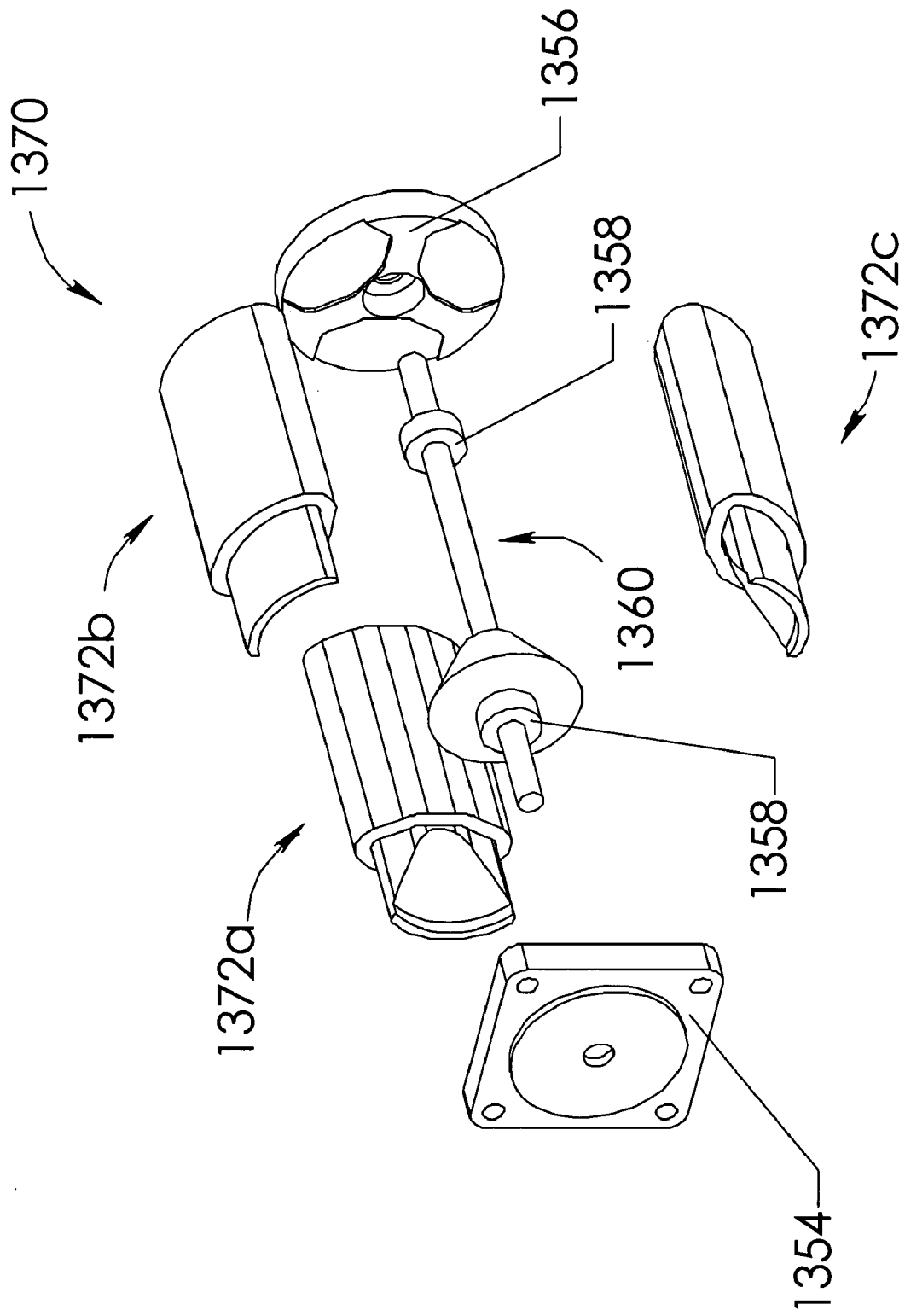

FIGS. 13C and 13D illustrate still yet another rotor-stator structure in accordance with at least one embodiment of the present invention. FIG. 13C depicts rotor assemblies 1360 and 1364 including only one conical magnet each. In particular, rotor assembly 1360 includes a conical magnet 1362 mounted on a shaft 1363 such that at least a portion of a conical surface for conical magnet 1362 faces a first axial direction ("AD1"). By contrast, rotor assembly 1364 includes a conical magnet 1366 mounted on a shaft 1365 such that at least a portion of a conical surface for conical magnet 1366 faces a second axial direction ("AD2"), where the second axial direction is opposite from the first axial direction. In at least one embodiment, the first axial direction is toward a flux-carrying member (not shown), such as a magnetically permeable end plate 1356 (FIG. 13B). While rotor assembly 1364 might generate relatively longer flux paths that are less straight than those produced with rotor assembly 1360, such differences can be negligible in certain applications (e.g., in those cases where motor performance is not a critical requirement). Note that the relative positions at which conical magnets 1362 and 1366 are mounted on respective shafts 1363 and 1365 are merely examples of some of the possible positions. As such, conical magnets 1362 and 1366 each can be positioned anywhere on a shaft, including the center of either shaft 1363 or shaft 1365. FIG. 13D is an exploded view of an exemplary rotor-stator structure in accordance with a specific embodiment of the present invention. As shown, rotor-stator structure 1370 includes rotor assembly 1360 (FIG. 13C), three active field pole members 1372 (i.e., 1372*a*, 1372*b*, and 1372*c*) each of which is similar in functionality as those similarly named in FIG. 13B. But three active field pole members 1372 of FIG. 13D include field pole members that each include only one pole face, whereby each of the single pole faces of three active field pole members 1372 are contoured to confront the conical magnet surfaces of rotor assembly 1360. Rotor-stator structure 1370 also includes end plates 1354 and 1356 as well as bearings 1358. Further, rotor-stator structure 1370 can additionally include other features of the various embodiments described herein.

Figure 14:
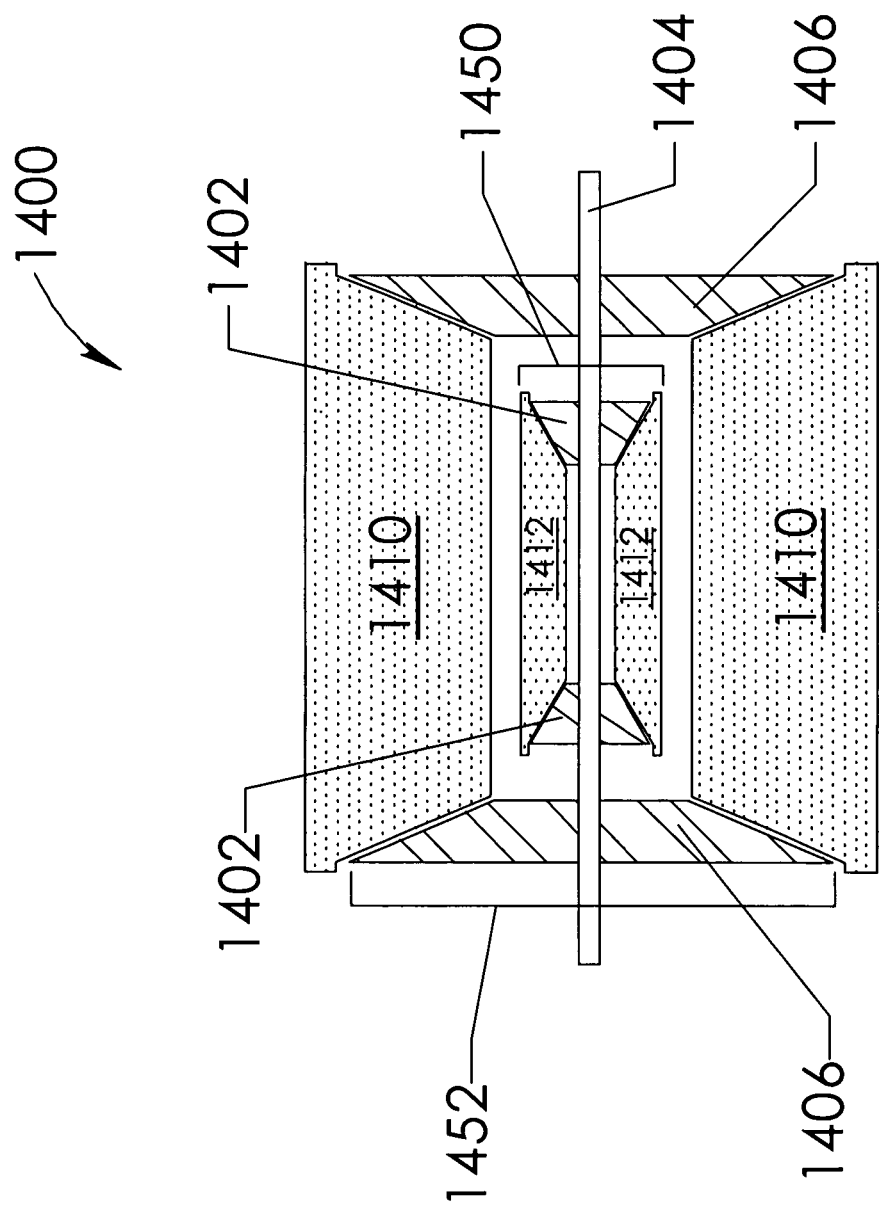
FIGS. 14 and 15 depict examples of implementations of more than two magnets in accordance with various embodiments of the present invention.
Figure 15:
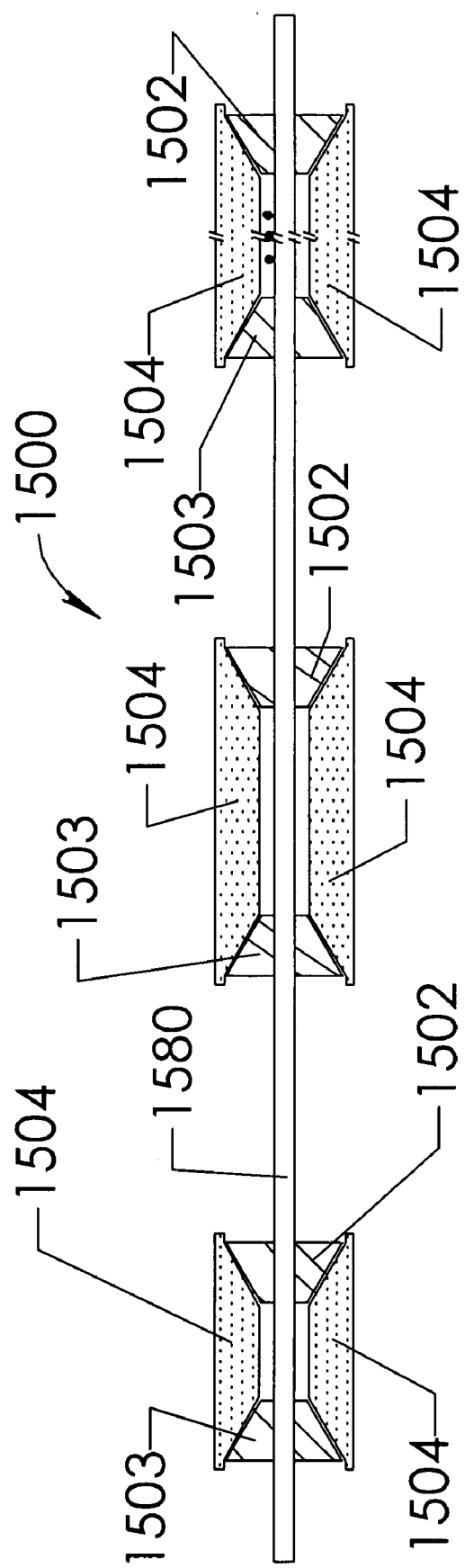

FIGS. 14 and 15 depict exemplary implementations of more than two conical magnets in accordance with various embodiments of the present invention. FIG. 14 shows that both sets of conical magnets are arranged to face each other. A first set includes conical magnets 1402 and a second set includes conical magnets 1406, with both sets being affixed to a shaft 1404. In one embodiment, two sets of field pole members in cooperation with pairs of conical magnets of differing diameter can be used to form a compound motor 1400. In particular, compound motor 1400 is formed by integrating two or more motors in parallel, such as inner motor 1450 and outer motor 1452. In this example, an inner motor 1450 includes conical magnets 1402 and active field pole members 1412, conical magnets 1402 having smaller diameters than conical magnets 1406. Outer motor 1452 includes an inner motor 1450 as well as conical magnets 1406 and active field pole members 1410. In one embodiment, conical magnets 1402 and 1406 face away from each other and toward opposite axial directions. In alternate embodiments, other-shaped magnets, such as cylindrical, can be substituted for conical magnets 1402 and 1406.

FIG. 15 illustrates that any number of conical magnets 1502 and 1503 can be arranged on a shaft 1504. In particular, a first set of conical magnets 1502 has their conical surfaces facing one axial direction, and a second set of conical magnets 1503 are arranged to have each conical surface facing another axial direction, which is a direction 180 degrees different than that faced by conical magnets 1502. According to various embodiments of the present invention, any number of conical magnets (e.g., any even or odd number) can be arranged on a shaft, in many orientations or directions, with one or more active field pole members being adapted to interact with those conical magnets. In one embodiment, active field pole members 1504 are included with pairs of conical magnets 1502 and 1503 to form any number of motors in series with each other. For example, series motor 1500 includes three motors sharing the same shaft 1580. Each motor includes one conical magnet 1502, one conical magnet 1503, and any number of active field pole members 1504. Series motor 1500 is well suited for use in down-hole drills and pumps where high torque in a relatively small diameter is desired and axial length is of minimal significance. In alternate embodiments, other-shaped magnets, such as cylindrical, can be substituted for conical magnets 1502 and 1503

Figure 16:
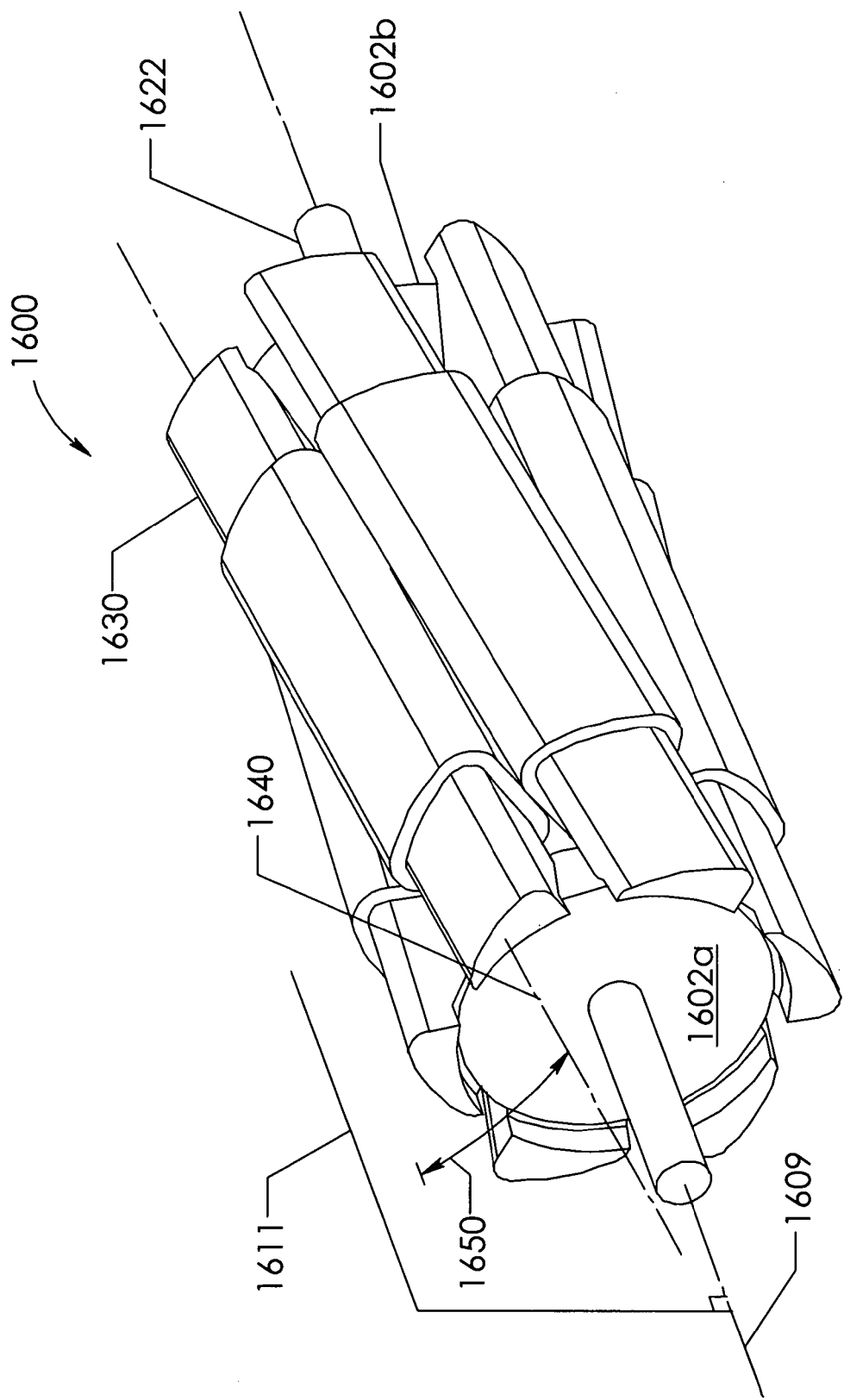
FIG. 16 depicts an alternative implementation of a rotor-stator structure having skewed orientations for its field pole members in accordance with one embodiment of the present invention.

FIG. 16 depicts an alternative implementation of a rotor-stator structure having skewed orientations for its field pole members in accordance with one embodiment of the present invention. Rotor-stator structure 1600 includes a number of field pole members 1630 arranged coaxially about an axis of rotation 1609 and configured to magnetically couple with magnets 1602*a* and 1602*b*, both of which are assembled on a shaft 1622. In one instance, magnets 1602*a* and 1602*b* can have conical surfaces facing toward each other. In at least one embodiment, each of field pole members 1630 is "skewed" in orientation to the axis 1609 such that a medial line 1640 passing through each field pole member 1630 is at a skew angle 1650 with a plane 1611 passing through axis 1609. By orienting field pole members 1630 at skew angle 1650 from the axis of rotation 1609, detent can be reduced. In one specific embodiment, the pole faces of each of field pole members 1630 can be contoured to confront the surfaces of magnets 1602*a* and 1602*b*. Note that one or more field pole members 1630 need not be active field pole members.

Figure 17A:
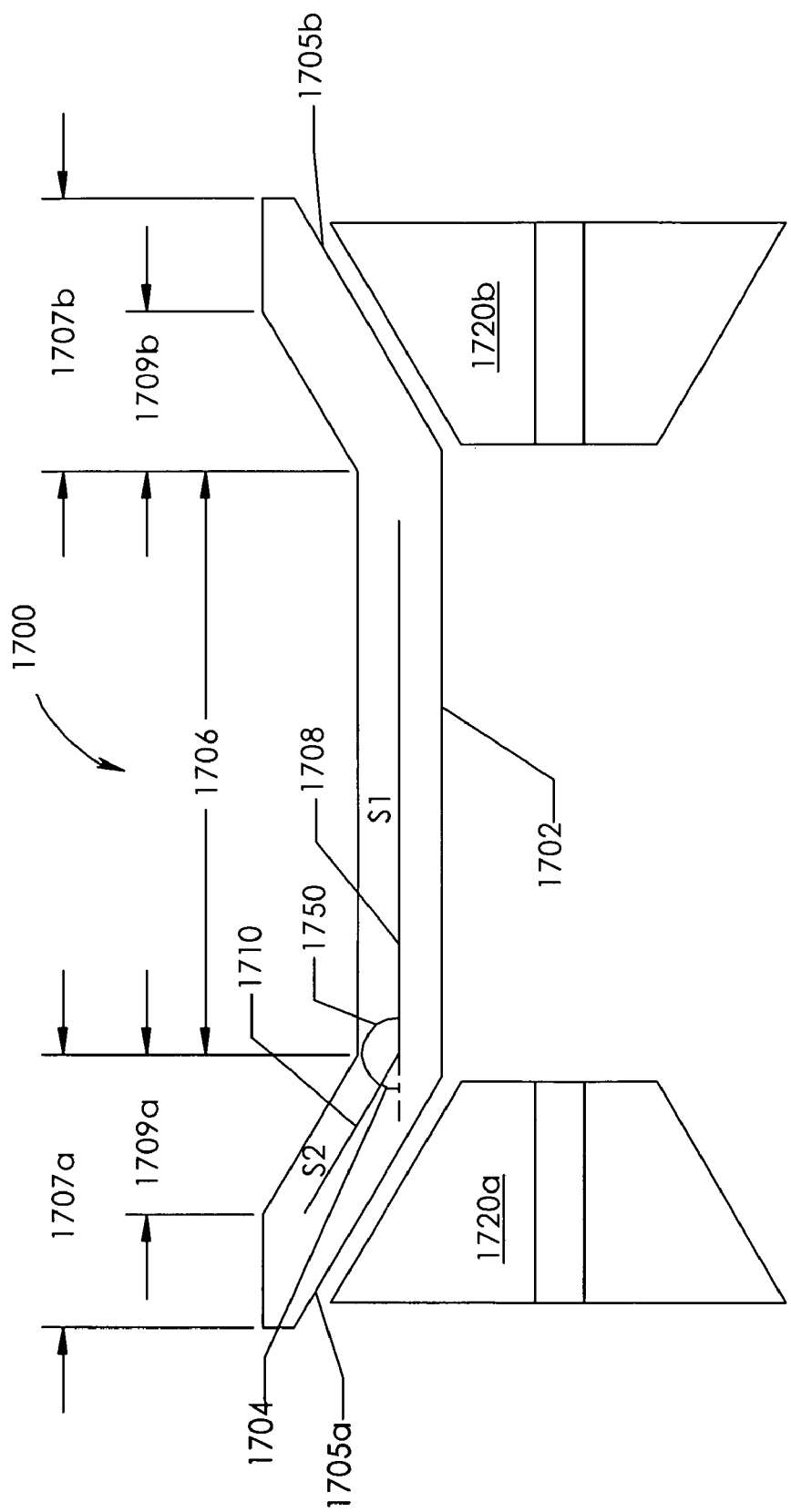
FIGS. 17A and 17B illustrate an example of a field pole member according to a specific embodiment of the present invention.

FIG. 17A is a cross-sectional view illustrating another rotor-stator structure in accordance with one embodiment of the present invention. In the cross-sectional view of FIG. 17A, which is similar to sectional view X-X of FIG. 5A, rotor-stator structure 1700 includes a field pole member 1702 and conical-shaped magnets 1720*a* and 1720*b*. Field pole member 1702 has a first pole shoe 1707*a* and a second pole shoe 1707*b*. First pole shoe 1707*a* is positioned adjacent to at least a portion (e.g., a confronting portion) of a surface of magnet 1720*a* so that a pole face 1705*a* can be used to form a first flux interaction region therewith. Similarly, second pole shoe 1707*b* is positioned adjacent to at least a portion of a magnet surface of magnet 1720*b* so that a pole face 1705*b* can be used to form a second flux interaction region therewith. Both of the flux interaction regions include air gaps having either a uniform thickness or a substantially uniform thickness. Field pole member 1702 also has a central field pole member portion 1706 around which one or more windings can be wound. Note that FIG. 17A distinguishes specific regions or portions of field pole member 1702 as pole shoes 1707*a* and 1707*b*, transition regions 1709*a* and 1709*b*, pole faces 1705*a* and 1705*b*, and central field pole member portion 1706, all of which are merely exemplary and are not to be construed as limiting. As such, other embodiments of the present invention can include regions and portions of field pole member 1702 that are of other sizes, lengths, proportions, dimensions, shapes, etc. than as described above.

Further, first pole shoe 1707*a* and second pole shoe 1707*b* include transition region 1709*a* and transition region 1709*b*, respectively, to offset first pole shoe 1707*a* and second pole shoe 1707*b* (as well as pole faces 1705*a* and 1705*b*) from central field pole member portion 1706. Each of transitions regions 1709*a* and 1709*b* is configured to reduce the reluctance for a flux path between pole faces 1705*a* and 1705*b*. For example, transition regions 1709*a* and 1709*b* provide for a decreased reluctance for flux paths through central field pole member portion 1706 and either first pole shoe 1707*a* or second pole shoe 1707*b*, as compared to traditional field poles that require transition regions to be orthogonal (i.e., ninety degrees) to either central field pole member portion 1706 or first pole shoe 1707*a* and second pole shoe 1707*b*. Generally, the sharper a flux path turns within a field pole member or any like "low reluctance member," such as at or near a ninety degree angle, the higher the reluctance is for that flux path. This in turn leads to increased magnetic losses.

To reduce magnetic losses associated with non-straight flux paths, exemplary field pole member 1702 implements transition regions, such as transition regions 1709*a* and 1709*b*, to provide a transitory flux path segment. Transitory flux path segment 1710 facilitates lowering the reluctance associated with the length of a flux path extending between pole faces, such as pole faces 1705*a* and 1705*b*. As shown in FIG. 17A, transitory flux path ("S2") 1710 provides for an acute angle 1704 (which can be described also by its complementary obtuse angle 1750) from a flux path segment ("S1") 1708 associated with central field pole member portion 1706 to transitory flux path ("S2") 1710. As shown, flux path segment ("S1") 1708 is in a same general direction indicated as transitory flux path ("S2") 1710, which deviates from the direction of that segment 1708 by acute angle 1704. Note that such a deviation can also be described in terms of an obtuse angle 1750, as should be apparent to ordinarily skilled artisans. In a specific embodiment, acute angle 1704 can be between approximately 0 and approximately 60 degrees (including both 0 and 60 degrees). Further, a "non-straight" flux path can be described as a path having two consecutive segments 1708 and 1710 at an angle 1704 between 60 degrees and 90 degrees. In a specific embodiment, a non-straight flux path includes those paths having a subsequent flux path segment deviating at an angle of about ninety degrees from a precedent flux path segment, where both the subsequent and the precedent flux path segments are consecutive. As such, segment 1708 is precedent to segment 1710 (from south to north magnetized flux path) and segment 1710 is subsequent to segment 1708. In some embodiments, the term "substantially straight" can refer to straight flux paths (e.g., paths that have no deviation from a straight line) as well as flux paths that are 60 degrees or less.

In at least one specific embodiment, the term "flux path segment" refers to a line segment extending from one end (or approximately therefrom) of a region or portion of field pole member 1702 to the other end (or approximately thereto), the flux path segment being representative of an approximate magnetic flux path and/or a portion of an interior flux line extending between magnetic poles (e.g., pole faces). For example, flux path segment ("S1") 1708 extends the approximate length of central field pole member portion 1706 and transitory flux path ("S2") 1710 extends the approximate length of transition region 1709*a*.

Figure 17B:
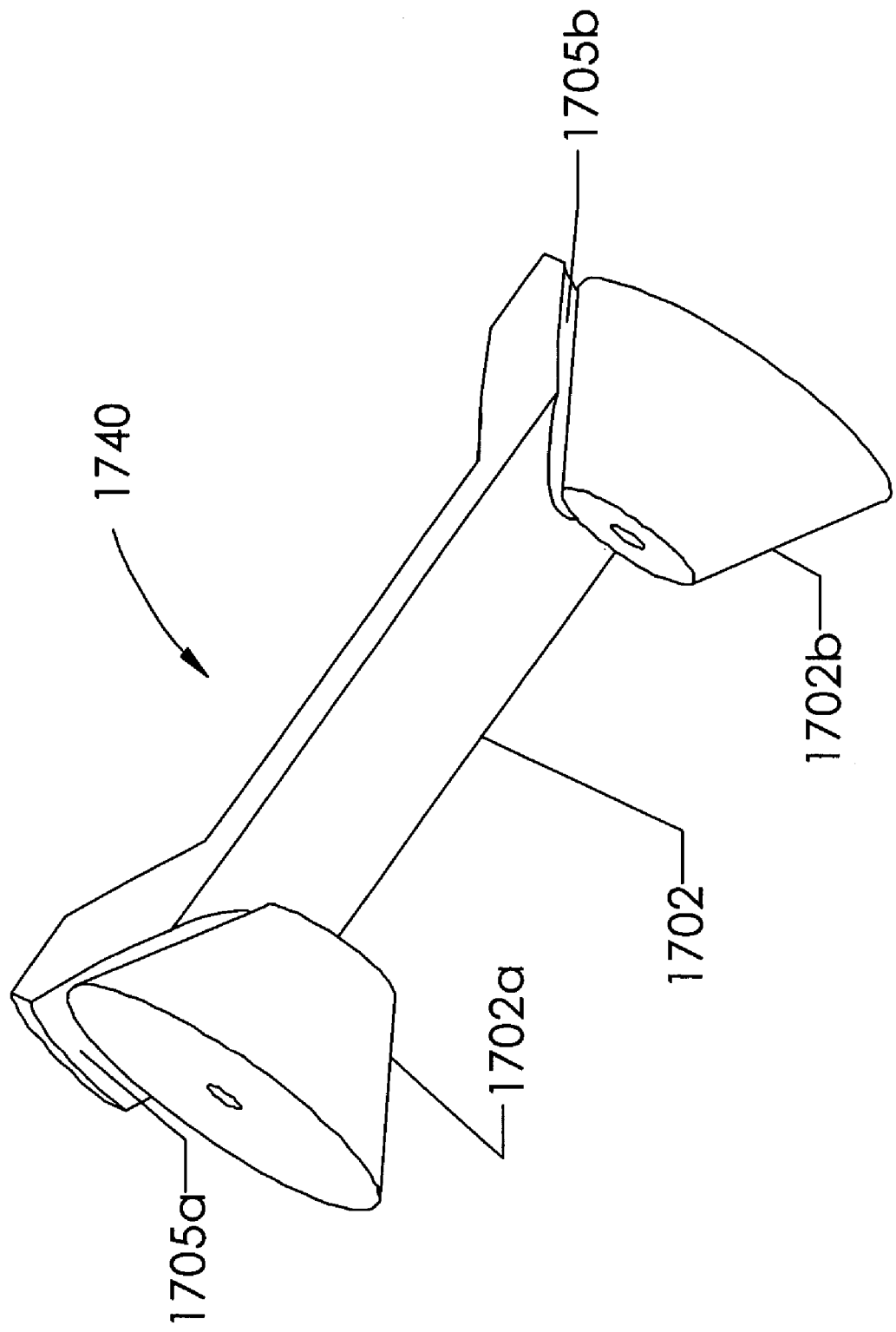

FIG. 17B illustrates a perspective view of a field pole member in accordance with a specific embodiment of the present invention. As shown, a field pole member 1702 (FIG. 17A) includes pole faces 1705*a* and 1705*b* contoured to confront the conical surfaces of conical magnets 1720*a* and 1720*b*. Note that in other embodiments, pole faces 1705*a* and 1705*b* need not be contoured. For example, pole faces 1705a and 1705b of FIG. 17A each can lay in a relatively flat plane perpendicular to the page on which FIG. 17A is illustrated.

Figure 18A:
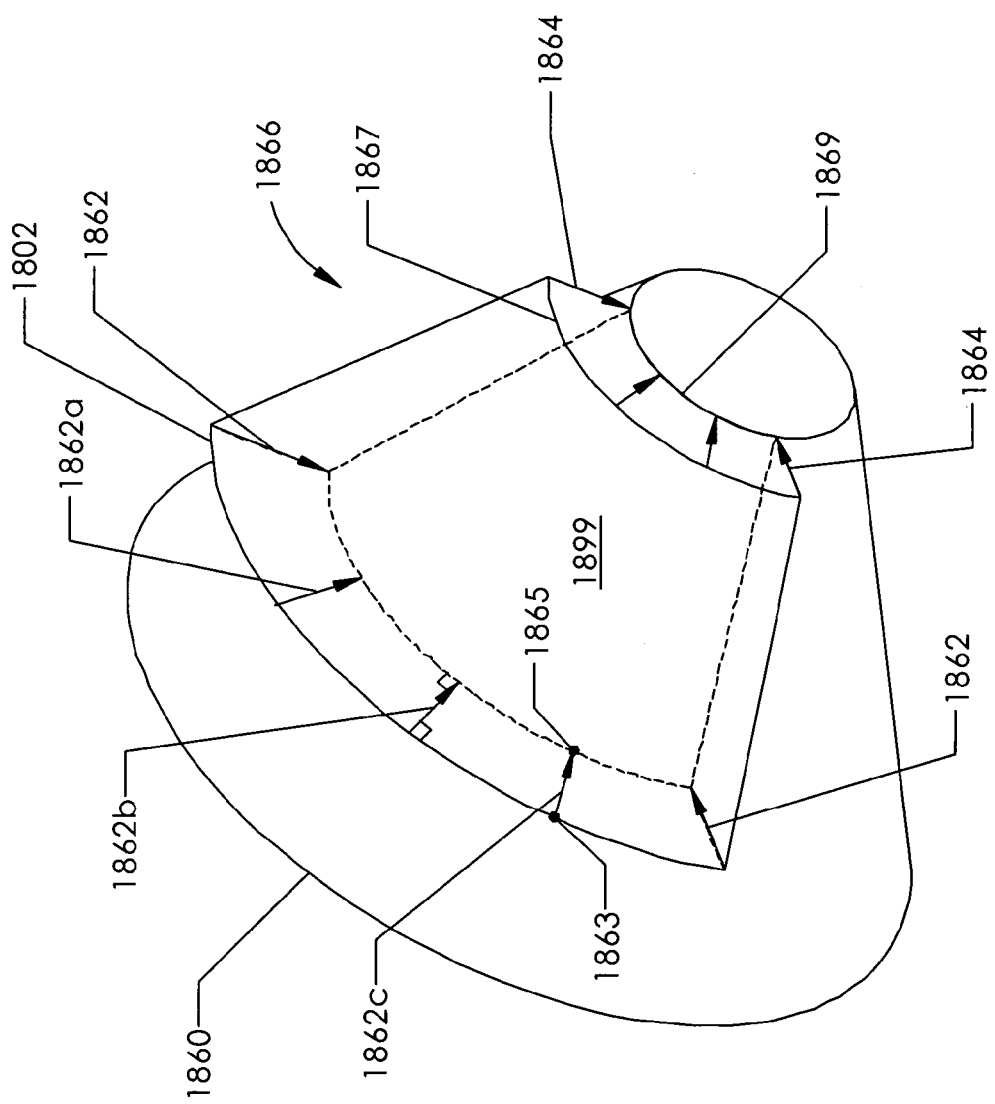
FIG. 18A depicts air gaps having various degrees of uniformity, according to at least one embodiment of the present invention.
Figure 18B:
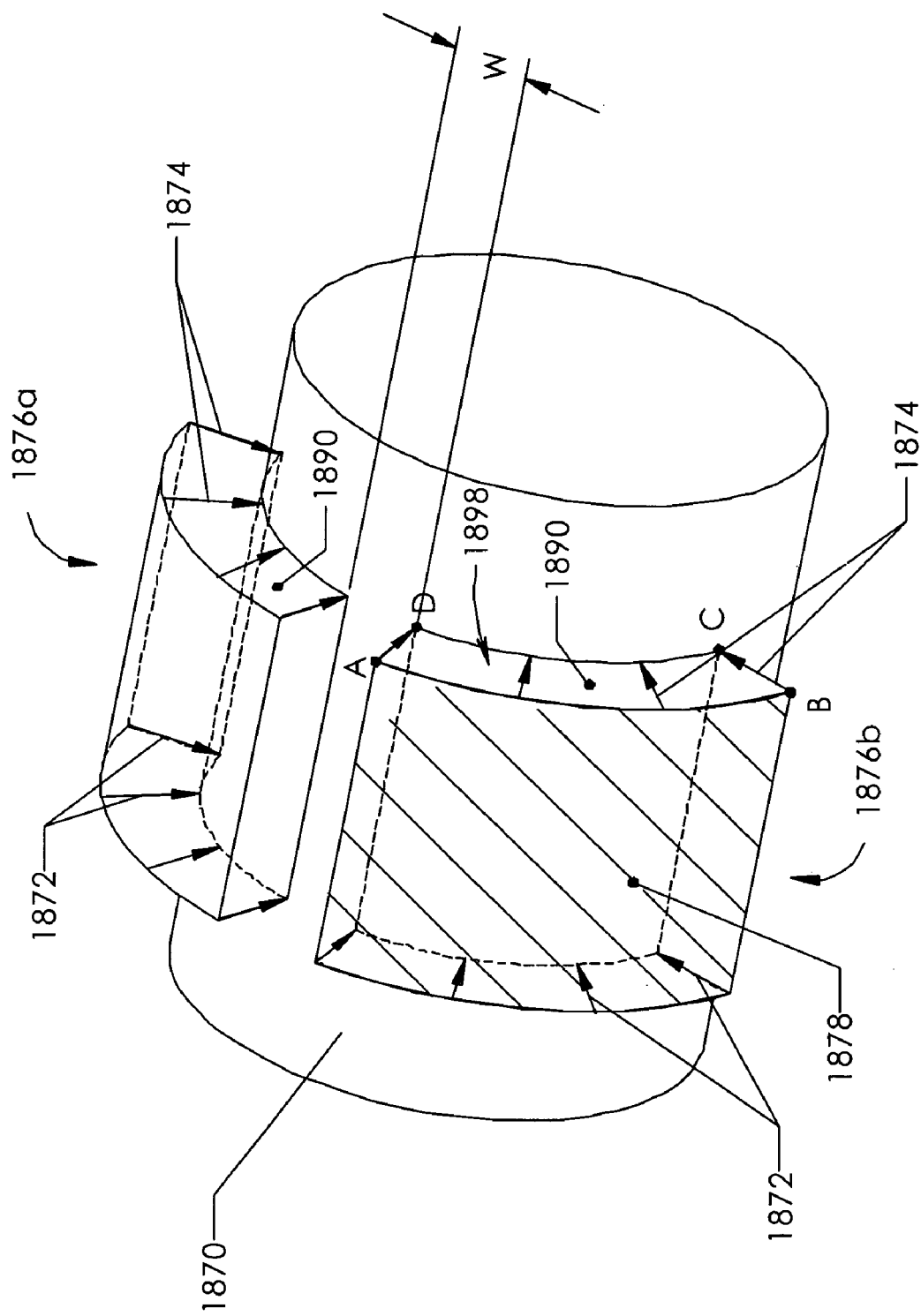
FIG. 18B depicts the configurability of air gaps according to embodiments of the present invention.

FIGS. 18A and 18B depict air gaps according to embodiments of the present invention. FIG. 18A illustrates an air gap 1866 shaped by a conical magnet 1860 and a corresponding pole face, which is not shown to avoid obscuring air gap 1866. In this example, each of normal vectors 1862 and 1864 originates from a surface portion on the pole face and terminates at a corresponding point on surface portion 1899 on conical magnet 1860. For example, a normal vector 1862c originates at a portion of the pole face, such as at point 1863, and extends to a point on portion 1899 of surface of conical magnet 1860, such as point 1865. In some embodiments, normal vectors 1862 and 1864 each have the same lengths.

But in some embodiments, lengths of normal vectors 1864 can differ from lengths of normal vectors 1862. As such, an arc-shaped cross-section 1867 defines a first uniform air gap cross-section at a first axial position, whereas an arc-shaped cross-section 1802 defines a second uniform air gap cross-section at a second axial position along the length of an axis (not shown). Normal vectors 1864 lie in the same plane perpendicular, for example, to surface portion 1899, whereas normal vectors 1862 lie in the same plane also perpendicular to surface portion 1899. But both planes are different and produce different cross-sections of air gap 1866, such as arc-shaped cross-sections 1802 and 1867.

In some embodiments, it may be advantageous to vary the air gap thickness to create, for example, a narrowed air gap at the small diameter end of conical magnet 1860 and a widened air gap at the large diameter end of conical magnet 1860 to better control flux conducted across air gap 1866 to the adjacent field pole (not shown). For example, the lengths of normal vectors 1862 can be longer than normal vectors 1864. Accordingly, this creates a wider air gap at arc-shaped cross-section 1802 and a narrower air gap at arc-shaped cross-section 1867. In another example, consider that a load line of conical magnet 1860 defines a ratio between the length of the air gap ("L_gap") to the length of the magnet ("L_magnet") as L_gap/L_magnet. To control this ratio or to prevent the ratio from changing, air gap 1866 can be made narrow at the small end of the conical magnet 1860, where magnet length L_magnet is relatively short, and can be wider at the large end of conical magnet 1860 where magnet length L_magnet is relatively longer. The length of the magnet ("L_magnet") describes a diameter of conical magnet 1860 along which magnetic flux traverses from one magnet surface to another.

Note that normal vectors originating from and/or terminating at a curved surface generally are not parallel to each other in a plane perpendicular to the surface of magnet 1860. For example, normal vector 1862a is not parallel to normal vector 1862b, both of which originate from a pole face surface having a curvature associated therewith. Air gap 1866 includes an outer boundary having an arc-shaped cross-section 1867 and an inner boundary having an arc-shaped cross-section 1869. Note that although only one air gap 1866 is shown, other similar air gaps can be formed by other pole face surfaces. Those air gaps have been omitted for sake of simplicity. Also note that normal vectors 1862 and 1864 do not necessarily represent magnetic flux lines in air gap 1866; their primary purpose is to describe the physical structure of the air gap.

FIG. 18B illustrates air gaps 1876a and 1876b shaped by a cylindrical magnet 1870 and corresponding pole faces, both of which are not shown to avoid obscuring those air gaps. In this example, each of normal vectors 1872 and 1874 originates from a point on a surface portion on the pole face (not shown) and terminates at a corresponding point on surface portion 1890 on conical magnet 1870. Generally, normal vectors 1872 and normal vectors 1874 lay within a first plane (not shown) and a second plane (not shown), respectively, where both planes are substantially perpendicular to an axis. Accordingly, normal vectors 1872 and normal vectors 1874 define a first and a second substantially uniform cross-section. The first and second substantially uniform cross-sections form arc-shaped cross-sections and can be of the same size or of a different size, depending on the lengths of normal vectors 1872 and 1874. For example, when each of normal vectors 1874 is of the same length, then they form an arc-shaped cross-section 1898 (e.g., having a perimeter defined by points A, B, C and D). In one case, arc-shaped cross-section 1890 provides uniformity in radial directions about an axis. In another case, when the lengths of normal vectors 1872 and 1874 are the same, then the arc-shaped cross-sections formed therefrom provides uniformity in an axial direction, thereby providing for uniform air gap thickness in whole or in part. Note that the normal vectors can also originate from a magnet surface (not shown) to describe air gaps. In at least one embodiment, surface areas of pole face surfaces can be dimensioned as a function of the peripheral distance, "W," between field pole members (not shown). FIG. 18B shows a surface area 1878 as a crosshatched outer boundary of air gap 1876b. Surface area 1878 is representative of other surface areas of other air gaps, all of which can be similarly dimensioned. The distance, "W," of FIG. 18B is selected to provide maximum magnetic coupling between cylindrical magnet 1870 and the field pole member by maximizing pole face surface areas 1878 while minimizing leakage between said field pole members associated with air gaps 1876a and 1876b by increasing distance, "W." An optimal value of "W" minimizes magnetic field leakage while providing an increased output torque.

Figure 19:
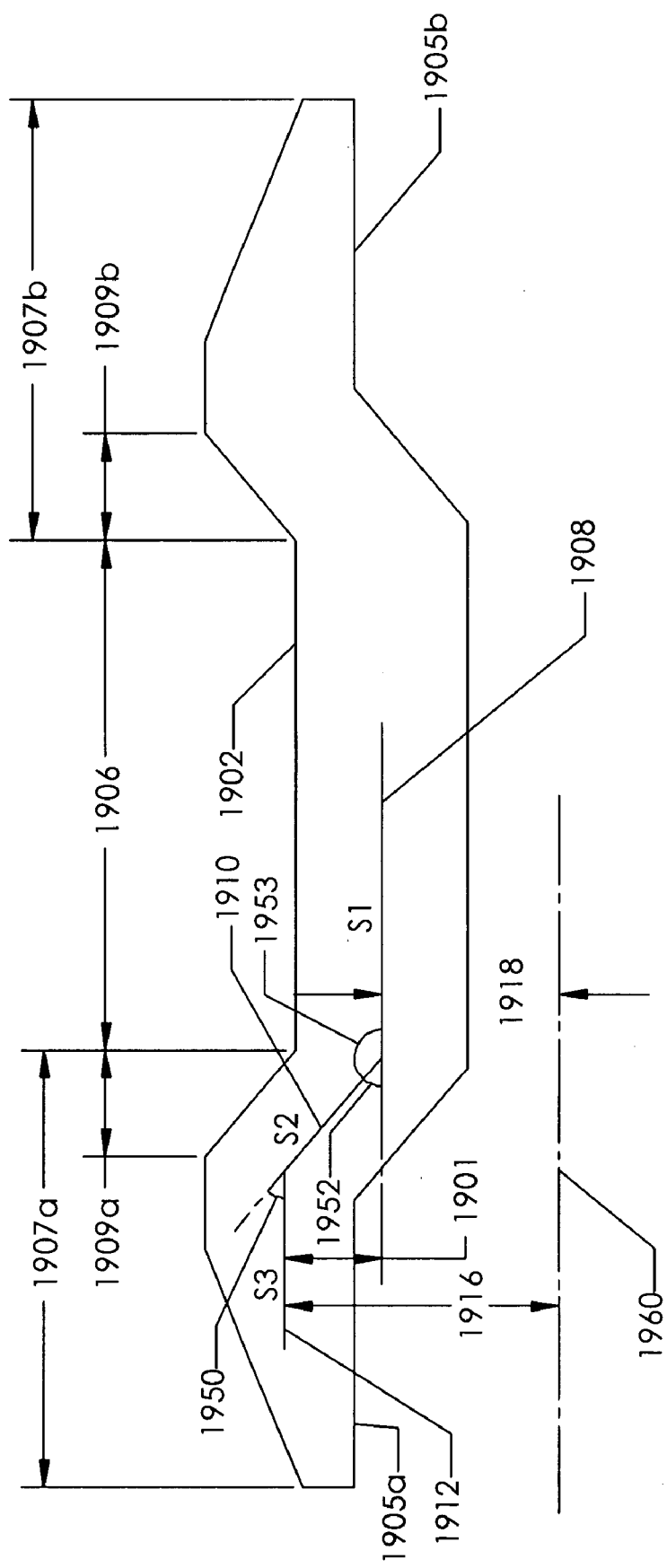
FIG. 19 is a cross-sectional view illustrating yet another general field pole member configuration in accordance with yet another embodiment of the present invention.

FIG. 19 is a cross-sectional view illustrating yet another general field pole member configuration in accordance with yet another embodiment of the present invention. In the cross-sectional view of field pole member 1902, which is similar to sectional view X-X of FIG. 5A, field pole member 1902 is shown to include similar regions or portions as field pole member 1702 of FIG. 17A. In this example, field pole member 1902 has a first pole shoe 1907a, a second pole shoe 1907b, a first pole face 1905a, a second pole face 1905b, and a central field pole member portion 1906, all of which have equivalent functionalities as those described above. Note that in other embodiments, the regions and portions of field pole member 1902 can be of other sizes, lengths, shapes, proportions, dimensions, cross-sectional areas, etc. than the above-mentioned.

As shown in FIG. 19, transition region 1909a includes a transitory flux path ("S2") 1910 for providing an acute angle 1952 from or to a first flux path segment associated with central field pole member portion 1906, such as flux path segment ("S1") 1908, and for providing the same or a different acute angle 1950 from or to a second flux path segment, such as flux path segment ("S3") 1912, that is associated with first pole shoe 1907a. In some instances, the angle at which transitory flux path ("S2") 1910 deviates from flux path segments 1908 and 1912 can also be defined by an obtuse angle 1953, which is complementary to acute angle 1952. In some cases, flux path segment ("S1") 1908 and flux path segment ("S3") 1912 are at respective distances 1918 and 1916 from an axis of rotation defined by shaft 1960, both segments 1908 and 1912 being substantially parallel to shaft 1960. In FIG. 19, flux path segment ("S1") 1908 and transitory flux path ("S2") 1910 extend the approximate length of central field pole member portion 1906 and transition region 1909a, respectively, whereas flux path segment ("S3") 1912 extends the length of first pole shoe 1907a (or a portion thereof). Consider that transition region 1909a provides a transitory flux path portion for gently transitioning flux from flux path segment 1908 (which is at a distance 1918 from an axis 1960 of rotation) to flux path segment 1912 (which is at a distance 1916 from axis 1960). Or consider that transition region 1909a provides a transitory flux path portion for gently transitioning flux a radial distance 1901 from axis 1960 without 90 degree bends.

Figure 20:
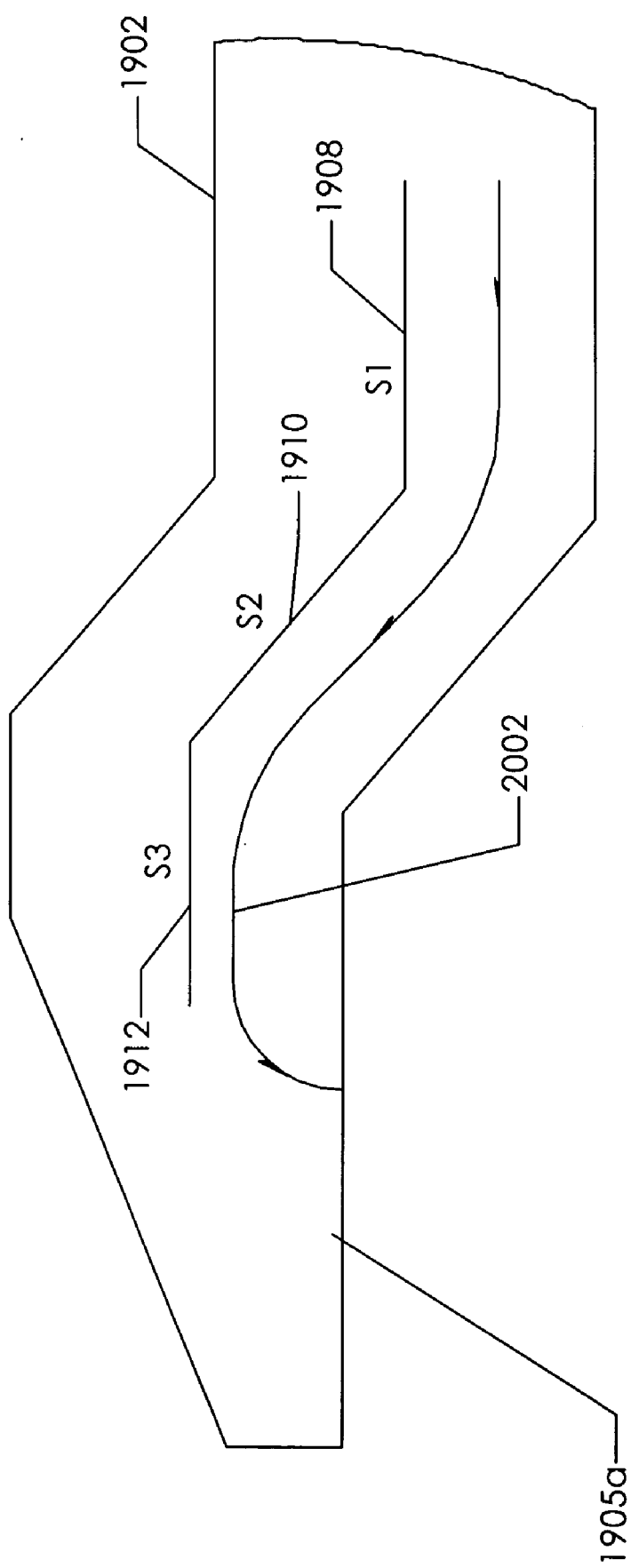
FIG. 20 illustrates an exemplary flux line to represent an instance of magnetic flux between pole faces of a field pole member, according to one embodiment of the present invention.

FIG. 20 illustrates a flux line 2002 as an example of a portion of magnetic flux extending to a pole face 1905a of field pole member 1902, according to one embodiment. Flux line 2002 is shown to be approximately incident to a flux path including flux path segment ("S1") 1908, transitory flux path ("S2") 1910 and flux path segment ("S3") 1912.

Generally, the motor constant (Km) for an electric motor implementing rotor-stator structure 200 (FIG. 2B), or the like, can be set by varying the length of the field pole member's core (i.e., the winding region) without materially affecting the other motor characteristics, other than for motor length and weight in some cases. For example, by doubling the winding length while keeping an outside diameter constant, the winding volume can also be doubled so the number of turns that can be wound within the motor doubles. Since motor performance is set by ampere-turns, in whole or in part, when the number of turns doubles, the current can be cut approximately in half and still achieve the same performance. So, doubling the number of turns of same wire size can cause the winding resistance to increase by a factor of two or so. Since the power lost in a motor can be determined by a square of the current times the winding resistance, a reduction in current by a factor of two and a doubling of the resistance can lead to a halving of the power loss in the winding.

An exemplary method of converting electrical energy to mechanical torque by using a rotor-stator structure of at least one embodiment of the present invention is described as follows. A first element magnetic flux is produced by an even number of poles of two permanent magnets, whereby those magnets substantially direct the first element magnetic flux in a radial direction inside and to the pole surfaces of the magnets. The permanent magnets are separated axially, but are connected along a common axis such that the magnet poles are substantially aligned in planes that include the axis. The magnet poles in the two permanent magnets are substantially oppositely directed in magnetization when viewed along the axis, thus completing a magnetic circuit. The first element flux is directed in a substantially axial direction through a plurality of low reluctance path elements, the paths being substantially parallel to the axis, thus aiding the magnetic flux density in the magnetic circuit. At least one of the low reluctance path elements is substantially surrounded by a second magnetic flux-producing element composed of current-carrying means surrounding the low reluctance path element. The current in the second flux element, when energized, is selectively switchable so as to produce magnetic potentials in regions of flux interaction at the axial ends of the low reluctance path elements, such as at the stator surfaces. The switchable magnetic potentials, when energized, either aid or oppose magnetic flux from the first element flux source, thereby producing torque in the permanent magnets in planes perpendicular to the axis. The magnitude of the torque produced is a function of the angle between the direction of the first element flux and the second element flux. In some embodiments, the regions of flux interaction at the axial ends of the low reluctance path elements form air gap surfaces that are at an angle relative to the axis. In alternative embodiments, the regions of flux interaction at the axial ends of the low reluctance path elements form air gap surfaces that are parallel to the axis. In a specific embodiment, the coercivity of the permanent magnets as measured by the relative recoil permeability is less than 1.3 in CGS units, for example.

As rotor-stator structures and electrical motors can be designed such that their functionalities can be simulated and modeled using computing devices, at least an embodiment of the present invention relates to a computer-readable medium having computer code thereon for performing various computer-implemented operations, such as modeling the conversion of electrical energy to mechanical torque (or the generation of electrical energy from mechanical torque). In particular, control strategies of the invention may be implemented in software associated with a processor. The media and computer code may be those specially designed and constructed for the purposes of the present invention, or they may be of the kind well known and available to those having skill in the computer software arts. Examples of computer-readable media include hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with, machine-executable software instructions. Further, other embodiments of the present invention include motors using rotor-stator structures of the present invention that are electrically driven by well known drive technology, as would be appreciated by those ordinarily skilled in the art.

According to various embodiment of the present invention, a rotor-stator structure for electrodynamic machines has an axis and includes a rotor assembly in which is mounted at least two substantially cylindrical magnets arranged axially on the axis and being spaced apart from each other, the cylindrical magnets having regions of predetermined magnetic polarization and each having confronting cylindrical magnetic surfaces of principal dimension substantially parallel to the axis, with the magnetic polarizations being in substantially opposite direction. The rotor-stator structure can also include field pole members arranged coaxial to the axis and having flux interaction surfaces formed at the ends of the field pole members and located adjacent the confronting magnetic surfaces, which are generally coextensive with the principal dimension thereof, defining functioning air gaps therewith. Each of the field pole members is magnetically permeable. Each of the field pole member is substantially straight. The flux interaction surfaces are configured to magnetically couple the field pole members to the cylindrical magnets.

In some embodiments, the rotor-stator structure can further comprise a shaft on which the at least two substantially cylindrical magnets are affixed, the shaft defining the axis and extending through each of the at least two substantially cylindrical magnets. The flux interaction surfaces can be shaped to maintain a substantially uniform cross-section for each of the air gaps, the substantially uniform cross-section being an arc-shaped cross-section in a plane substantially perpendicular to the axis. The flux interaction surfaces can also be shaped to maintain at least two different cross-sections for each of the air gaps to form substantially non-uniform cross-sections for each of the air gaps, the at least two different cross-sections each having arc-shaped cross-section of different dimensions in at least two different planes that are substantially perpendicular to the axis. The substantially uniform cross-section is configured to increase flux interaction between the cylindrical magnets and the field pole members, thereby increasing output torque. The shape of each of the air gaps can be commensurate with the substantially uniform cross-section and another substantially uniform cross-section, both of which have similar sizes to provide a substantially uniform thickness for each of the air gaps. The flux interaction surfaces each can have a surface area dimensioned to generate maximum torque output.

In various embodiments, each of the flux interaction surfaces can further include a skewed flux interaction surface to skew field pole gaps between adjacent field pole members, thereby minimizing detent torque. The rotor-stator structure can be configured to limit magnetic flux paths to traverse only through two of the cylindrical magnets, the field pole members, the flux interaction surfaces, and the air gaps. Further, the rotor-stator structure can include a coil wound about one or more of the field pole members to form active field pole members each of which excludes back-iron, thereby decreasing magnetic losses as well as decreasing an amount of materials used to manufacture an electrodynamic machine. In some embodiments, either the field pole members are configured to rotate about the axis relative to the cylindrical magnets or the cylindrical magnets are configured to rotate about the axis relative to the field pole members. Each of the substantially straight field pole members can be configured to minimize linear deviations in a flux path extending between a surface portion of a first flux interaction surface and a surface portion of a second flux interaction surface, the path segment terminating at the surface portions.

In at least one embodiment, a rotor-stator structure for electrodynamic machines can include a shaft defining an axis of rotation and having a first end portion, a central portion and a second end portion. The rotor-stator structure can also include at least a first magnet structure and a second magnet structure, each having one or more magnet surfaces. The first magnet structure and the second magnet structure each is affixed coaxially on the shaft so that the direction of polarization of the one or more magnet surfaces for the first magnet structure are in substantially opposite directions than the direction of polarization of the one or more magnet surfaces for the second magnet structure. The rotor-stator structure includes a plurality of sets of windings and a number of field pole members arranged substantially coaxial to the shaft, each of the field pole members including a number of laminations. Each of the field pole members can have a first pole shoe at a first field pole member end and a second pole shoe at a second field pole member end. The first pole shoe is positioned to be adjacent to a portion of the first magnet structure to form a first flux interaction region and the second pole shoe is positioned to be adjacent to a portion of the second magnet structure to form a second flux interaction region. Both of the first flux interaction region and the second flux interaction region include air gaps, each of which can have an arc-shaped cross section in a plane perpendicular to at least one magnet surface from the one or more magnet surfaces. In some cases, the arc-shaped cross section establishes a substantially uniform thickness for each of the air gaps and increases flux interaction between the one or more magnet surfaces and the field pole members, thereby increasing output torque.

In one embodiment, the first pole shoe and the second pole shoe each further include flux interaction surfaces having a surface area dimensioned to generate maximum torque output, the surface area being dimensioned as a function of at least the distances between the field pole members to provide maximum magnetic coupling between the one or more magnet surfaces and the field pole members while at least minimizing leakage between the field pole members. In some cases, at least one of the field pole members is a substantially straight field pole member configured to provide a substantially straight flux path between the first flux interaction region and the second flux interaction region. The first pole shoe and the second pole shoe each can further include a skewed flux interaction surface to skew field pole gaps between adjacent field pole members, thereby minimizing detent torque. Each of the field pole members can also have at least a central field pole member portion around which a set of the plurality of sets of windings is wound.

In one embodiment, each of the first and the second pole shoes can include a transition region connecting each of the first field pole member end and the second field pole member end at a nonorthogonal angle with the central field pole member portion to reduce reluctance for a flux path between the central field pole member portion and either the first or the second pole shoe, or both. The transition region includes a transitory flux path for providing an acute angle from or to a first flux path segment associated with the central field pole member portion and for providing at the same or a different acute angle from or to a second flux path segment associated with either of the first and the second pole shoes. In some instances, both of the acute angles are between approximately 0 and 60 degrees. The first magnet structure and the second magnet structure can each be dipole magnets. As such, one magnet surface of the first magnet structure has a north pole pointing in a first direction and one magnet surface of the second magnet structure has a north pole pointing in a second direction. The first and the second directions can differ by an angle between 150 to 180 degrees.

In one embodiment, the rotor-stator structure can be configured to either receive electrical power as an electrical current into the at least one coil for implementing an electric motor or to receive mechanical power as rotational motion about the shaft for implementing an electric generator. In a specific embodiment, the rotor-stator structure can be configured to implement either a compound motor or a series motor, or both, if the rotor-stator structure is implemented within the electric motor, and is further configured to implement either a compound generator or a series generator, or both, if the rotor-stator structure is implemented within the electric generator.

In alternative embodiments, the first magnet structure and the second magnet structure each are multipole magnets, where the one or more magnet surfaces of the first magnet structure include a plurality of north poles and south poles, one of which is pointing in a first direction. The one or more magnet surfaces of the second magnet structure can also include a plurality of north poles and south poles, one of which is pointing in a second direction. The first and the second directions can differ by an angle between 150 to 180 degrees. In some cases, the first magnet structure and the second magnet structure include separate magnets, each of which has interfaces contiguous with other separate magnets without any intervening structure. In other cases, the first magnet structure and the second magnet structure include either one or more cylinder-shaped magnets each having a cylindrical surface or one or more cone-shaped magnets each having a conical surface, or both. Note that the one or more magnet surfaces can each include discrete regions of magnetization. Also, the first magnet structure and the second magnet structure each can include a magnet support configured to support the regions of magnetization at principal dimensions either at an acute angle to the axis or parallel to the axis, the magnet support being affixed to the shaft.

A rotor-stator structure in various embodiments can be implemented as a single magnet motor, which can include a shaft and a single magnet structure having one or more magnet surfaces and being affixed coaxially on the shaft so that the direction of polarization of the one or more magnet surfaces extend in one or more planes that each are substantially perpendicular to the axis. The rotor-stator structure for the single magnet motor also can include field pole members arranged coaxially to the axis. The field pole members can have flux interaction surfaces formed at one end of each of the field pole members and positioned adjacently to portions of the one or more magnet surfaces that confront the flux interaction surfaces, the flux interaction surfaces and the portions of the one or more magnet surfaces defining air gaps. The rotor-stator structure for the single magnet motor includes a flux-carrying member to complete a magnetic circuit through one or more of the field pole members and the single magnet structure. In some embodiments, the flux interaction surfaces are contoured to maintain a substantially uniform cross-section for each of the air gaps. For example, the substantially uniform cross-section can be an arc-shaped cross-section in a plane substantially perpendicular to the one or more magnet surfaces. The substantially uniform cross-section provides a substantially uniform thickness for each of the air gaps and increases flux interaction between the one or more magnet surfaces and the field pole members, thereby increasing output torque.

In a specific embodiment, the flux interaction surfaces each have a surface area dimensioned to generate maximum torque output, the surface area being dimensioned as a function of at least the distances between the field pole members to provide maximum magnetic coupling between the one or more magnet surfaces and the field pole members while at least minimizing leakage between the field pole members. In one embodiment, at least one of the field pole members is a substantially straight field pole member configured to provide a substantially straight flux path between the one end of each of the field pole members and the flux-carrying member. In some cases, each of the flux interaction surfaces further comprises a skewed flux interaction surface to skew field pole gaps between adjacent field pole members, thereby minimizing detent torque. In one embodiment, the single magnet structure is a cylindrical permanent magnet and the one or more magnet surfaces are cylindrical surface portions. In another embodiment, the single magnet structure is a conical permanent magnet and the one or more magnet surfaces are conical surface portions, wherein the conical permanent magnet is affixed on the shaft to face either one axial direction or the other axial direction.

A rotor-stator structure in various embodiments can be implemented as either a compound or series motor or generator that includes a first subset of conical magnets having first conical surfaces arranged axially on an axis of rotation such that the first conical surfaces face each other, and a first subset of first field pole members arranged coaxially to the axis and having flux interaction surfaces formed at the ends of the first field pole members and adjacent to portions of the first conical surfaces that confront the flux interaction surfaces, the flux interaction surfaces and the portions of the first conical surfaces defining first air gaps. The rotor-stator structure further includes a second subset of conical magnets having second conical surfaces arranged axially on the axis of rotation such that the second conical surfaces face each other, and a second subset of second field pole members arranged coaxially to the axis and having flux interaction surfaces formed at the ends of the second field pole members and adjacent to portions of the second conical surfaces that confront the flux interaction surfaces, the flux interaction surfaces and the portions of the second conical surfaces defining second air gaps. It also includes a shaft on which the first and the second subsets of conical magnets are affixed, the shaft defining the axis of rotation and extending through each of the first and the second subsets conical magnets. In one embodiment, the first subset of conical magnets is disposed in parallel with (e.g., are disposed within) the second subset of conical magnets to form either a compound motor or a compound generator. For example, the first subset of conical magnets can be disposed within the second subset of conical magnets. In another embodiment, the first subset of conical magnets is disposed in series with the second subset of conical magnets to form either a series motor or a series generator.

A rotor-stator structure in various embodiments can include one or more field pole members each including a central field pole member portion configured to accept one or more sets of windings, a first pole shoe coupled to the central field pole member portion, the first pole shoe including a first pole face configured to confront a first magnet, and a second pole shoe coupled to the central field pole member portion, the second pole shoe including a second pole face configured to confront a second magnet. The first pole face and the second pole face each include a flux interaction surface contoured to form an air gap having a substantially uniform cross-section. In one embodiment, the flux interaction surface is configured to form the substantially uniform cross-section as an arc-shaped cross-section in a plane substantially perpendicular to at least a surface portion on either the first magnet or the second magnet. In some cases, a number of normal vectors in the plane extend orthogonally between points on the flux interaction surface and points on the surface portion to define the arc-shaped cross-section, the normal vectors each having a substantially uniform length. In at least one instance, the substantially uniform cross-section provides a substantially uniform thickness for the air gap, the uniform thickness increasing flux interaction either between the first pole face and the first magnet or between the second pole face and the second magnet, or both, thereby increasing output torque.

In a specific embodiment, the flux interaction surface comprises a surface area dimensioned to generate maximum torque output, the surface area being dimensioned as a function of at least the distances between the field pole member and another field pole member to provide maximum magnetic coupling between the first magnet and the second magnet and the field pole member while at least minimizing leakage between the field pole member and the other field pole member. In an embodiment, at least one of the field pole members is a substantially straight field pole member configured to provide a substantially straight flux path between the first pole shoe and the second pole shoe. The flux interaction surface can further include a skewed flux interaction surface to skew a field pole gap between the field pole member and the other field pole member, thereby minimizing detent torque. The skewed flux interaction surface includes a first edge defining a first side of the field pole gap and a second edge defining a second side of another field pole gap, whereby the first edge and the second edge maintain angles that do not align with a direction of polarization of at least one of either the first magnet or the second magnet, wherein one first edge of the field pole member and one second edge of the other field pole member form the field pole gap. The flux interaction surface can be shaped to confront at least a portion of either a cylindrical permanent magnet or a conical permanent magnet.

A field pole member in various embodiments can be configured to either reduce or eliminate back-iron between the first pole shoe and the second pole shoe when a coil is wound about the field pole member, thereby decreasing magnetic losses as well as decreasing an amount of materials used to manufacture an electrodynamic machine. In at least one case, each of the first and the second pole shoes further comprises a transition region coupling each of the first and the second pole shoes at a nonorthogonal angle with the central field pole member portion to reduce reluctance for a flux path between the central field pole member portion and either the first or the second pole shoe, or both. The field pole member can further include laminations. For example, the field pole member can further include laminations such that a medial plane extending in an axial direction divides a quantity of the laminations approximately in half so that on one side of the medial plane, laminations generally decrease in at least one dimension as the laminations are positioned farther from the medial plane. The laminations can be formed from a substrate composed of a magnetically permeable material in configurations that reduce wastage of the magnetically permeable material. In at least one embodiment, the central field pole member portion further comprises an outer peripheral surface coextensive with a portion of a circle about an axis of rotation to decrease a volumetric dimension of the field pole member.

A practitioner of ordinary skill in the art requires no additional explanation in making and using the embodiments of the rotor-stator structure described herein but may nevertheless find some helpful guidance by examining the following references in order from most to least preferred: "IEEE 100: The Authoritative Dictionary of IEEE Standard Terms," Institute of Electrical and Electronics Engineers (Kim Breitfelder and Don Messina, eds., 7th ed. 2000), "General Motor Terminology," as defined by the Small Motor and Motion Association ("SMMA"), and "Standard Specifications for Permanent Magnet Materials: Magnetic Materials Producers Association ("MMPA") Standard No. 0100-00," International Magnetics Association.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any one embodiment; rather any one feature or aspect of one embodiment can be readily interchanged with another feature or aspect in any of the other embodiments. While the above description of the embodiments relates to a motor, the discussion is applicable to all electrodynamic machines, such as a generator. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. As used herein, the term exemplary is used to describe one of the many examples of the various implementations and/or embodiments of the invention. Notably, not every benefit described herein need be realized by each embodiment of the present invention; rather any specific embodiment can provide one or more of the advantages discussed above. It is intended that the following claims and their equivalents define the scope of the invention.

What is claimed is:

1. A rotor-stator structure for electrodynamic machines comprising:

cylindrical magnets having cylindrical surfaces arranged axially on an axis of rotation, said cylindrical magnets including at least two cylindrical magnets being positioned so that the directions of polarization of said at least two cylindrical magnets are in substantially opposite directions; and field pole members arranged coaxially to said axis and having flux interaction surfaces formed at the ends of said field pole members adjacent to portions of said cylindrical surfaces that confront said flux interaction surfaces, said flux interaction surfaces and said portions of said cylindrical surfaces defining air gaps, said flux interaction surfaces being configured to magnetically couple said field pole members to said cylindrical magnets, wherein said flux interaction surfaces are contoured to maintain a substantially uniform cross-section for each of said air gaps, wherein said directions of polarization are in one or more planes that are substantially perpendicular to said axis of rotation, wherein at least one of said field pole members is a substantially straight field pole member.

2. The rotor-stator structure of claim 1 wherein said cylindrical magnets and said field pole members are sufficient to generate flux paths.

3. The rotor-stator structure of claim 1 further comprising a shaft on which said cylindrical magnets are affixed, said shaft defining said axis of rotation and extending through each of said cylindrical magnets.

4. The rotor-stator structure of claim 1 wherein said substantially uniform cross-section is an arc-shaped cross-section of said air gaps in a plane that is substantially perpendicular to said axis.

5. The rotor-stator structure of claim 1 wherein said substantially uniform cross-section is configured to increase flux interaction between said cylindrical magnets and said field pole members, thereby increasing output torque.

6. The rotor-stator structure of claim 1 wherein said substantially uniform cross-section provides a substantially uniform thickness for each of said air gaps.

7. The rotor-stator structure of claim 6 wherein a plurality of normal vectors extending orthogonally between portions of said flux interaction surfaces and portions of said cylindrical surfaces define said substantially uniform thickness, said normal vectors each having a uniform length.

8. The rotor-stator structure of claim 1 wherein said flux interaction surfaces each have a surface area dimensioned to generate maximum torque output.

9. The rotor-stator structure of claim 8 wherein said surface area is dimensioned as a function of at least the distances between said field pole members to provide maximum magnetic coupling between said cylindrical magnets and said field pole members while at least minimizing leakage between said field pole members.

10. The rotor-stator structure of claim 1 wherein the substantially straight field pole member is configured to provide a substantially straight flux path between a first flux interaction surface and a second flux interaction surface.

11. The rotor-stator structure of claim 10 wherein said substantially straight flux path is associated with a reluctance lower than that associated with a non-straight flux path extending from said first flux interaction surface to said second flux interaction surface.

12. The rotor-stator structure of claim 11 wherein said non-straight flux path includes a subsequent flux path segment deviating at an angle of about ninety degrees from a precedent flux path segment, both said subsequent and said precedent flux path segments being consecutive.

13. The rotor-stator structure of claim 1 wherein at least one of said field pole members comprises one or more transition regions to ensure a flux path portion is non-orthogonal to said axis between said ends of said field pole members.

14. The rotor-stator structure of claim 1 wherein each of said flux interaction surfaces further comprises a skewed flux interaction surface to skew field pole gaps between adjacent field pole members, thereby minimizing detent torque.

15. The rotor-stator structure of claim 14 wherein said skewed flux interaction surface includes a first edge defining a first side of a field pole gap and a second edge defining a second side of another field pole gap, whereby said first side and said second side each are parallel to a first plane that maintains an angle to a second plane that includes or is parallel to a plane of magnetization passing through a north pole and a south pole of at least one of said cylindrical magnets, one first edge of a first field pole member and one second edge of a second field pole member form said field pole gap.

16. The rotor-stator structure of claim 1 wherein each of said field pole members further comprises laminations such that a medial plane extending in an axial direction divides a quantity of said laminations approximately in half so that on one side of said medial plane laminations generally decrease in at least one dimension as said laminations are positioned farther from said medial plane, wherein said laminations are formed from a substrate composed of a magnetically permeable material in configurations that reduce wastage of said magnetically permeable material.

17. The rotor-stator structure of claim 1 wherein each of said field pole members further comprises a central field pole member portion having an outer peripheral surface coextensive with a portion of a circle about said axis of rotation to decrease a volumetric dimension of said rotor-stator structure.

18. The rotor-stator structure of claim 1 further comprising a coil wound about at least one of said field pole members to form at least one active field pole member.

19. The rotor-stator structure of claim 18 wherein said at least one active field pole member consists essentially of said at least one of said field pole members and at least one of said coil.

20. The rotor-stator structure of claim 1 wherein said directions of polarization include a first direction of polarization and a second direction of polarization, whereby one cylindrical magnet of said cylindrical magnets is oriented to have said first direction of polarization and another cylindrical magnet of said cylindrical magnets is oriented to have said second direction of polarization, said first direction of polarization being at a polarization angle from said second direction of polarization to minimize detent torque, said polarization angle being any angle from about 150 degrees to 180 degrees.

21. The rotor-stator structure of claim 1 wherein said rotor-stator structure is configured to generate magnetic flux paths consisting essentially of: said first cylindrical magnet; said second cylindrical magnet; said field pole members; and two or more air gaps.

22. The rotor-stator structure of claim 1 wherein one or more of said field pole members further comprises: a magnetically permeable material that is continuous from one end of each field pole member to the other end; and at least a portion that is configured to accept an element for generating ampere-turn ("AT") flux, wherein a quantity of said one or more of said field pole members is independent of a number of magnet poles of said cylindrical magnets.

23. The rotor-stator structure of claim 1 wherein said field pole members comprise one or more of silicon-iron alloys, nickel-iron alloys, cobalt-nickel alloys, magnetic-powdered alloys, and soft magnetic composites, and said cylindrical magnets are permanent magnets comprising one or more of the following: neodymium iron ("NdFe"), one or more rare earth magnet materials, and one or more ceramic materials.

24. The rotor-stator structure of claim 1 wherein each of said field pole members have an elongated shape and are oriented at a skew angle from said axis of rotation.

* * * * *